US005521980A

United States Patent [19]
Brands

[11] Patent Number: 5,521,980
[45] Date of Patent: May 28, 1996

[54] PRIVACY-PROTECTED TRANSFER OF ELECTRONIC INFORMATION

[76] Inventor: Stefanus A. Brands, Ina Boudier-Bakkerlaan 143 III 3582 XW, Utrecht, Netherlands

[21] Appl. No.: 203,231

[22] Filed: Feb. 28, 1994

[51] Int. Cl.$^6$ ................................................. H04L 9/30
[52] U.S. Cl. ........................... 380/30; 380/25; 380/28
[58] Field of Search ............................. 380/25, 30, 28

[56] References Cited

U.S. PATENT DOCUMENTS

| | | | |
|---|---|---|---|
| 4,529,870 | 7/1985 | Chaum | 380/30 |
| 4,759,063 | 7/1988 | Chaum | 380/30 |
| 4,759,064 | 7/1988 | Chaum | 380/30 |
| 4,868,877 | 9/1989 | Fischer | 380/30 |
| 4,914,698 | 4/1990 | Chaum | 380/30 |
| 4,926,480 | 5/1990 | Chaum | 380/30 |
| 4,949,380 | 8/1990 | Chaum | 380/30 |
| 5,005,200 | 4/1991 | Fischer | 380/30 |
| 5,214,702 | 5/1993 | Fischer | 380/30 |

*Primary Examiner*—Salvatore Cangialosi

[57] ABSTRACT

Cryptographic apparatus and means are disclosed for each of three types of participants in an electronic system for privacy-protected transfer of certified information. This invention reveals protocols that improve efficiency and security in such systems, and allows a variety of useful extensions in functionality without difficulty. This is achieved by a restrictive blind signature protocol in combination with a testing protocol. The restrictive blind signature protocol allows the certifying party to encode data into certified information that it provides to a receiving party, such that it cannot be altered or modified by the receiving party. The testing protocol enables parties to prove a variety of characteristics about the encoded data in their certified information.

53 Claims, 34 Drawing Sheets

$\mathcal{U}$ $\mathcal{B}$

111

$a_1, \ldots, a_k \in_\mathcal{R} \mathbb{Z}_v$
$a_{k+1} \in_\mathcal{R} \mathbb{Z}_n^*$
$m_1 \leftarrow (\Pi_{i=1}^k Y_i^{a_i}) a_{k+1}^v$
Send: $m_1$ Register $m_1$
$a \in_\mathcal{R} \mathbb{Z}_n^*$
Send: $a$

112

113

$s \in_\mathcal{R} \mathbb{Z}_n^*$
$A \leftarrow m_1 m s^v$
$x_0, \ldots, x_k \in_\mathcal{R} \mathbb{Z}_v$
$x_{k+1} \in_\mathcal{R} \mathbb{Z}_n^*$
$B \leftarrow Y^{x_0} Y_1^{x_1} \cdots Y_k^{x_k} x_{k+1}^v$
$t \in_\mathcal{R} \mathbb{Z}_n^*$
$u \in_\mathcal{R} \mathbb{Z}_v$
$a' \leftarrow a t^v (X m_1 m)^u$
$c' \leftarrow \mathcal{H}(A, B, a')$
$c \leftarrow c' + u \bmod v$
Send: $c$

FIG. 11

$b \leftarrow ((X m_1 m)^c a)^{1/v}$
Send: $b$

114

115

$b^v \stackrel{?}{=} (X m_1 m)^c a$
$b' \leftarrow b s^{c'} t (X m_1 m)^{c' + u \operatorname{div} v}$

PRIVACY-PROTECTED TRANSFER OF ELECTRONIC INFORMATION

BACKGROUND OF THE INVENTION

1. Field of the Invention

This invention relates to digital transaction systems, and more specifically to secure systems for privacy-protected transfer of certified electronic information based on public key cryptography.

2. Description of Prior Art

The invention relates to electronic systems for privacy-protected transfer of certified information.

It is common usage in the art to model such systems using three basic types of participants: a "certifying" party that certifies information, a "user" that makes use of certified information, and an "organization" to whom certified information is shown. In general, a system will consist of several users and organizations, and possibly also certifying parties. It is also possible for a participant to perform more than one role, such as be a certifying party and an organization or be a user and an organization. Each type of participant has access to an electronic computing device with storage capacity, in the form of, for example, a smart card, a palm-top computer or a personal computer. Certified information is represented by vectors of numbers, hence it can be transferred by electronic means. In this context, a vector is an ordered set of one or more numbers.

A particular example of such a system is an electronic cash system. The certifying party is the blank; it issues money. Users are account holders; they can withdraw electronic money at the bank. Organizations are shops and the like; according to the rules of the system they have to accept certified information as a means of payment for goods and services. Of course, in a practical implementation of such a system there will be various banks and other organizations such as a clearing center.

In general, any transaction system that can be subjected to automation is a potential example of this system. One can consider systems for transferring certified information of a great many types: voting rights, certificates or diplomas, coins, driver's licenses, doctor's approvals, birth certificates, certificates of citizenship, tax-related data, and the like.

It is well-known in the art that digital signatures can be used to certify electronic information. This cryptographic technique consists of the certifying party generating two algorithms or keys, only one of which it makes publicly known. To certify a vector of numbers, the certifying party generates, by applying the secret algorithm, a second vector of numbers (the digital signature) that is in a certain mathematical relation to the vector of numbers to be certified. Two vectors of numbers for which this relation holds can only be efficiently constructed if one knows the secret algorithm. The publicly known algorithm can merely be used to verify whether two vectors of numbers are in such a relation to one another. Hence the second vector can serve as a digital signature on the first vector. Both vectors together form a piece of certified information, and they can be viewed as being one vector embodying a signature of the certifying party.

When digital signatures are used without any additional features, no privacy is offered to the users. Such digital signatures will be referred to as ordinary digital signatures. The information that is shown by users to different organizations can be linked; the certifying party knows which user receives which certified vector of numbers, and the organization that the certified information is transferred to sees exactly the same vector of numbers.

A cryptographic concept has been devised to guarantee privacy in such systems (see U.S. Pat. No. 4,759,063 to Chaum). This concept consists of a so-called "blind" signature protocol between the certifying party and the user. In such a protocol the user can make sure that the certifying party at the end of the protocol has no clue whatsoever regarding the vector of numbers he obtained. Yet, the certifying party knows for sure that the user has obtained a piece of certified information of the type specified at the start of the protocol, such as a coin or a driver's licence.

A second cryptographic concept to guarantee privacy of users when transferring certified information is known. It consists of letting the users be known by different pseudonyms at different organizations such that the pseudonyms are unlinkable. In principle, it is then possible for users to tranfer certified information between their pseudonyms. This concept necessarily uses the concept of blind signature protocols: each user must obtain his pseudonyms in a blind signature protocol. Cryptographic protocols have been proposed that enable the user to transform an ordinary digital signature on one of his pseudonyms (made by the organization at which he has that pseudonym; note that this is an example of an organization acting also as a certifying party) to a digital signature on each of his other pseudonyms. In this way information certified by one particular organization can be shown to all other organizations at which the user has a pseudonym, without enabling the organizations to link the transferred information. A system that makes use of unlinkable pseudonyms between which credentials are transferred is known as a credential mechanism.

Certain types of certified information may only be shown once, such as coins in a cash system. To prevent users in a system based on blind signatures from showing such information multiple times to distinct organizations without ever revealing their identity, a third concept is known, consisting of a special type of blind signature protocol called a "one-show" blind signature protocol (see U.S. Pat. No. 4,914,698 to Chaum). In a one-show blind signature protocol, the certifying party knows for sure that information related to the participating user is encoded into the certified information he obtains. Certified information must then be "tested" by the organization to which it is shown in such a way that testing it twice allows the encoded information to be computed.

To guarantee organizations and certifying parties in the privacy-protecting systems more control over what users do with their certified information, yet another concept is known (see U.S. Pat. No. 4,926,480 to Chaum). This consists of "embedding" a tamper-resistant computing device into the device of the user. Embedding should not to be taken too literally; the configuration might as well consist of, say, a tamper-resistant device connected to the parallel port of the user's personal computer. The tamper-resistant device acts in the interests of the certifying parties and/or organizations. In principle, cryptographic protocols can ensure that the device of the user can only show and erase certified information in cooperation with the embedded tamper-resistant device. Due to the embedding, the user-module can ensure itself that the privacy is guaranteed, since it can see to it that no identity-related information is leaked by or to the embedded device.

Significant difficulties show up in the realization of these concepts. Essentially only one realization of the credential mechanism for transferring credentials between pseudonyms (not considering the few minor variations that have been proposed) is known. In this mechanism, users can transfer a signature on one of their pseudonyms to a signature on all their pseudonyms; there is no provision for transfer between pseudonyms of credentials that may only be used a limited number of times. This is because ordinary digital signatures are used to sign pseudonyms. A further difficulty is that the known realization of a protocol for issuing pseudonyms in a blinded way to users is quite inefficient in communication, computation and storage complexity due to the so-called "cut-and-choose" technique that is applied. Yet another important concern is that the security of this protocol, and hence of the entire system, is an open question. Furthermore, no protocols are known for which the concept of the embedded tamper-resistant part is realized under the most stringent of privacy criteria known in the art, consisting of the impossibility for the certifying party, organization and the tamper-resistant device to develop during the protocols random numbers known to at least two of these parties. No provision seems to exist for multiple users to prove in cooperation that the ensemble of their credentials meets certain requirements. Still another problem is that there seems to be no way for users to prove to an organization that a pseudonym is theirs other than by first obtaining a signature on one of their pseudonyms. Yet another problem is that there seems to be no efficient protocol that can be used to prove that one has a certain combination of a plurality of credentials. A further problem is that it is difficult to allow for credentials that represent quantities, such as age, income, and the like; there is also no provision to prove relations between various quantities without revealing the quantities themselves and no way for certifying parties to update such credentials without needing to know their previous values.

Several realizations of the concepts for the particular instance of off-line electronic cash systems are known. In these systems, one-show credentials are not transferred between pseudonyms; account holders do not have pseudonyms with shops. Yet, this type of system may be called a credential machanism. None of the cash systems known in the literature is a particular instance of the known credential mechanism, i.e., none can be derived from it by using the same general techniques used to realize the credential mechanism. They all use what seem to be ad hoc constructions to realize the concepts of the one-show blind signatures (since coins are credentials that may be shown only once). This causes their security to be an open question, and also prevents efficient implementation by means of a simple and compact software kernel that need not be modified when extensions in functionality are added later on. Furthermore, the withdrawal protocols known to realize the one-show property make use of the cut-and-choose technique, which causes them to be inefficient in communication, computation, and storage complexity. Due to the use of the ad hoc constructions in the protocols, it seems very difficult to extend the functionality of the systems without further worsening the problems related to security and efficiency.

A few extensions allowing the issuing of cheques have been proposed. However, once again, their security is an open problem, and they are quite inefficient. A general technique to incorporate protection against framing attempts of the bank (meaning that the bank falsely accuses an account holder of having double-spent a coin) is known. This technique, however, causes a serious increase in storage requirements for the computing devices of the users and only offers protection assuming that the bank has limited computing power. Another problem is that the only way to encode additional information, such as expiration dates, currency denomination, and the like, seems to be to use a different type of signature for each value. Although it has been suggested that the bank can allow coins to be spent more than once without payments being traceable, no efficient realizations are known. Although untraceable cash systems have been proposed, systems with both untraceable payments and anonymous accounts seem difficult to realize in currently known systems. No system is known that allows realization of the concept of embedded tamper-resistant devices under the most stringent of privacy requirements mentioned above, and the few systems known that realize this extension meeting less stringent criteria have questionable security. Another item of concern might be that there is no satisfactory way to prevent the "halting channel" in this extension. The halting channel problem means that the tamper-resistant part can leak at least one bit of information to the certifying party or organization by simply halting, or not halting, the execution of the protocol at a certain point. In view of these shortcomings, it will come as no surprise that no systems have been proposed that can incorporate all combinations of these extensions simultaneously.

The known credential mechanism and the off-line cash systems that are of practical relevance can all be broken if the so-called RSA problem, well-known in the art (See Rivest et al., "A method for obtaining digital signatures and public-key cryptosystems," Communications of the ACM, Feb. 1978, pp. 120–126), can be broken. No such systems are known that will remain secure even if the RSA problem is broken.

OBJECTS OF THE INVENTION

Accordingly, it is an object of the present invention to:

increase efficiency, security, and extendability in functionality of systems for transferring electronic information by introducing a special type of blind signature protocol that will henceforth be referred to as a restrictive blind signature protocol;

increase the efficiency of credential mechanisms by applying a restrictive blind signature protocol to issue pseudonyms instead of using the technique of cut-and-choose;

allow for credentials that may be shown only a limited number of times to be transferred between pseudonyms, by using restrictive blind signature protocols to sign pseudonyms;

improve the security of credential mechanisms by providing for realizations of restrictive blind signature protocols whose security is directly related to that of protocols that are well-known in the art;

construct efficient and secure realizations of restrictive blind signature protocols by providing for two techniques to construct such protocols based on a particular type of identification and signature protocol well-known in the art;

improve the privacy offered to users in systems that use embedded tamper-resistant devices by providing for appropriate protocols based on restrictive blind signatures;

allow efficient proofs for showing possession of a plurality of credentials using only a single protocol;

prevent the need for a separate digital signature for each credential;

allow a variety of credentials to be maintained by the user such that only one corresponding digital signature is needed;

allow credentials that denote quantities without needing a different type of signature for each quantity;

allow organizations to update credentials of a user without needing to know the credentials already owned by the user;

allow users to prove a variety of mathematical relations between their credentials without revealing any additional information, by means of one, simple protocol;

efficiently realize credentials that may be shown a limited number of times;

allow the creation of anonymous accounts in off-line electronic cash systems by using restrictive blind signature protocols;

improve the security of off-line electronic cash systems by avoiding ad hoc constructions;

improve the efficiency of off-line cash systems by using restrictive blind signature protocols to withdraw cash;

allow efficient and secure ways to issue checks in off-line electronic cash systems;

allow for off-line electronic cash systems based only on the techniques used in the general credential mechanisms;

prevent the halting channel from the tamper-resistant part to the outside party by constructing protocols in which only one transmission between the computing device of the user and the outside party is needed;

prevent in such protocols in a similar way the halting channel from the outside party to the tamper-resistant device;

allow extensions in functionality of credential mechanisms to be simply switched off by setting corresponding subsets of numbers chosen randomly by the user to a fixed value, and letting the certifying party perform the computations involving the numbers in those subsets rather than the user himself;

allow implementation of such systems using a highly compact set of basic algorithms and data structures which may be used regardless of the number and nature of the various extensions in functionality of these systems;

protect against framing attempts in a simple manner that does not affect storage requirements;

allow the certifying party to encode additional information into credentials in an efficient way that does not influence security;

allow combinations of the aforementioned objects to be achieved without this negatively affecting efficiency and security, by providing for a compact and uniform set of algorithms on which the entire system is based;

increase in off-line electronic cash systems using embedded tamper-resistant devices the security for certifying parties and organizations by in effect letting the tamper-resistant device execute in the ensemble of withdrawal and payment protocol a special type of identification protocol well-known in the art;

require very little storage space and computational effort of tamper-resistant parts, such that they can be implemented using small computing devices, such as currently used smart cards; and allow efficient, economical, and practical apparatus and methods fulfilling the other objects of the invention.

Other features, objects, and advantages of this invention will be appreciated when the description and appended claims are read in conjunction with the figures.

BRIEF DESCRIPTION OF THE DRAWINGS

FIG. 11 shows a flowchart of a withdrawal protocol for a cheque for the first preferred embodiment in accordance with the teachings of the present invention.

SUMMARY OF THE INVENTION

Figure 1:
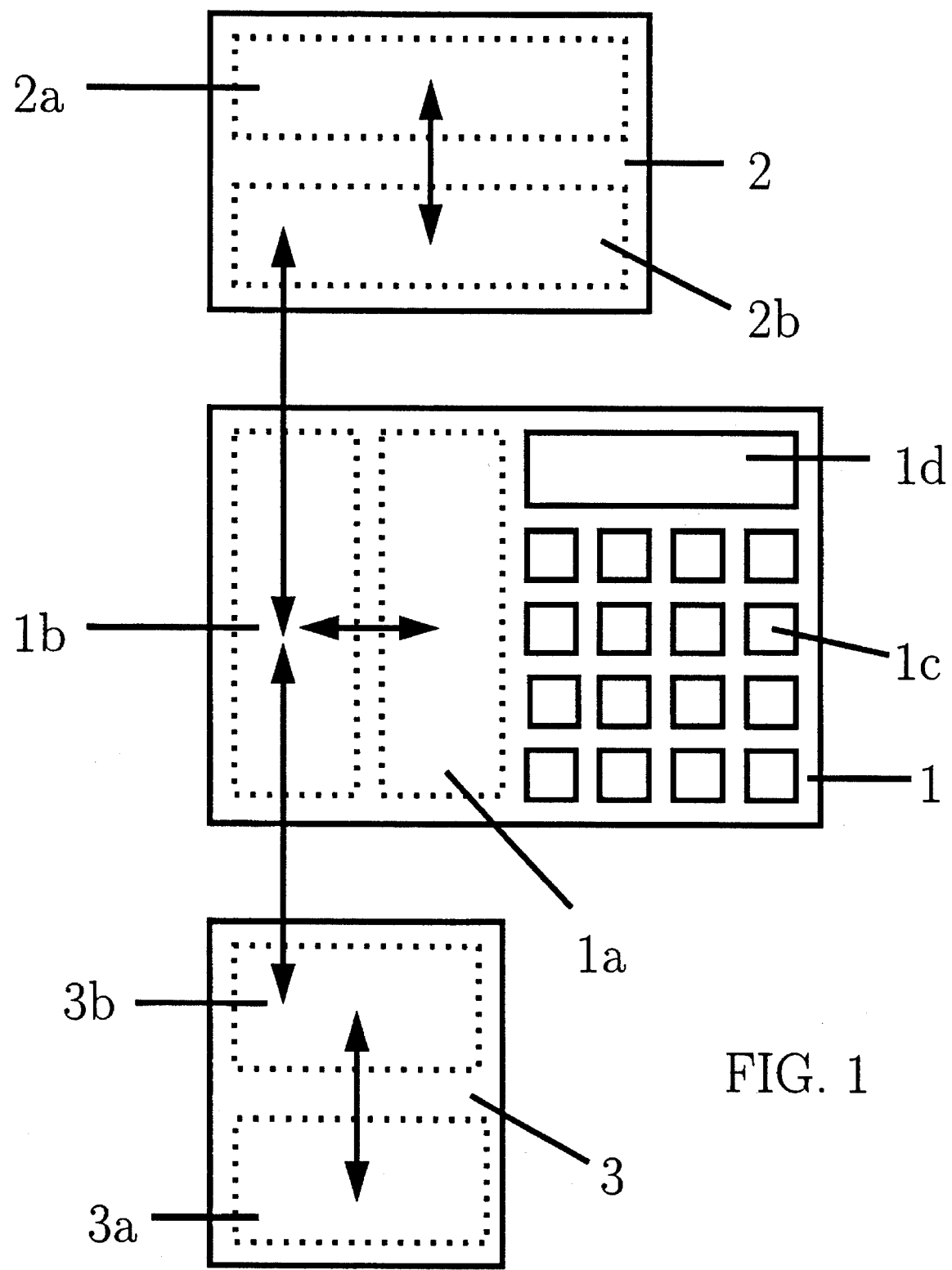
FIG. 1 shows a block diagram of a preferred embodiment including a workstation, external system, and an optional tamper-resistant computing device in accordance with the teachings of the present invention.

In accordance with these and other objects of this invention, a brief summary of the invention is presented. Some simplifications and omissions may be made in the following summary, which is intended to highlight and introduce some aspects of the present invention, but not to limit its scope. Detailed descriptions of two preferred exemplary embodiments adequate to allow those of ordinary skill in the art to make and use this invention will be provided later.

A computing device is held by a user who can control its internal operation (almost) completely. The user conducts transactions by transferring certified electronic information between one or more certifying parties and organizations.

Optionally, the computer device of the user needs assistance of a tamper-resistant computing device in order to successfully make such transfers. The tamper-resistant device represents the interests of certifying parties, and possibly also of the organizations. To guarantee that the tamper-resistant part does not compromise the untraceability of transactions conducted by its holder, the physical arrangement is such that the tamper-resistant part can only send information to its holder and, likewise, can receive information only from its holder. The only exception is that the certifying parties and/or organizations may perhaps store occasionally, or at least once before handing the device to a user, (additional) information into the tamper-resistant part, such as secret keys, that the user would need to know in order to transfer certified information without its assistance.

FIGS. 2, 3, 4, 14, 15, 16, 17, and 23 show particular instances for a first and a second preferred embodiment of what will be called a restrictive blind signature protocol. This inventive concept ensures that certified information is obtained in a blinded way, yet a certain structure in the message that was used as input to the protocol is still present in its blinded form (upon which a signature is computed by the user at the end of the protocol), regardless of the blinding transformation applied to it by the user. That is, the user can blind the input message of the protocol in a way that is sufficient to ensure untraceability of the blinded form and the corresponding signature, yet cannot get rid of certain information contained in the input.

All these flowcharts have the same structure, as will be readily apparent to those of skill in the art. As will be described in detail in the detailed description of the invention, they are all constructed by means of one of two inventive techniques for constructing such protocols based on identification protocols of a particular type well-known in the art. The flowcharts show the certifying party, $\mathcal{P}$, performing transformations on the input m to the protocol, defined by his secret key and responsive to a challenge of the user, $\mathcal{R}$. The actions of $\mathcal{R}$ serve to blind the input m to an output m', and to compute a corresponding signature by using the information supplied by $\mathcal{P}$.

Figure 5:
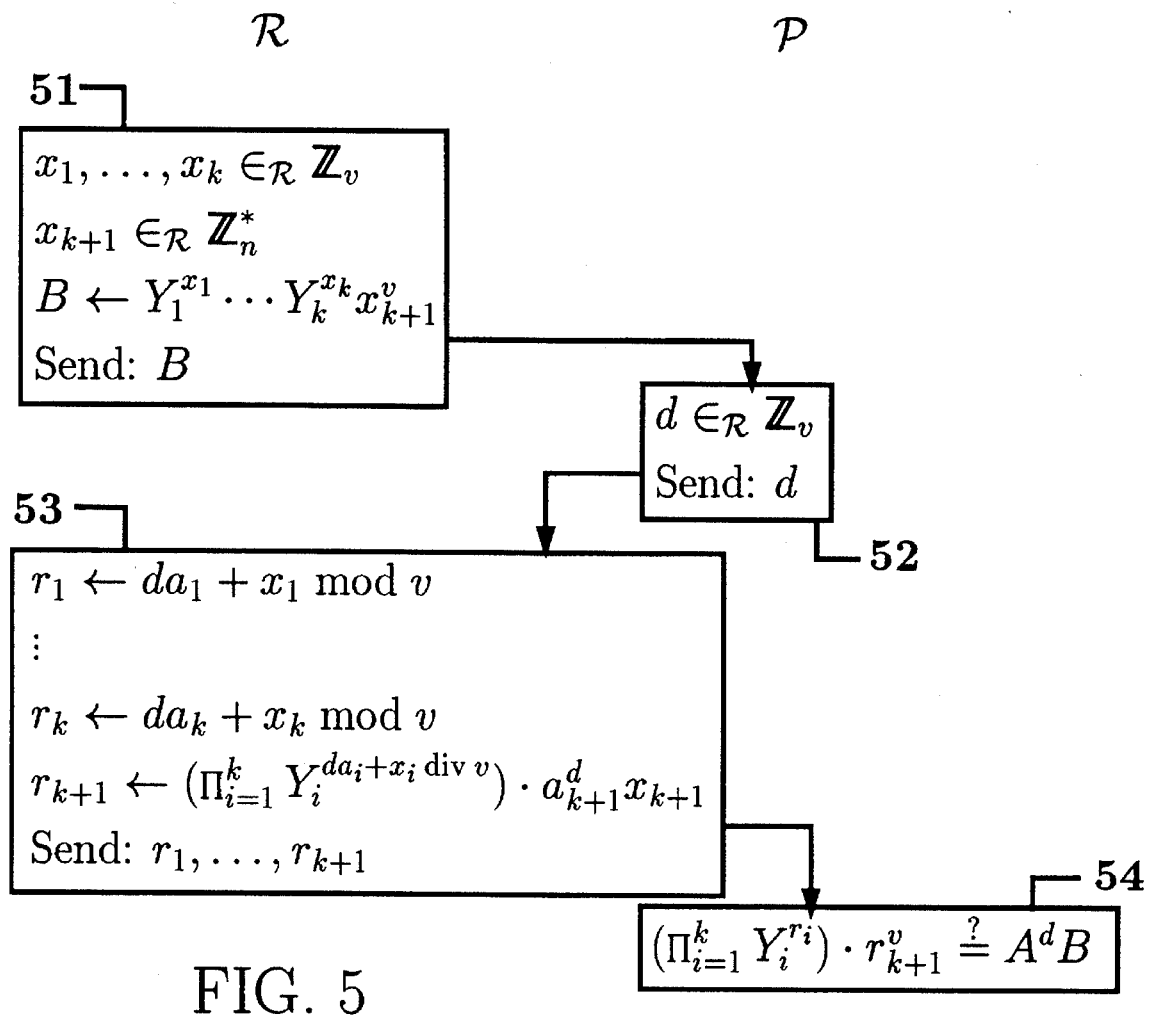
FIG. 5 show a flowchart of a proof of knowledge of a representation of a number A for the first preferred embodiment in accordance with the teachings of the present invention.
Figure 18:
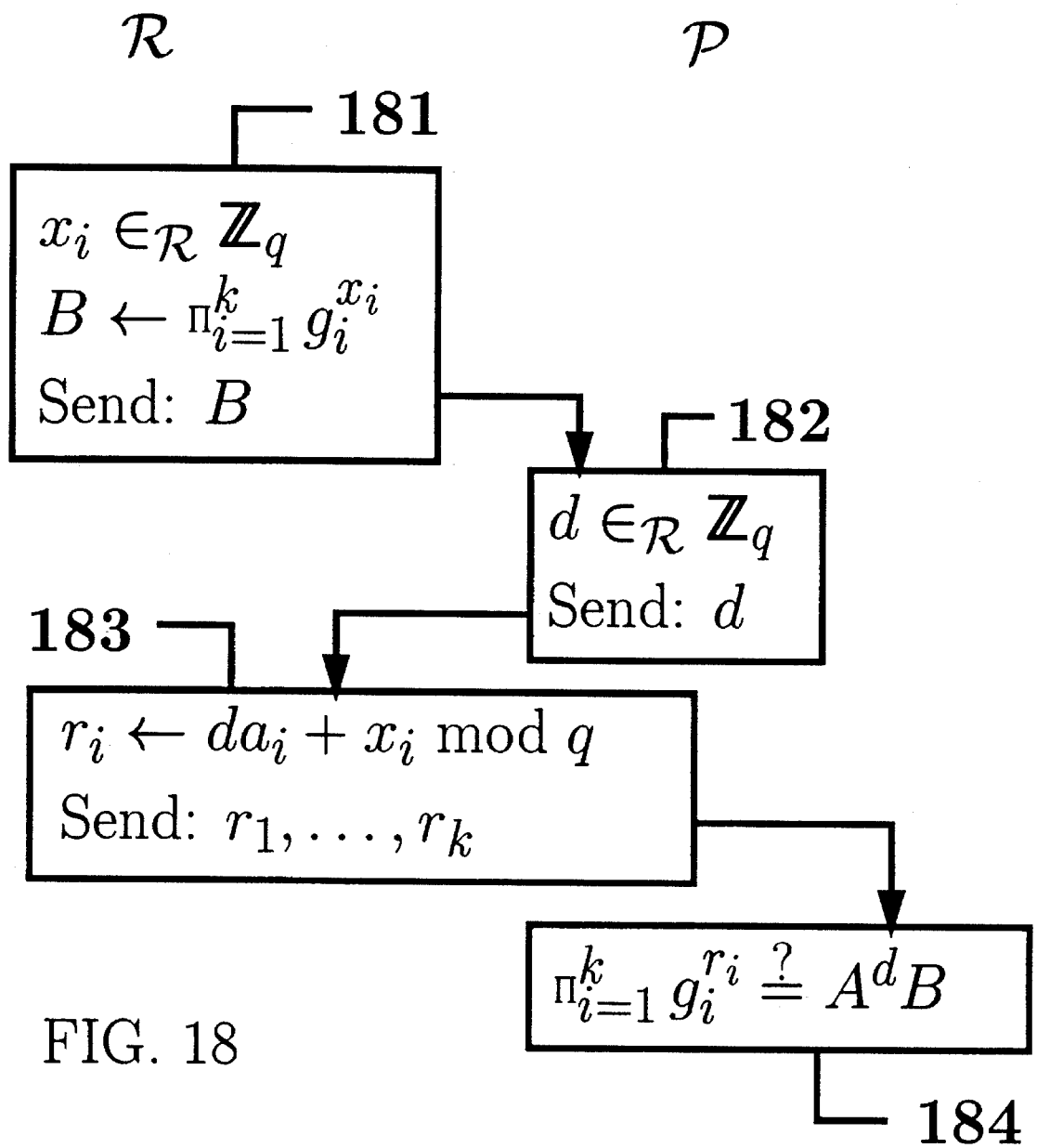
FIG. 18 shows a flowchart of a proof of knowledge of a representation of a number A for the second preferred embodiment in accordance with the teachings of the present invention.

FIGS. 5 and 18 show a protocol for the first and second preferred embodiments respectively, for proving knowledge of a representation of a number A to another party.

The other flowcharts are based on various inventive techniques for combining the restrictive blind signature protocols with the proofs of knowledge of a representation in such a way that the output m' of the former is used as the number A in the latter, such that the contained information in m' is in fact a function of the numbers in the representation that $\mathcal{R}$ proves knowledge of. The usefulness of this derives from the fact that $\mathcal{P}$ can install credentials in what is known to be the contained information in m that will be conserved while blinding; the representation the user performs the proof of knowledge for then still relates to the same credentials.

In the detailed description it will be shown how these basic protocols can be used to prove the presence of various kinds of structures in the representation known of A by any party.

Figure 6:
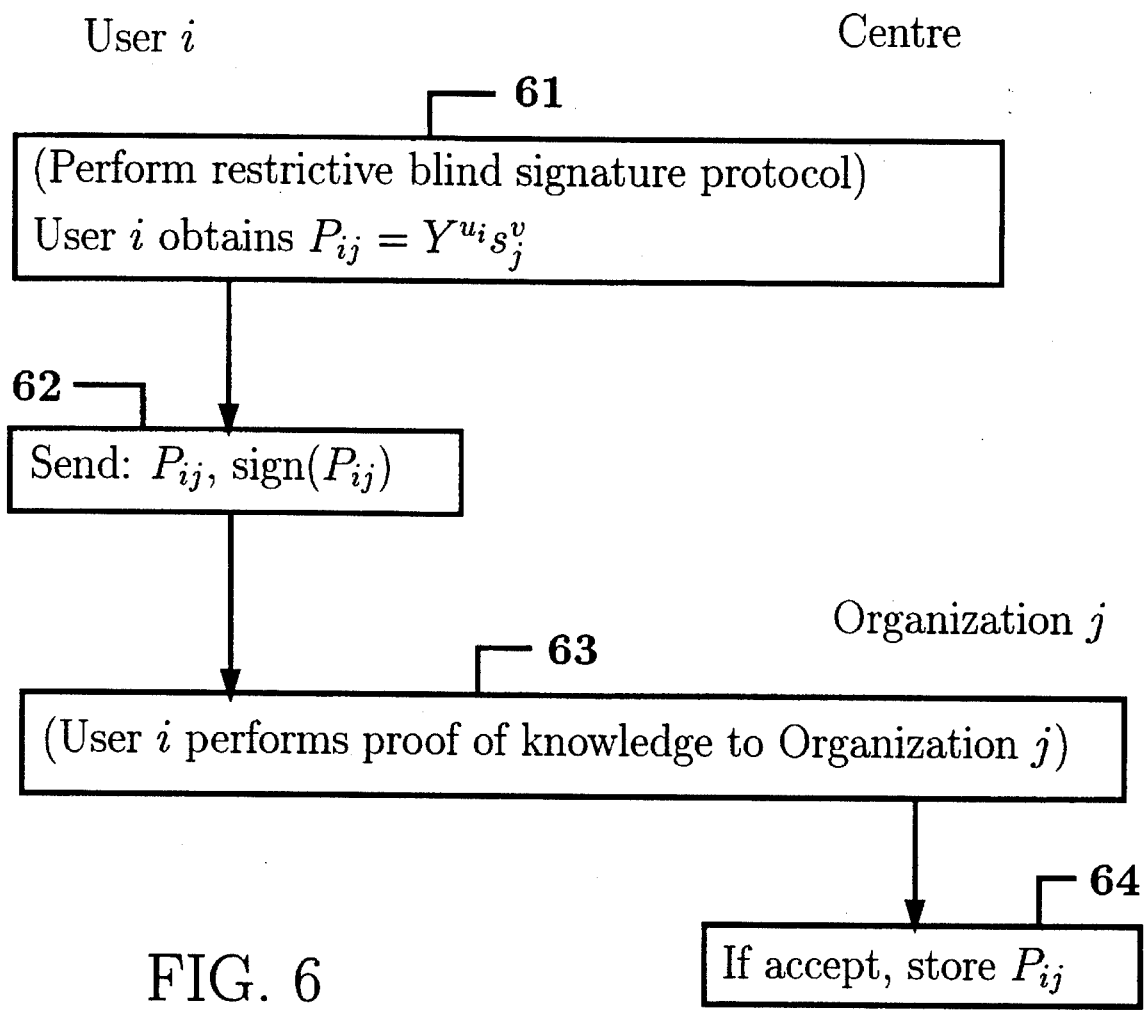
FIG. 6 show a flowchart of a protocol for establishing a pseudonym for the first preferred embodiment in accordance with the teachings of the present invention.

FIG. 6 shows how a restrictive blind signature protocol can be used to issue pseudonyms in credential mechanisms without needing the cut-and-choose technology. A number $u_i$ is encoded by the certifying party into the part of the input of the protocol that is known to be conserved while blinding the input; this number is different for each user. In this way, each user, $\mathcal{R}$, can obtain many pseudonyms for use at organizations that are all related, since the same number $u_i$ is encoded in the representations known by $\mathcal{R}$ of the pseudonyms.

Figure 7:
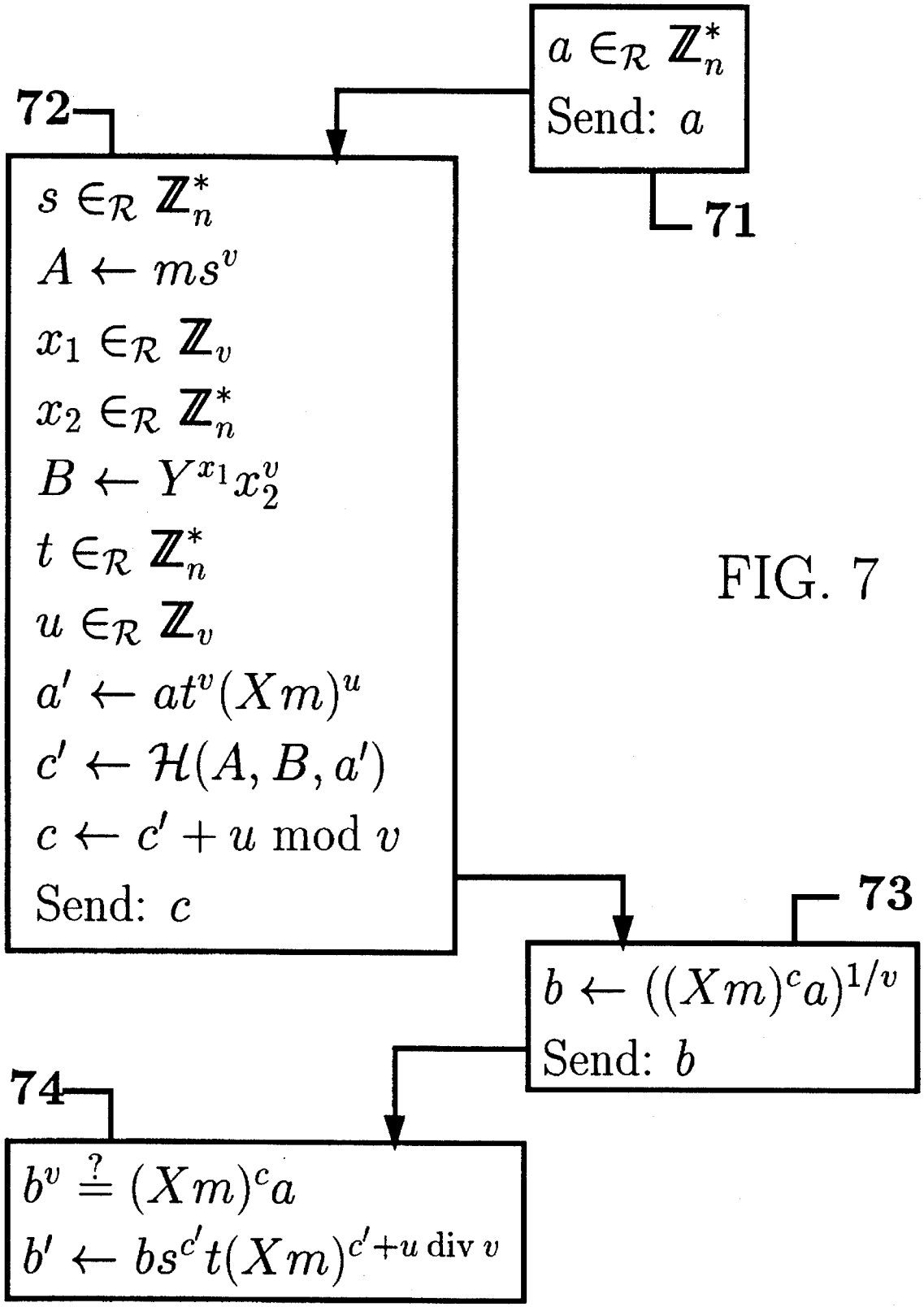
FIG. 7 shows a flowchart of a withdrawal protocol for a coin in a cash system for the first preferred embodiment in accordance with the teachings of the present invention.
Figure 8:
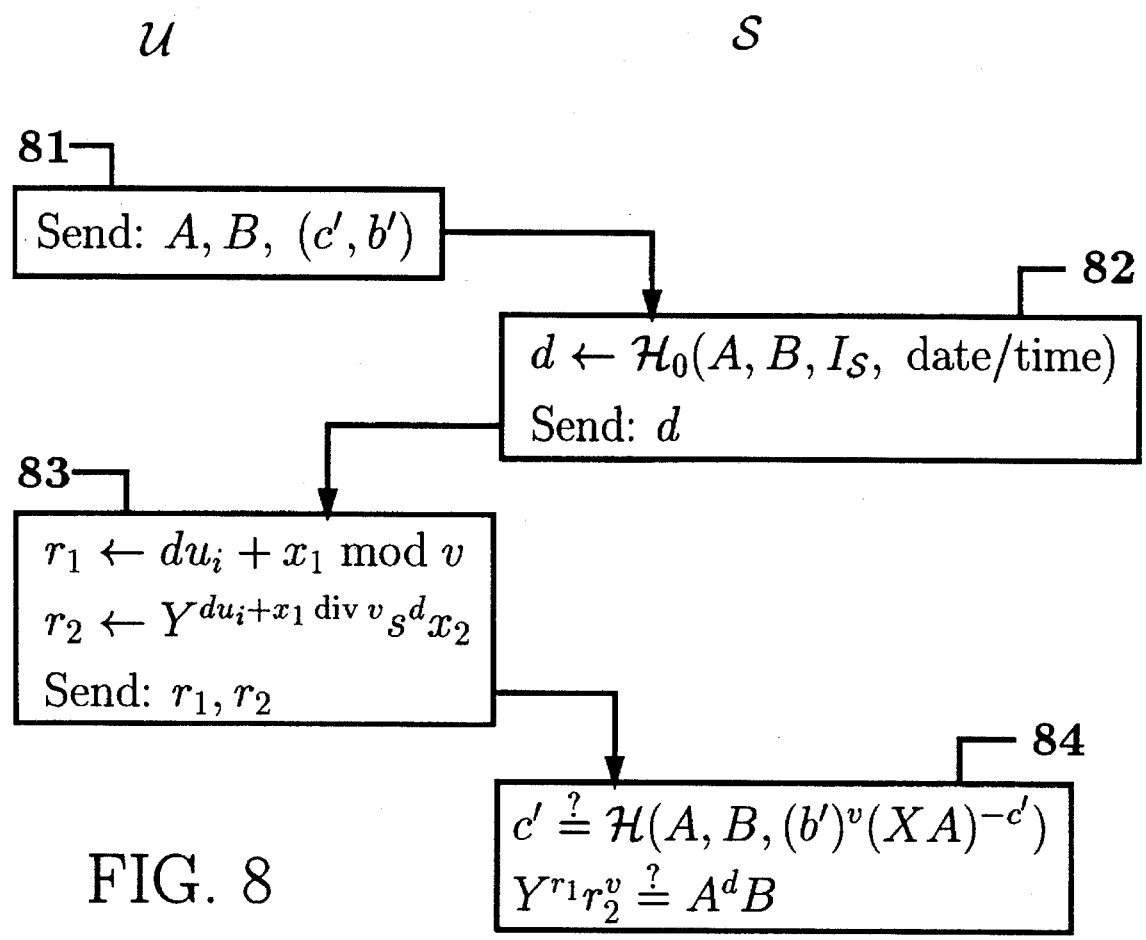
FIG. 8 shows a flowchart of a payment protocol for a coin for the first preferred embodiment in accordance with the teachings of the present invention.
Figure 19:
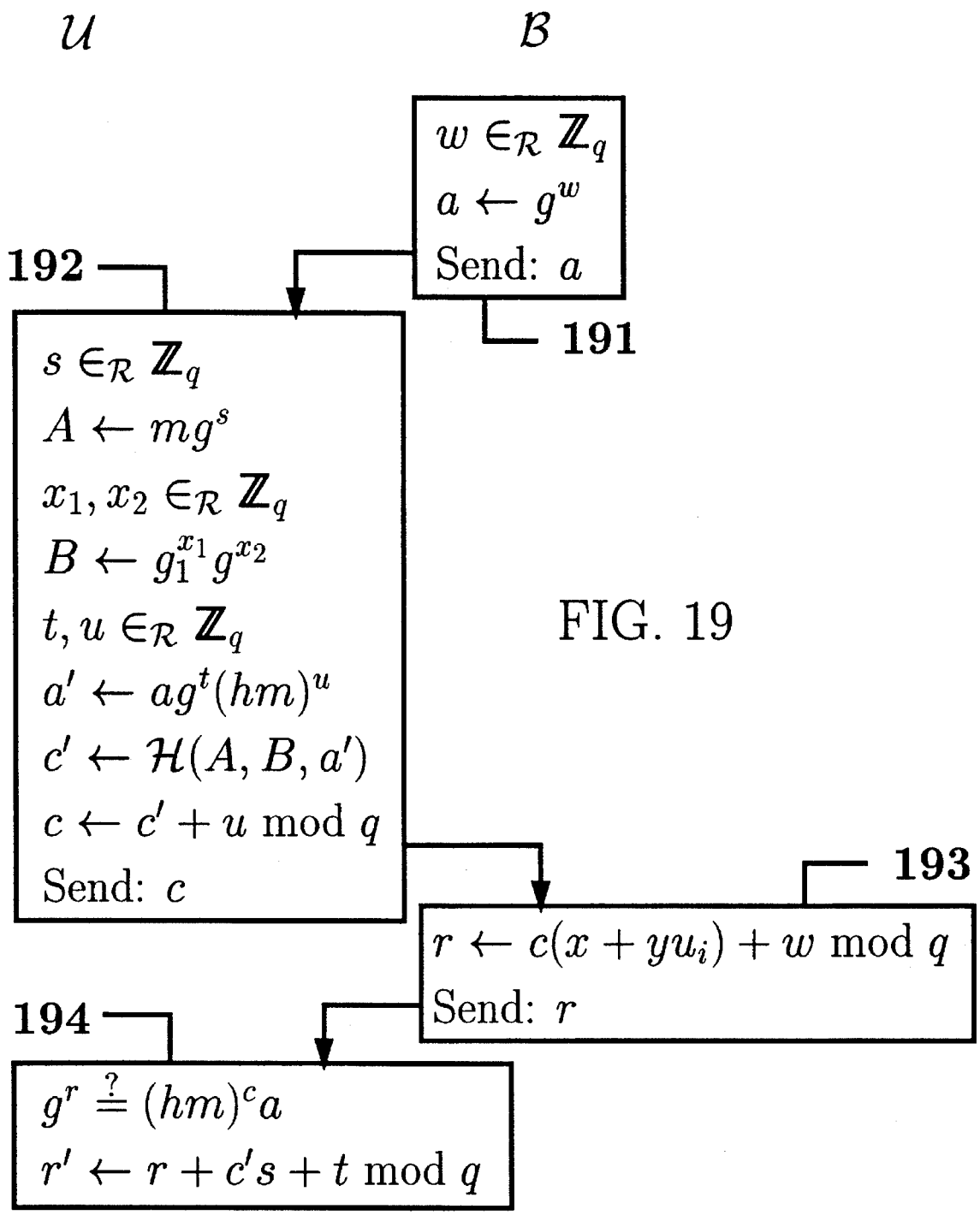
FIG. 19 shows a flowchart of a withdrawal protocol for a coin in a cash system for the second preferred embodiment in accordance with the teachings of the present invention.
Figure 20:
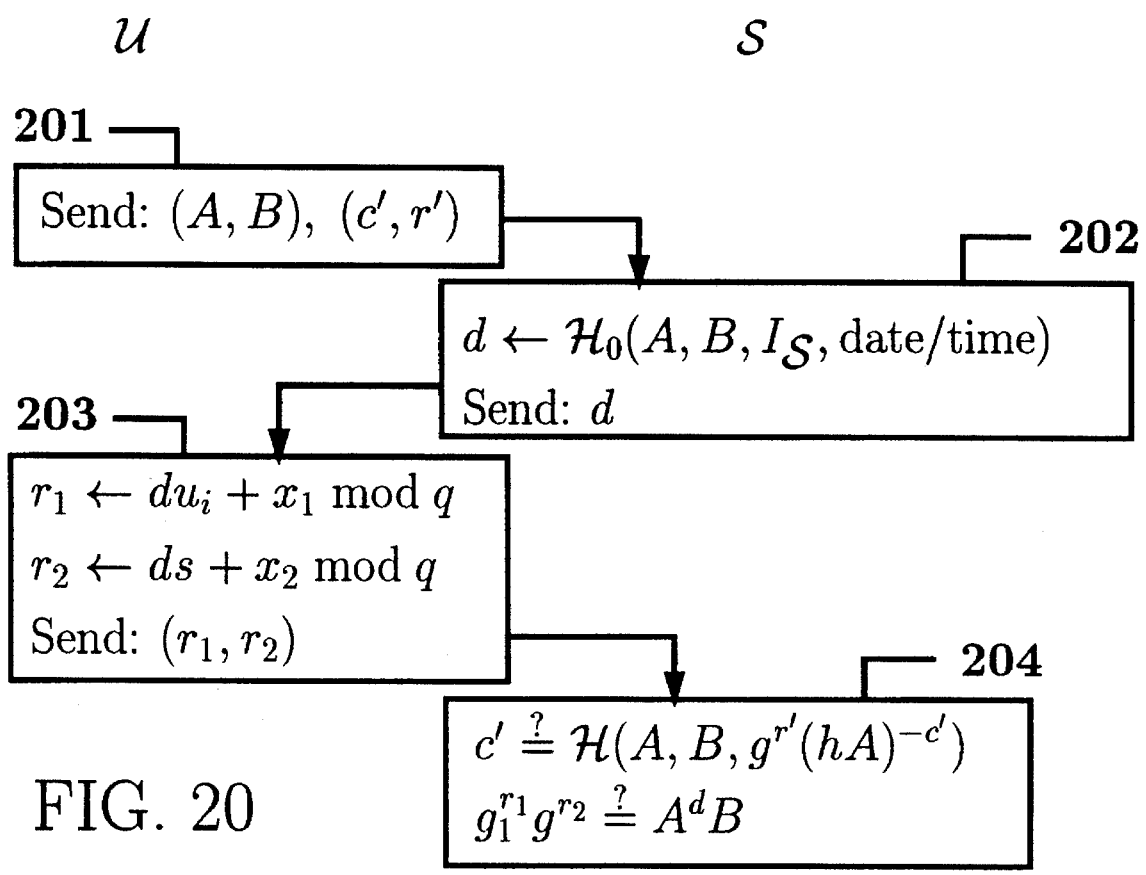
FIG. 20 shows a flowchart of a payment protocol for a coin for the second preferred embodiment in accordance with the teachings of the present invention.
Figure 24:
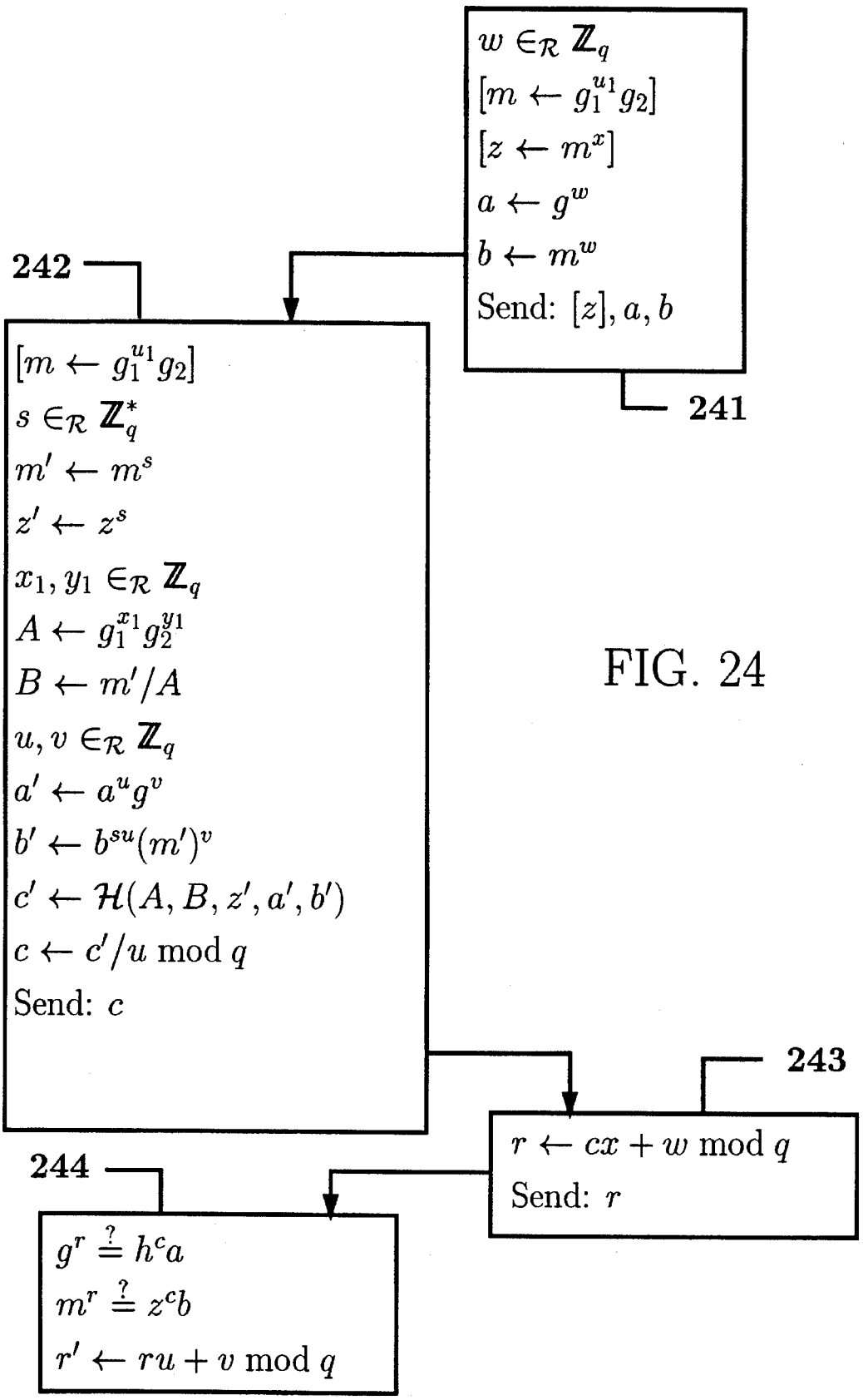
FIG. 24 shows a flowchart of a withdrawal protocol for a coin in a modified cash system for the second preferred embodiment in accordance with the teachings of the present invention.
Figure 25:
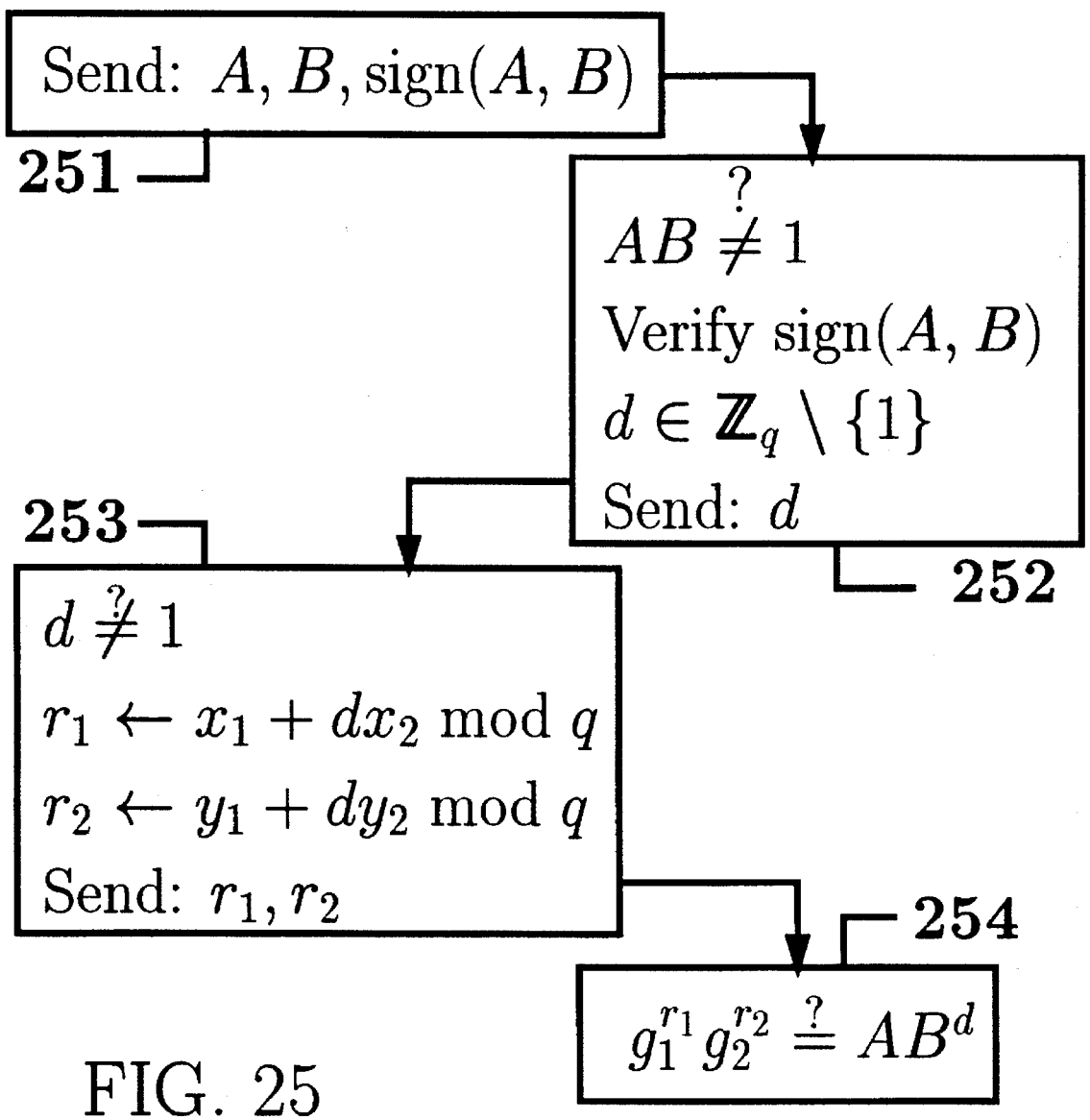
FIG. 25 shows a flowchart of a payment protocol for a coin for the second preferred embodiment in accordance with the teachings of the present invention.

FIGS. 7 and 8, and likewise FIGS. 19 and 20, show the withdrawal protocol and payment protocol for a basic off-line cash system. As will be appreciated, no ad hoc constructions are applied in these figures; FIGS. 7 resp. 19 are in effect minor modifications of restrictive blind signature protocols of FIGS. 2 and 14 respectively, and the payment protocols are in effect minor modifications of the protocols for proving knowledge of a representation. Paying twice with a withdrawn coin enables computation of the representation of A from the responses sent by the user in the payment protocol, and hence of the information contained in the input m to the withdrawal protocol. FIGS. 24 and 25 show the withdrawal protocol and payment protocol in the second preferred embodiment when another restrictive blind signature protocol is used, namely that of FIG. 23. As can be seen, hardly any modifications are needed. This illustrates the object of the invention to develop a compact set of algorithms and data structures that is robust under modifications and substitutions of other restrictive blind signature schemes. Furthermore, by setting the random choices of the computing device to fixed values, privacy can be switched off; in that case the bank $\mathcal{B}$ can compute c, and no interaction in the withdrawal protocol is needed. As will be appreciated, this means that privacy can be made optional without needing additional algorithms or data structures.

Figure 9:
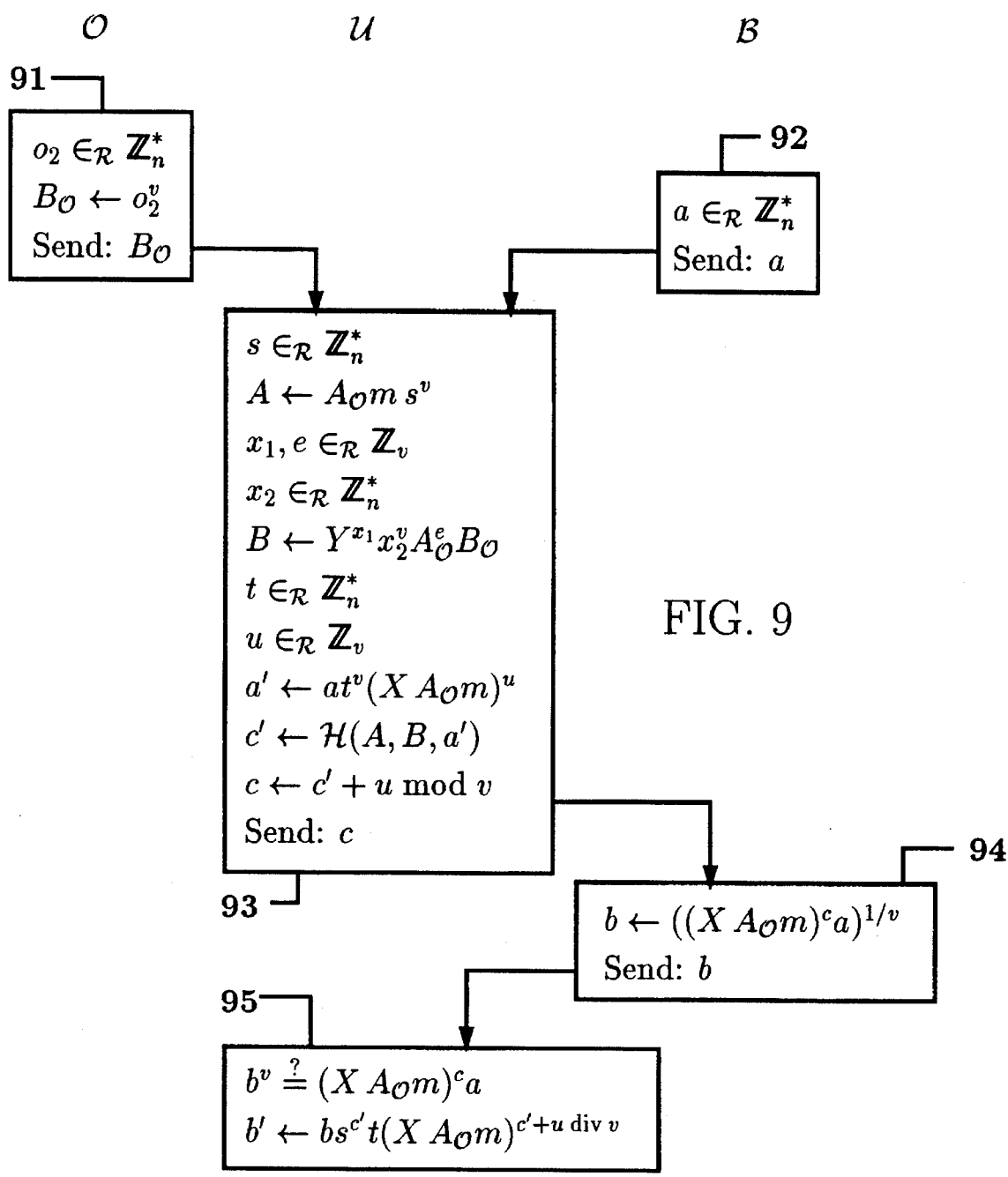
FIG. 9 shows a flowchart of a withdrawal protocol for a coin, when a tamper-resistant device must cooperate with the computing device of the user, for the first preferred embodiment in accordance with the teachings of the present invention.
Figure 10:
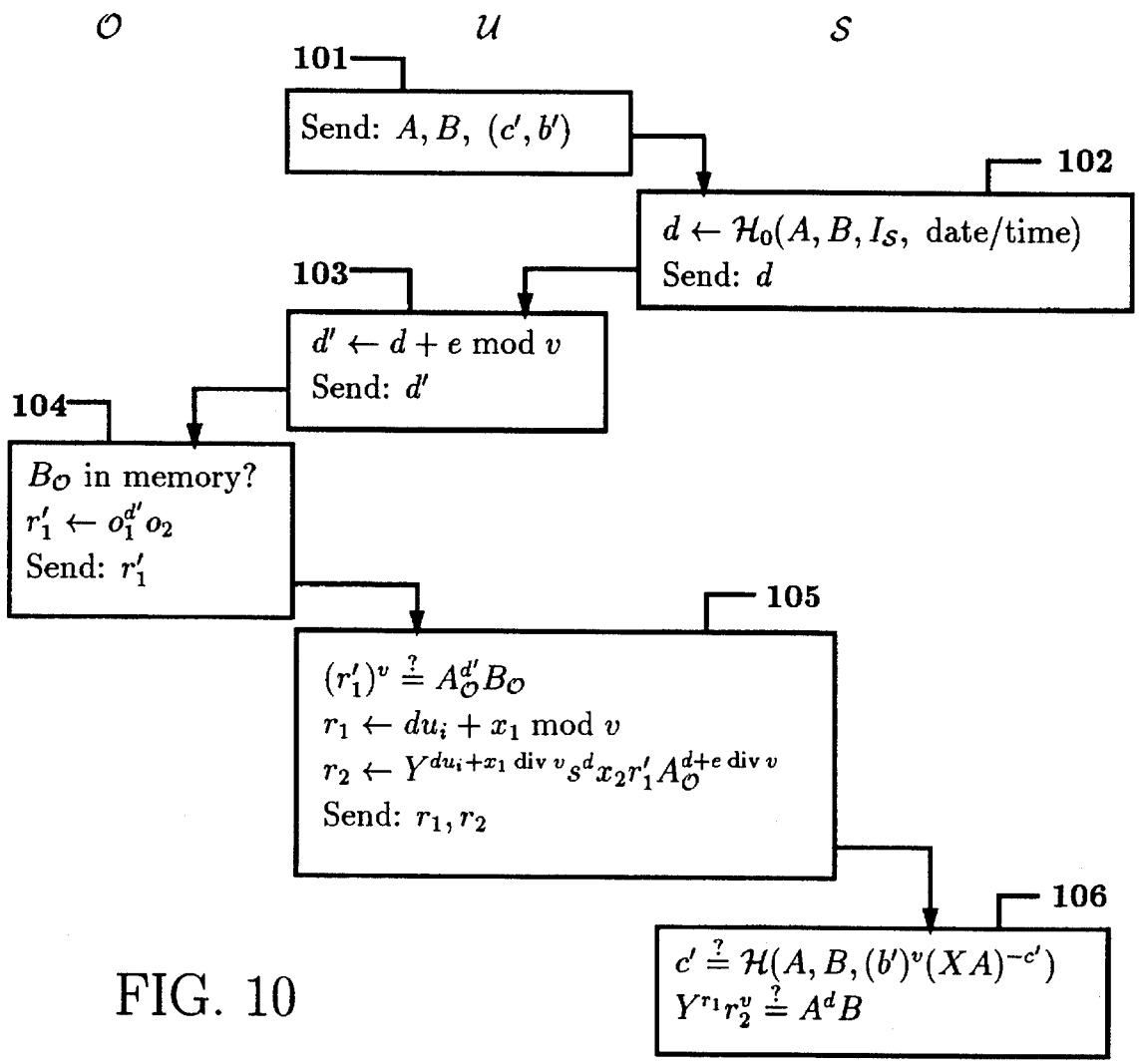
FIG. 10 shows a flowchart of a payment protocol for a coin, when a tamper-resistant device must cooperate with the computing device of the user, for the first preferred embodiment in accordance with the teachings of the present invention.
Figure 21:
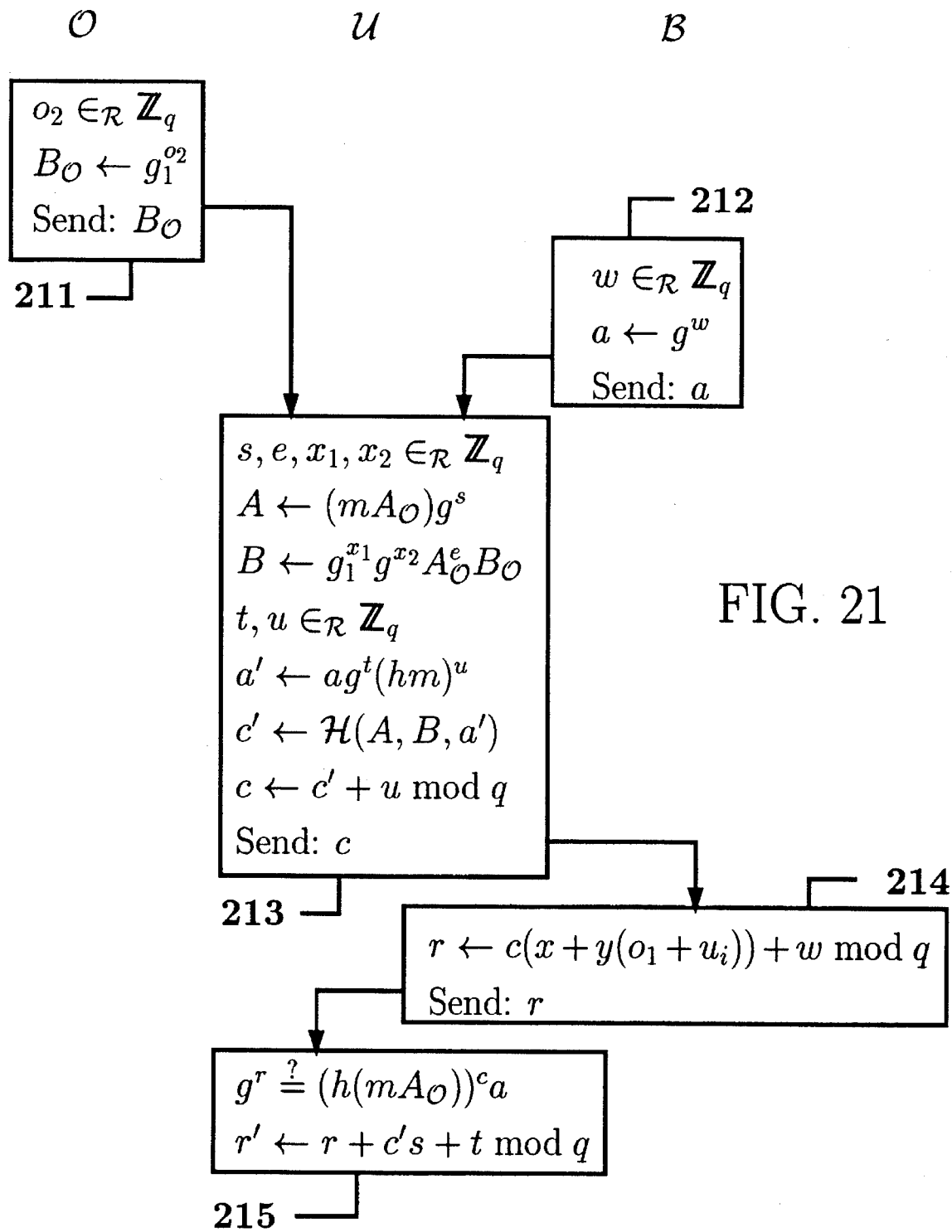
FIG. 21 shows a flowchart of a withdrawal protocol for a coin, when a tamper-resistant device must cooperate with the computing device of the user, for the second preferred embodiment in accordance with the teachings of the present invention.
Figure 22:
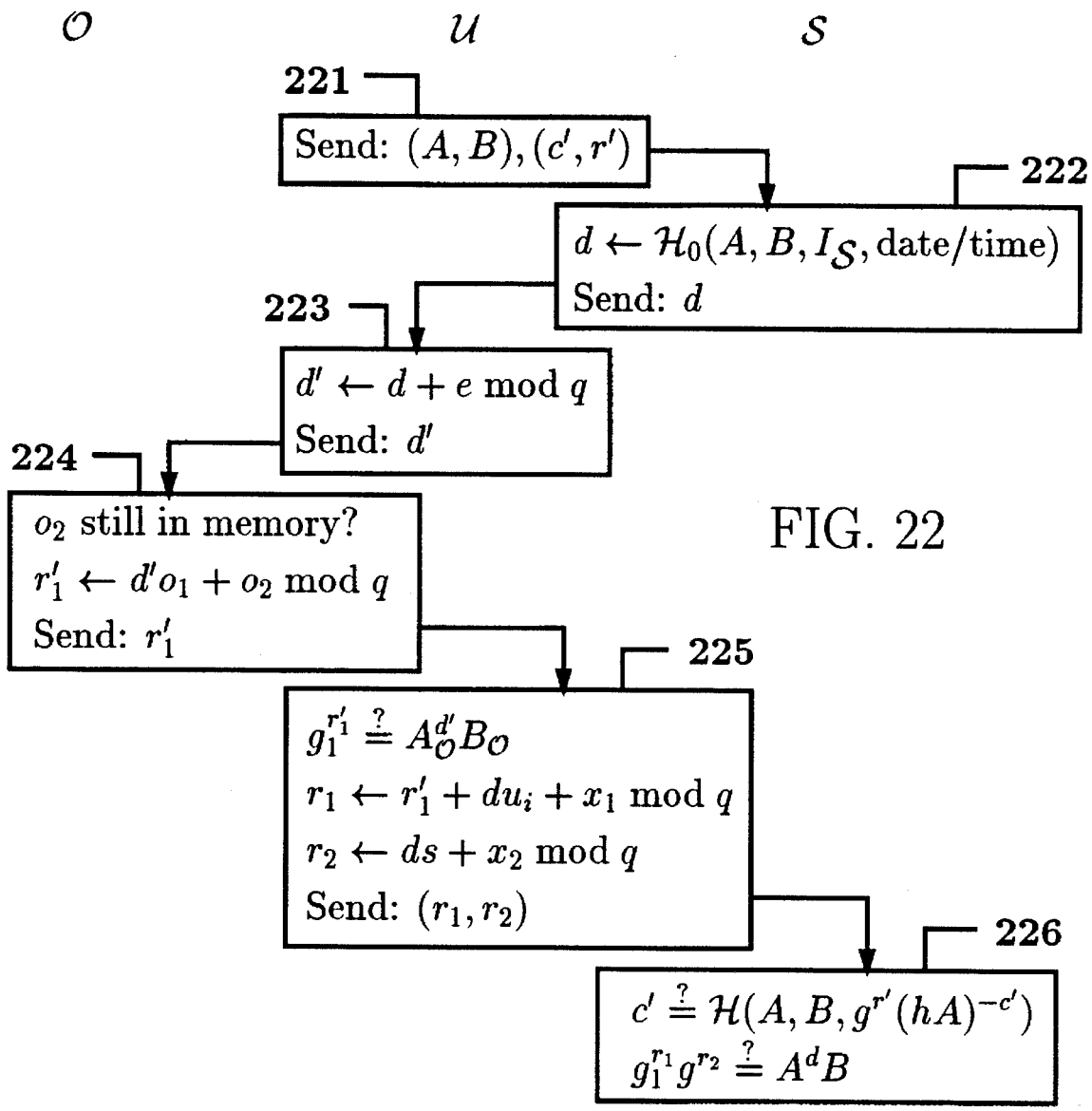
FIG. 22 shows a flowchart of a payment protocol for a coin, when a tamper-resistant device must cooperate with the computing device of the user, for the second preferred embodiment in accordance with the teachings of the present invention.

The protocols of FIGS. 9 and 10, and likewise those of FIGS. 21 and 22, show the withdrawal protocol and payment protocol for an off-line cash system in case tamper-resistant user-modules are applied. As before, this extension is realized in effect by applying slight modifications to the withdrawal protocols and payment protocols of the basic cash system. As will be appreciated, the shop, $\mathcal{S}$, in the payment protocols need not even be aware that a third party is taking part. Clearly the fact that no different protocol is needed is quite advantageous. Likewise, the actions that the bank must perform in the withdrawal protocol are also independent of whether the tamper-resistant part is used; the actions for the bank differ only from those in the basic system in a set-up phase that need be performed only once. The actions that need be performed by the tamper-resistant part are very limited. In fact, in the ensemble of withdrawal and payment protocols the actions of the tamper-resistant part are exactly those of the identification scheme that can also be used to construct the restrictive blind signature protocols which underly the withdrawal protocol. Yet, the user needs the assistance of the tamper-resistant part in order to compute the responses expected by the shop in the payment protocol.

At the same time, not only is it impossible for the tamper-resistant part to leak additional information to $\mathcal{S}$ or $\mathcal{B}$, or vice versa, it is even impossible for the tamper-resistant part, the bank and $\mathcal{S}$ to develop during the withdrawal and payment protocols numbers that are correlated; such numbers would enable tracing of payments of the user in case the tamper-resistant part is ever revealed to the bank. A further feature of the protocols is that the halting channel can be prevented, so that not even one bit of information can be leaked by halting (or delaying transmissions). To this end, in the payment protocol the user must then compute the challenge d from $\mathcal{S}$ by himself, as will be explained in the detailed description. In that case, all the interaction between the tamper-resistant part and the computing device of the user is merely pre-processing. In fact, the basic system is just a special case of this extension; by fixing the random numbers and secret keys of the tamper-resistant part to 0 for exponents and 1 for numbers in the base, "degeneration" to the basic system takes place.

Figure 29:
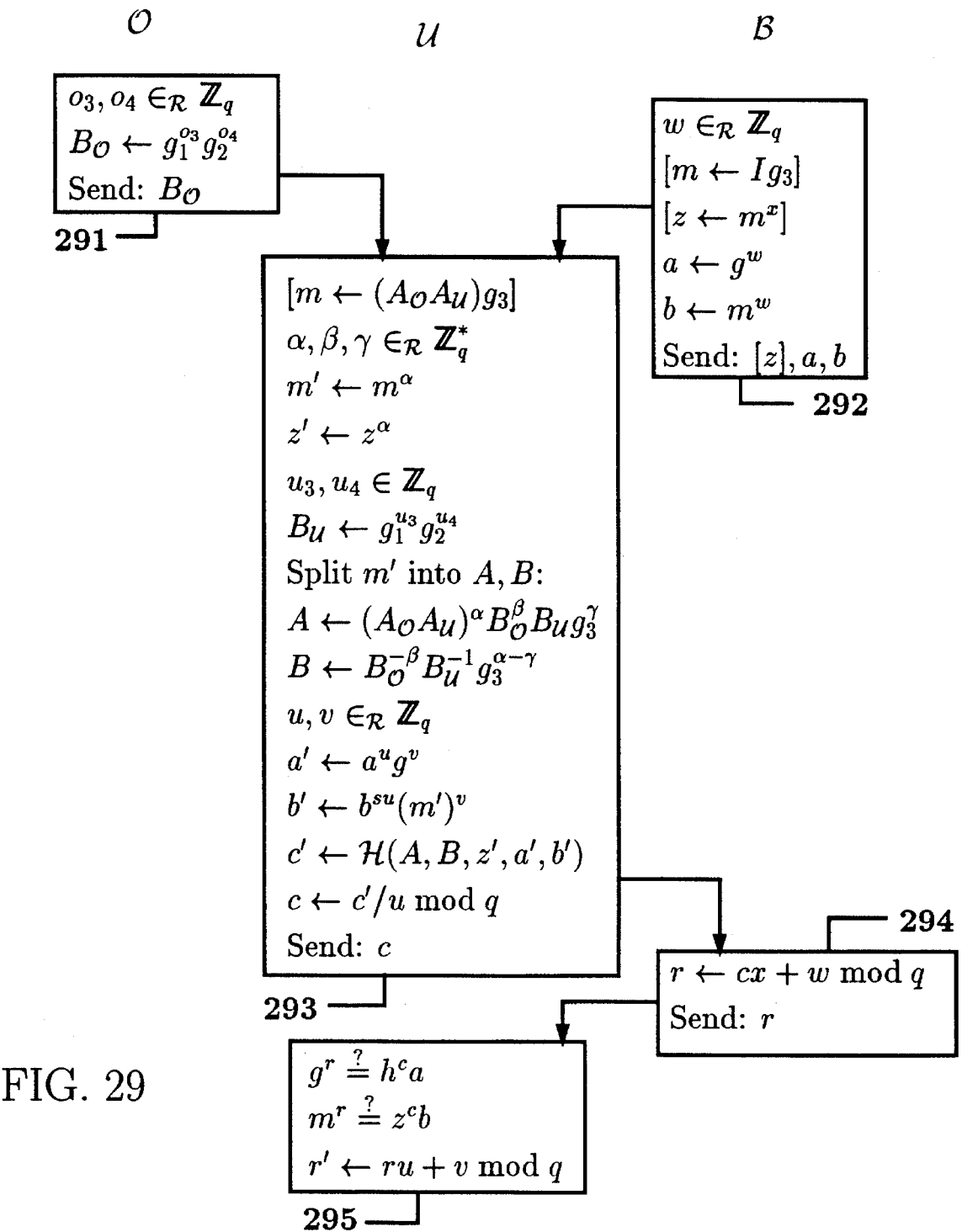
FIG. 29 shows a flowchart of a withdrawal protocol for a coin, when a tamper-resistant device must cooperate with the computing device of the user, for the second preferred embodiment in accordance with the teachings of the present invention.
Figure 30:
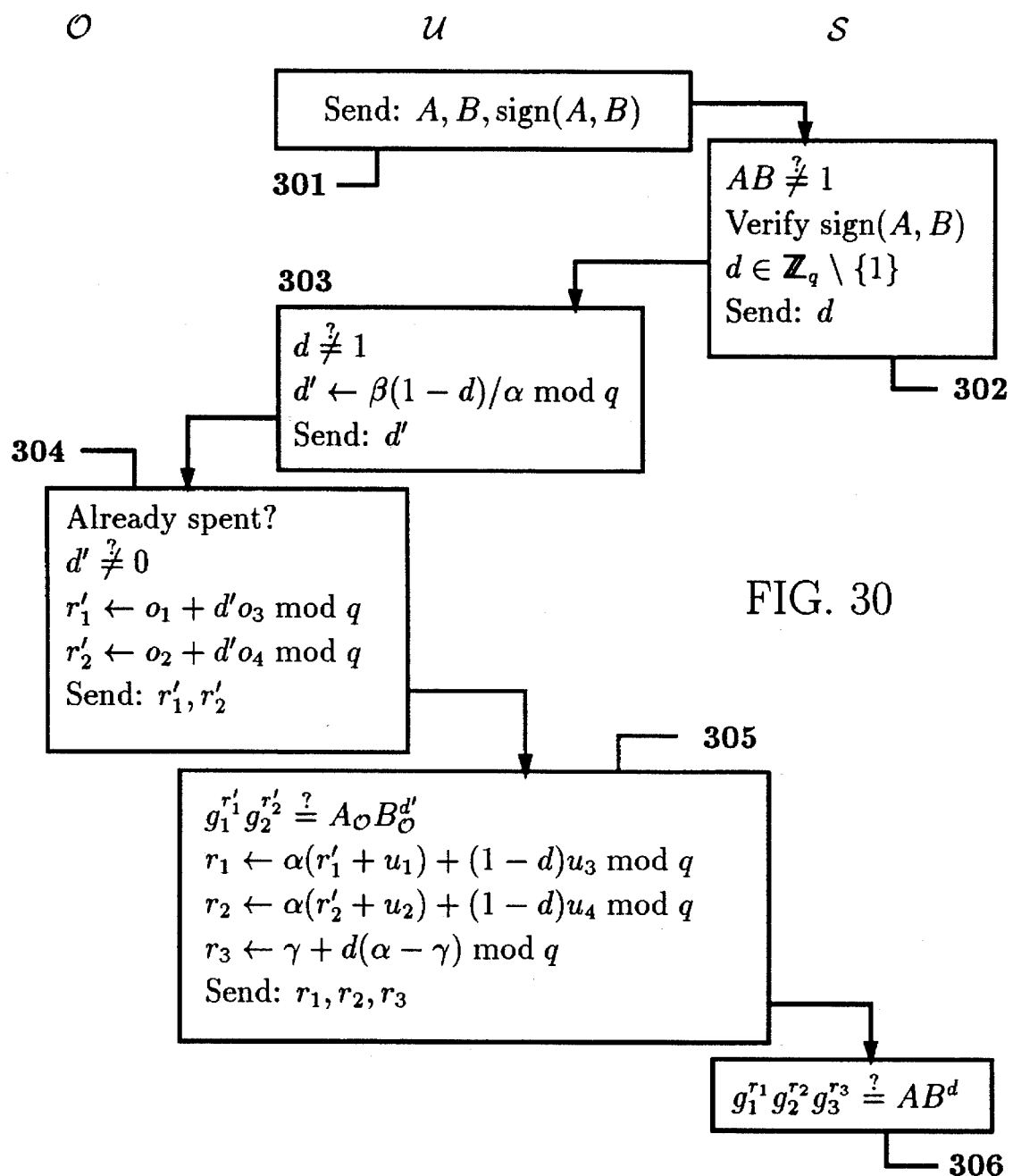
FIG. 30 shows a flowchart of a payment protocol for a coin, when a tamper-resistant device must cooperate with the computing device of the user, for the second preferred embodiment in accordance with the teachings of the present invention.

FIGS. 29 and 30 show similar protocols for the case when another restrictive blind signature protocol is used and the same remarks apply.

Figure 12:
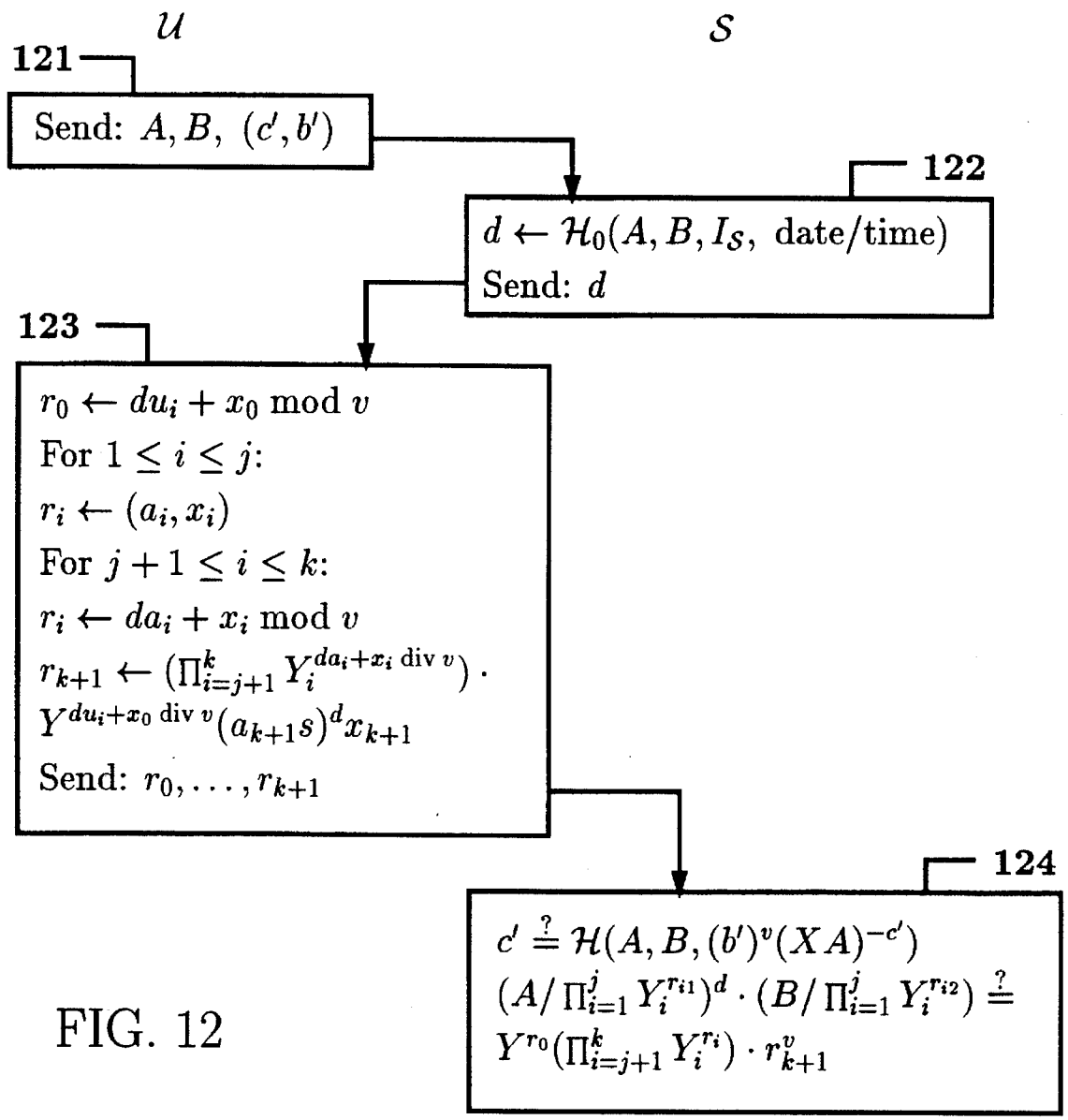
FIG. 12 shows a flowchart of a payment protocol for a cheque for the first preferred embodiment in accordance with the teachings of the present invention.
Figure 13:
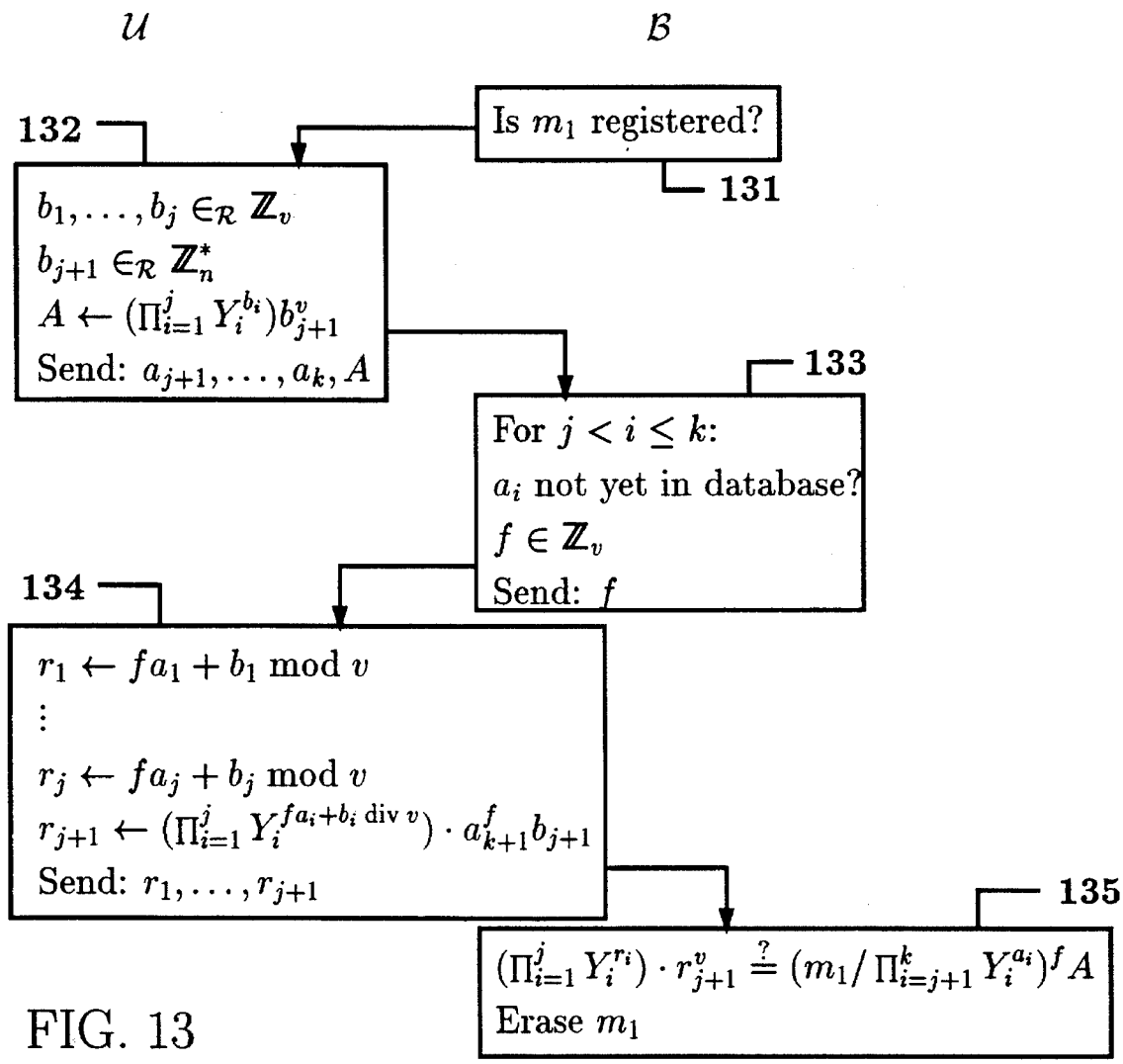
FIG. 13 shows a flowchart of a refund protocol for cheques for the first preferred embodiment in accordance with the teachings of the present invention.
Figure 31:
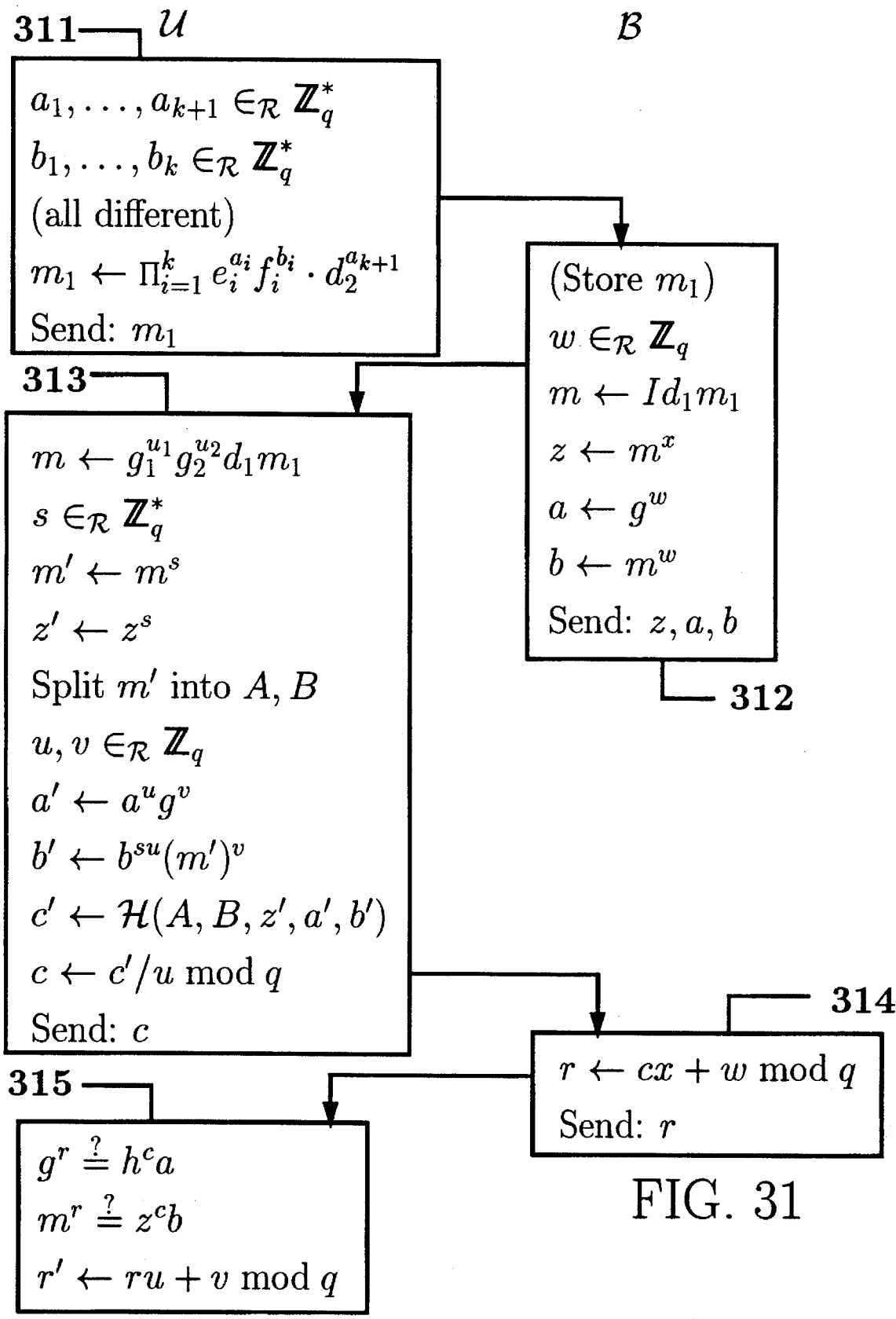
FIG. 31 shows a flowchart of a withdrawal protocol for a cheque for the second preferred embodiment in accordance with the teachings of the present invention.
Figure 32:
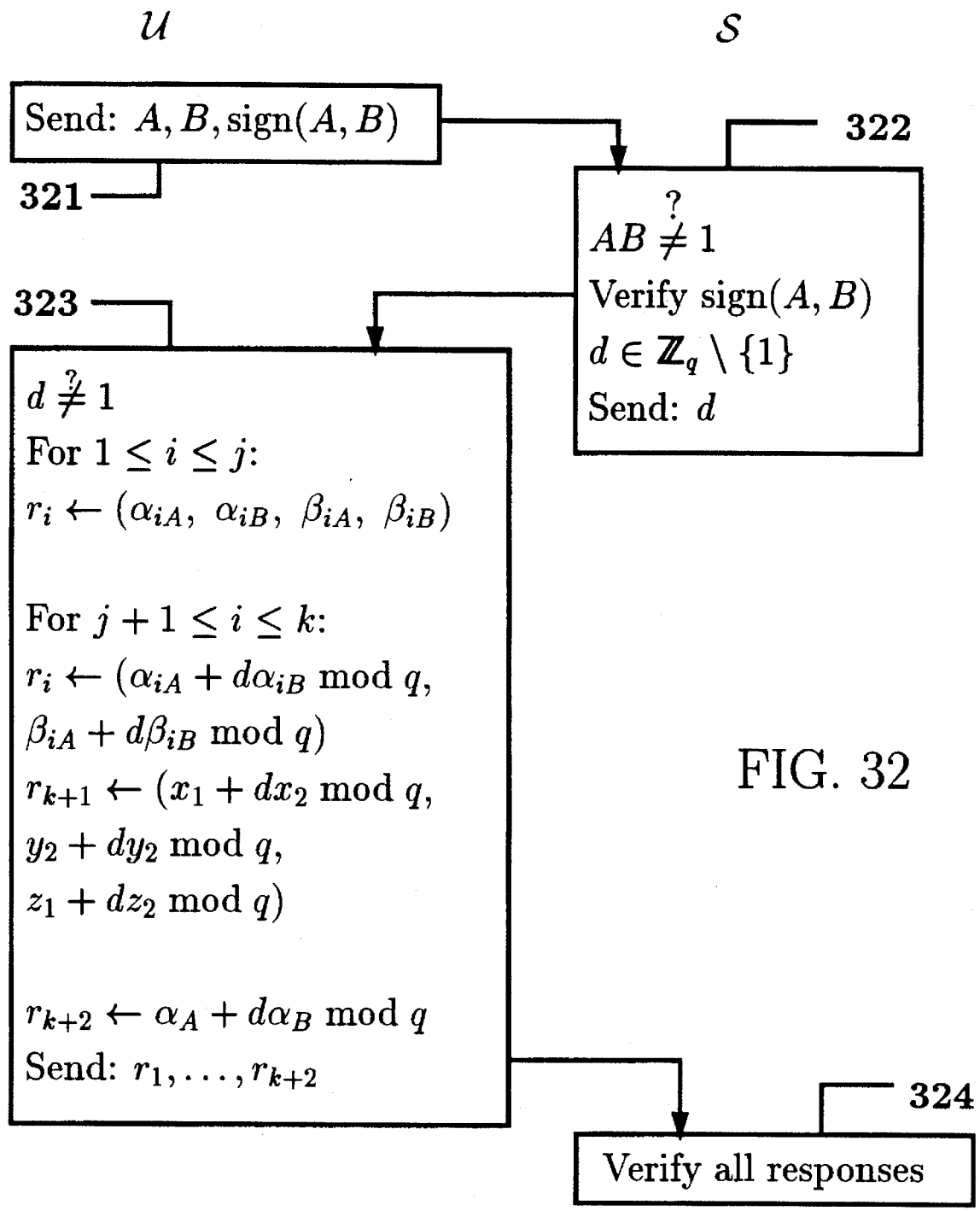
FIG. 32 shows a flowchart of a payment protocol for a cheque for the second preferred embodiment in accordance with the teachings of the present invention.
Figure 33:
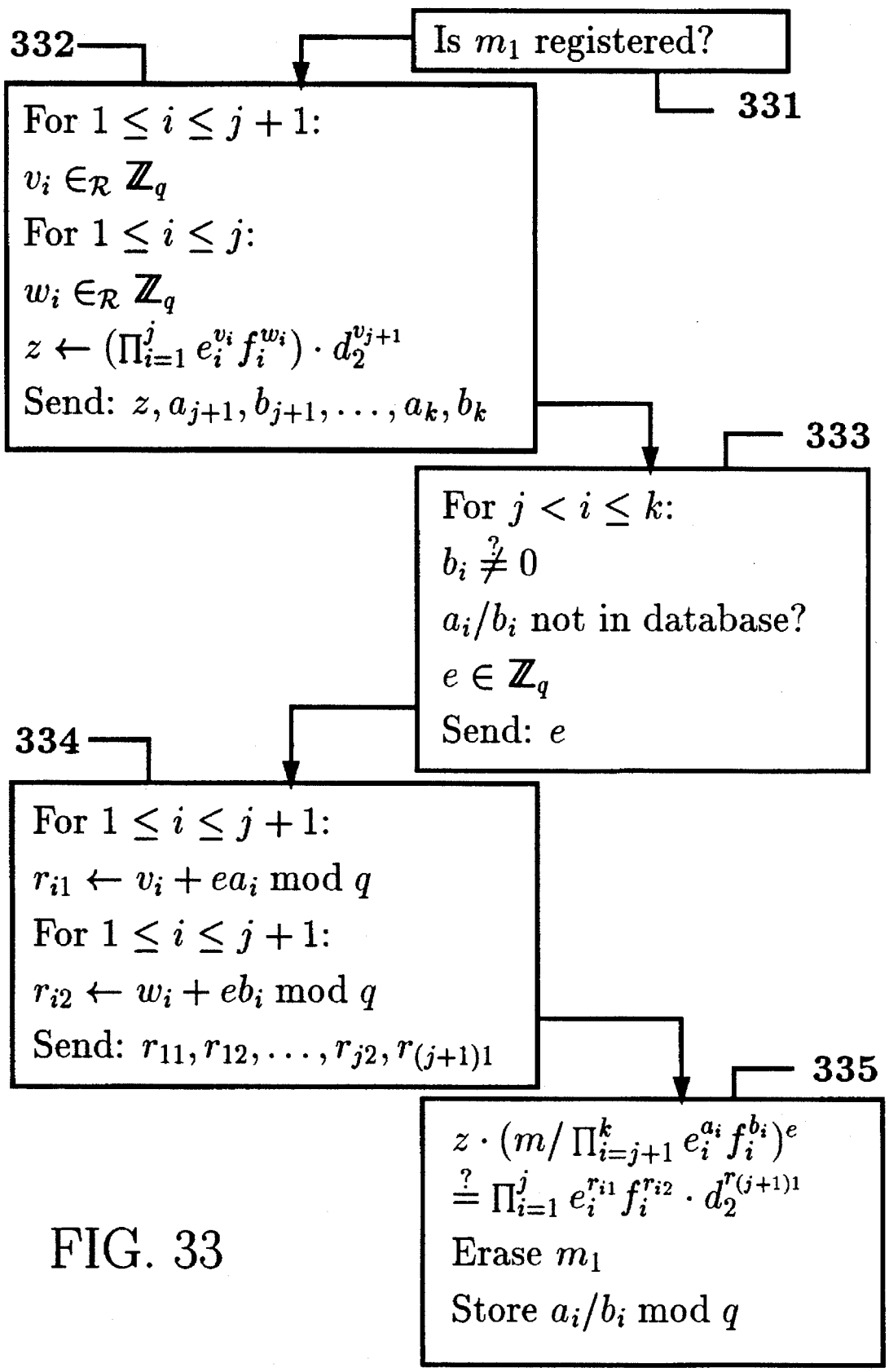
FIG. 33 shows a flowchart of a refund protocol for cheques for the second preferred embodiment in accordance with the teachings of the present invention.

FIGS. 11, 12, and 13, and likewise FIGS. 31, 32, and 33, show protocols for the dealing with electronic cheques. The respective first protocols show the withdrawal of a cheque; they are, again, very similar to the withdrawal protocols of the basic system. The main difference is that the user performs additional actions that result in a number m that is multiplied by the bank with $m_1$ to obtain the input to the protocol. This is an example of a general technique made possible by repeated use of restrictive blind signature protocols that allows the certifying party to install new credentials into a number, without it needing to know what the credentials in the number are. The respective second protocols describe the payment protocol for cheques, these being once more very similar to the payment protocol in the respective basic systems. The respective third protocols are new: they allow the user to obtain a refund for the part of the cheque that was not spent in the payment protocol. As will be appreciated from the detailed description, this protocol is in effect a slight modification of the protocol for proving knowledge of a representation.

Figure 34:
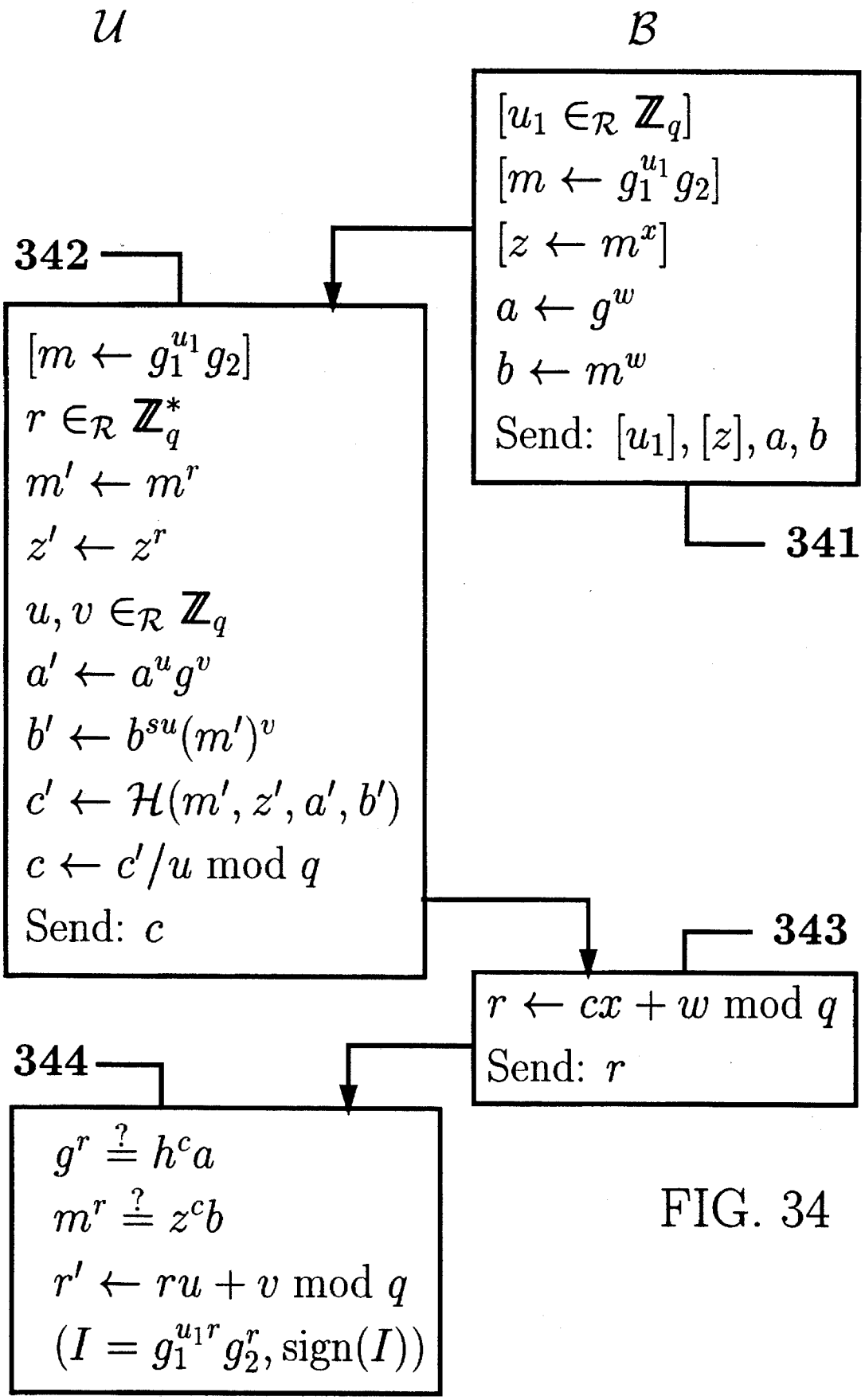
FIG. 34 shows a flowchart of a pseudonym-issuing protocol for the second preferred embodiment in accordance with the teachings of the present invention.

Finally, FIG. 34 shows a protocol for opening an anonymous account. This protocol must precede the withdrawal protocol of the cash system, without needing any further modifications. As will be appreciated from the detailed description, this protocol is in effect a restrictive blind signature protocol.

The flowcharts in the figures are all straightforwardly derived from more general inventive techniques applicable to restrictive blind signature protocols. These will be described in the detailed description, and they can be applied to construct general credential mechanisms. For example, the extension to cheques is based on two such techniques: the first consists of the ability of the certifying party to install new credentials by taking a function of a number as input to the protocol, this function being determined by itself. In FIGS. 11 and 31 this function is a simple multiplication of m by a number determined by the user. The extension to anonymous accounts serves as another example: this is based on the fact that the output of an earlier execution of the protocol can be used as the new input to a later execution of the protocol. Another example is the technique to prevent framing: this stems directly from the fact that restrictive blind signature protocols exist for which the certifying party does not need to know the information contained in the input.

A further illustration is provided by the fact that the cash systems are in fact a method for transferring certified information that may only be shown a limited number of times between organizations, such that one can transfer the information to any organization regardless of whether one has a pseudonym with that organization. The restrictive blind signature protocols allow for general techniques to transfer limited-show credentials as well as credentials that may be shown as often as desired (in the detailed description actually limited-show credentials will be separated further into one-show and multi-show credentials), as well as for general techniques that allow credentials to be shown only to all organizations at which one has a pseudonym, to only one such organization, or to any organization at all. In total, this gives six combinations, of which the cash systems are only one. Using the techniques such as to realize one of the five other combinations, cash systems in which users can only pay under pseudonym can be constructed (see detailed description). As will be obvious to those of moderate skill in the art, one can readily combine these two types of cash systems, such that users can pay at certain organizations regardless of whether they have pseudonyms, and at others only if they have a pseudonym at that organization.

The broad applicability of these general techniques to construct credential mechanisms will be appreciated in particular when the sections in the detailed description that deal with application to credential mechanisms are read.

DETAILED DESCRIPTION OF THE INVENTION

While it is believed that the notation of FIGS. 2 to 34 would be clear to those of ordinary skill in the art, it is first reviewed here for definiteness.

The actions performed by the parties participating in the protocols are grouped together into flowchart boxes. The party performing the actions described in a flowchart box is indicated by the column that box is in. The columns are labeled by a symbol denoting the type of party.

The symbol "←" denotes assignment, meaning that the variable or symbol on its left-hand side is assigned the value or values on its right-hand side to. Several of such assignments do not imply that actually storage space must be reserved; it might be merely an intermediary computation performed in RAM with further operations successively performed on it.

Another operation is a test for equality, which is indicated by the $\stackrel{?}{=}$ symbol. As is common in the art, the protocol halts in case the equality does not hold. Likewise, the sign $\neq$ denotes a test for inequality.

The symbol $\in \mathcal{R}$ indicates that the number or numbers on its left-hand side are chosen from the set on its right-hand side according to a uniform probability distribution, and independently of anything else. Preferably a physical random number generator should be used for this, possibly in conjunction with additional post-processing. In practice, pseudo-random techniques may be used. As will be obvious to those of ordinary skill in the art, a better approximation by the sampling distribution of the independent uniform distribution guarantees better privacy or security. "Generating a number at random from a set" ("generating a random number") in the text indicates the same. In case the symbol $\in$ is used, it indicates that the number d need not be determined according to an independent uniform distribution; in particular, the number on the left-hand side may be determined from the set on the right-hand side in a manner specified in the corresponding description of the box in the text.

Another action is denoted by the word "Send," followed by a colon and one or more numbers. This indicates that those numbers are sent by the party performing the actions described in the box to another party participating in the protocol. The receiving party is indicated by the connections between the flowchart boxes.

Some actions have to be performed only one for each participating other party or parties. Such actions are displayed between square brackets.

Various actions are described by words, such as "Split m' into A,B," sign(m), "Verify sign(m)." In such a case, the corresponding description in the text specifies the meaning of the action. In any case, this will only be done in case the same actions have already been displayed in foregoing flowcharts.

In the general description of restrictive blind signature protocols, the certifying party will be denoted $\mathcal{P}$ by and the user by $\mathcal{R}$.

In the particular case of off-line cash systems, the various participants in the protocols will be denoted by the following calligraphic symbols:

$\mathcal{B}$=bank (certifying party)

$\mathcal{U}$=account holder user $\mathcal{S}$=shop (organization)

$\mathcal{O}$=tamper-resistant bank-module

Turning now to FIG. 1, a description of the apparatus in which the invention is to be implemented will now be described in detail.

Block 1 represents a computing device held by the type of party referred to as user. It contains processing means 1b, memory means 1a, data entry means 1c, and data/message display means 1d. These means are interfaced by suitable means not shown for clarity; only the interface between memory means and processing means is indicated by a double-sided arrow. Such interface means are well known in the art. Block 1 also contains two communication interfaces to be described.

The computing device of the user may come in various sizes and capabilities. It can be a smart card, and so be of the size of current credit cards. In case the smart-card does not have its own power supply, as is currently the case, it might be supplied with current by connecting it to other means in case it must perform actions, such as by another party in a protocol or by another device owned by the user.

The computing device of the user can alternatively be a palm-top computer, a personal computer, or a more powerful workstation. It can even be a part of a multimedia apparatus such as an interactive TV set or the remote control thereof. It might also be a smart telephone, facsimile or the like. As will be appreciated by those of ordinary skill in the art, the embodying apparatus can come in a great many forms, only limited by ones imagination.

Clearly, the data/message display will differ in accordance with the embodiment of the device of the user. For example, for a personal computer it can be the monitor, and for a smaller embodiment such as a palmtop computer it can be an LCD dot matrix display. The same holds for the data entry means: for a personal computer it will be the keyboard, whereas for a smart phone it can be the dialing buttons.

The communication interfaces might be by direct electrical connection, or by electro magnetic waves, sound waves, and the like. For example, in case the device of the user is a personal computer in a Wide-Area-Network, data can be send through the wires of the network, and for a remote control device infra red technology can be used.

Of course, any suitable technologies for accomplishing these functions may be used.

As will be appreciated, the computing device of the user can be fully under his own control; he might even build it himself, or buy it on the free market.

In addition, it is conceivable that the computing device of the user offers its owner protection against theft and the like. Furthermore, a user may own various such computing devices and transfer the data stored in one such device to another before performing another protocol. For such reasons, in the detailed description the actions in the boxes will be described as being performed by the type of party that is involved, rather than by its computing device. That is, when the description specifies for example the user to send certified information it received earlier to a shop, these actions are performed by one of his computing devices. Likewise, $\mathcal{U}$ will be referred to as "user" or "he," whereas the actual computational actions are performed by the computing device. This convention is common usage in the art (where computations are performed by parties referred to as "Alice," "Bob," and so on), and will not cause any ambiguities when read in the context of the description. For example, when it is said that "the user opens an account by generating a random number, sending this to the bank, and identifying himself by means of a passport," it will be clear that for showing a passport the user may have to show up at the local bank in person; the bank the passport is shown to will then also be a person, employed by the bank, or perhaps an apparatus checking fingerprints, etc., of the user. The part of generating the random number and sending it to the bank is performed by the computing device of the user. The same convention is also taken with respect to the other types of participant, since, for instance, in the off-line cash systems the bank verifies the identity of the user, computes signatures, verifies the validity of deposited databases, and takes appropriate action in case an account holder has double-spent.

Block 2 represents a computing device controlled by the types of party referred to as a certifying party and an organization. It contains memory means 2a and processing means 2b. In case the device belongs to a certifying party, it is very well conceivable that there are no means for data/ message entry and display, since its only task is to generate signatures on input messages, that it first may have to verify. In case it is a computing device of an organization, it is conceivable that there are also display means, perhaps very rudimentary to merely represent Boolean values to convey the result of a test.

Again, an almost unlimited number of embodiments of this device is conceivable. For example, in a cash system it can be a tamper-resistant part generating the signatures to issue money, it can be some informational facility accessed remotely be telecommunications or the like. In particular, it can also be the same apparatus as that of Block 1, which is particularly conceivable in case an organization is also a user.

The processing means of the computing device of Block 2 can communicate with the processing means of the computing device of users.

Block 3 is an, optional, computing device. It contains memory means 3a and processing means 3b. It is intended to be needed by the computing device of users in order to succesfully complete protocols with organizations and certifying parties, and so it offers organizations and certifying parties better control over the actions performed by users. Since its purpose is to maintain at least some secrets from the user that holds it, in order to ensure that its assistance to successfully perform protocols cannot be avoided, it must in particular be tamper-resistant.

Its processing means can commicate with the processing means of the user that owns it. However, during executions of protocols in which it must assist the user to complete the protocol, it should not be able to communicate directly to organizations and certifying parties. Its only way to convey information to the "outside" world is through the computing device of its owner.

Again, the tamper-resistant device can be of many forms. For instance, in case the computing device of its holder is a personal computer or workstation, it might be a device connected to the parallel port thereof, or it can be a so-called PCMCIA-card inserted in an opening of a palm top computer or remote control for an interactive T.V. set.

Restrictive blind signature protocols.

The requirement for a blind signature protocol, well-known in the art, is that $\mathcal{P}$ may not get any clue about the numbers that $\mathcal{R}$ obtains at the end of the protocol other than that they can be used as certified information. More specifically, given the set of numbers with a corresponding signature, the numbers that $\mathcal{P}$ has viewed in the execution of the protocol do not provide any information about the numbers and signature that $\mathcal{R}$ has obtained at the end of the protocol.

A restrictive blind signature protocol is a blind signature protocol that satisfies an important additional requirement. A detailed description follows. At the start of the protocol (say, in a set-up phase) two functions, denoted by $f_1$ and $f_2$, are chosen.

At the start of the protocol $\mathcal{P}$ and $\mathcal{R}$ agree on a number m that is henceforth called the input of the protocol. This number is such that at least $\mathcal{R}$ knows a k-tuple $(a_1, \ldots, a_k)$ such that $m = f_1(a_1, \ldots, a_k)$.

At the end of the restrictive blind signature protocol $\mathcal{R}$ can compute a number m' (which will be referred to as the output of the protocol) with a corresponding digital signature of $\mathcal{P}$, such that he knows a l-tuple $(b_1, \ldots, b_l)$ such that $m' = f_2(b_1, \ldots, b_k)$. The important characteristic is that there exist at least two non-constant functions $I_1$ and $I_2$ associated with the protocol such that inevitably $I_1(a_1, \ldots, a_k)$ is equal to $I_2(b_1, \ldots, b_l)$, independent of the transformations applied by $\mathcal{R}$ during the protocol.

For a function f and number m, henceforth $f^{-1}(m)$ will be referred to as a representation of m with respect to f. For example, if f is a hash-function such that there is a plurality of arguments that are mapped by f to the same output then there exist many representations for outputs. In case such an f is a collision-free hash-function, meaning that it is infeasible to determine two different argument that map to the same outcome, then a user can only know at most one representation. In that case it makes sense to speak of a user knowing a representation of a number. The same is also the case if f is a one-way function that is one to one.

By "information contained" in a representation that a user knows of a number with respect to a function f is meant any function I of the representation. Clearly, there is lots of information contained in a representation, since there are a lot of different functions of the numbers in the representation.

With this terminology, which will be used henceforth, a restrictive blind signature protocol is a digital signature protocol in which $\mathcal{R}$ can fully blind the number m to a blinded number m' such that the requirement for a blind signature protocol is met, but there inevitably exists certain information contained in the representation he knows of m that is equal to certain information contained in the representation he knows of m', independent of how he blinded m to m'. As will be obvious to those of ordinary skill in the art, this actually means that he cannot blind independently at random each number in the representation of m.

In general, m and m' can be vectors of numbers, such that $\mathcal{R}$ knows a certain representation of each of the numbers in the vector.

As will be obvious to those of ordinary skill in the art, one can usually determine the functions $f_1$ and $f_2$ to be the same function, and one is then speaking about representations of m and m' with respect to the same function f. Likewise, it is often possible to determine the functions $I_1$ and $I_2$ to be equal to the same function. Examples of this are given in the descriptions of two preferred embodiments.

Proving knowledge of relations between the numbers in the representation of m'

There is no practical reason to use restrictive blind signature protocols without using an additional testing protocol (the opposite is not true; as will be obvious to those of ordinary skill in the art, the various techniques for testing that will be described in each of two sections on application to credential mechanisms are of interest in their own right). That is, associated with restrictive blind signature protocols is the fact that $\mathcal{R}$ can prove to "organizations" various statements about the numbers in $I_2(b_1, \ldots, b_k)$, where $(b_1, \ldots, b_l)$ is the representation he knows of m' with respect to $f_2$. The basic idea is that the numbers in $I_2(b_1, \ldots, b_l)$ can each denote a certain type (piece) of information. For example, these numbers may be only zero or one, and then the value of $b_i$ can denote whether one has or does not have a piece of information of type i (type i might for instance stand for "driver's licence"). In general, $b_i$'s of many distinct values can be used to represent types of information or, say, "quantifications" of a certain type such as hight of income.

Since $I_1(a_1, \ldots, a_k) = I_2(b_1, \ldots, b_l)$, this actually means that $\mathcal{R}$ did not make up these pieces of information himself if he can show a corresponding signature. After all, $\mathcal{P}$ himself has accepted m, of which $\mathcal{R}$ knows the representation $(a_1, \ldots, a_k)$, as input to the restrictive blind signature protocol. Therefore, by proving relations between the numbers in $I_2(b_1, \ldots, b_k)$, $\mathcal{R}$ is actually proving that these relations hold for pieces of information certified by $\mathcal{P}$. Note that $\mathcal{P}$ need not know what this representation is.

The importance of the inventive techniques derives in part from the fact that one can let $\mathcal{R}$ prove knowledge of a representation he knows of a number (on which he has a signature) with respect to the function $f_2$; more generally, by taking a suitable mathematical function of $f_2$, and letting $\mathcal{R}$ prove knowledge of a suitable other function of the number with respect to the function of $f_2$, one can in effect have him prove a broad range of functions of the representation he knows. This will be described in detail in the sections on application to credential mechanisms.

Differences with "one-show" blind signatures

The one-show blind signatures known in the art can be considered as a special type of restrictive blind signatures: they only serve as a means to determine the identity of a user that shows a piece of information more than once—showing the signature twice reveals the information contained in the certified information. As will be appreciated when the detailed description is studied in conjuction with the figures, in restrictive blind signatures there need not be such a limit. Restrictive blind signature schemes can serve much broader applications. Furthermore, restrictive blind signatures can be used to prove relations between the parts of the information contained in the certified information without revealing any additional information.

The only known technique for the construction of one-show blind signatures uses the well-known cut-and-choose technique. This consists of performing a great many "ordinary" blind signature protocols in parallel. The user must in the third transmission "open" a substantial part of all the blinded numbers he sent in the first transmission, i.e. show to the certifying party that he indeed included the correct pieces of information in each of them. The reason for this is that there are no restrictions on the blinding transformations that the user can perform that are inherent to the mathematics. The unopened parts (or the product thereof) are signed in a fourth step by the certifying party, and then unblinded by the user as in the ordinary blind signature protocols. Since the user could not know in advance which numbers the certifying party would request him to open, the certifying party with (hopefully) high probability is ensured that the unopened numbers also include the correct pieces of information. As will be appreciated by those of ordinary skill in the art, restrictive blind signature protocols do not have to make use of such an inefficient technique, of which it also will be hard to prove the security; hence, they can be orders of magnitude more efficient.

An inherent feature of restrictive blind signature protocols is that the output of a previous execution of such a protocol can repeatedly (recursively) be used as input to a new execution, such that the information contained in the various inputs and outputs is inevitably conserved throughout. This is most obvious if $f_1 = f_2$ and $I_1 = I_2$. As will be appreciated, in case $f_1$ and $f_2$ are not equal, it most often is the case that they can be adjusted such that they are equal. The same holds for $I_1$ and $I_2$. The repeated use of the restrictive blind signature protocol as in the first sentence of this paragraph is henceforth called "transitivity." The contained information even can be modified under control of the certifying party by using a function of a previous output as input to a new execution of the protocol. This very powerful technique can be put to use in many applications, as will be shown in great detail for two preferred embodiments.

As will be appreciated, as special use of restrictive blind signature is to construct one-show blind signatures. However, the most powerful use of restrictive blind signatures will be shown to stem from the general techniques that cannot be achieved with one-show blind signatures.

In order to explain the invention, two preferred embodiments will now be described in great detail. Each of these embodiments will be described in turn. The additional notational conventions used only in a particular embodiment will be described at the start of the description of that particular embodiment.

Each of these two preferred embodiments is characterized by a specific choice for the functions $f_1$ and $f_2$. Although these functions can as well be chosen to be different, one can point out in both preferred embodiments a function f that is equal to both $f_1$ and $f_2$. As will be appreciated from the descriptions, this has some advantages when using the output of a previous execution of the protocol as the new input to a next execution of the protocol.

The respective descriptions are organized as follows. For each preferred embodiment various realizations of restrictive blind signature protocols are described, based on either one of two techniques described in text. Following this is a description of how $\mathcal{R}$ can prove knowledge of a representation of m' with respect to a function f, and how a plurality of parties can do this in cooperation. These protocols form the basis for the construction of protocols that can be used to prove a diversity of relations between the numbers in $I_2(b_1, \ldots, b_k)$, where $(b_1, \ldots, b_k)$ is the representation $\mathcal{R}$ knows of m' with respect to f. These latter protocols are extensively described in the section concerning the application of restrictive blind signatures to so-called "credential mechanisms," including protocols for transferring one-show credentials between pseudonyms. Finally, for both preferred embodiments an off-line electronic cash system is described in great detail; many of the described techniques are applied here once more.

As will be appreciated to those of ordinary skill in the art, the example protocol descriptions in each of the two preferred embodiments illustrate many particular of the herein disclosed inventive techniques and concepts, but they are only intended to be suggestive and not limiting in any way.

FIRST PREFERRED EMBODIMENT

1 Introduction

In the first preferred embodiment computations are performed in a multiplicative group modulo n, denoted by $\mathbf{Z}^*_n$, with n being the product of two distinct large primes. The RSA problem, mentioned in the description of the prior art, seems infeasible to solve in such a group. Since the order of the group may only be known to the certifying party, the computations in the exponents are performed modulo a certain number v that is not a proper divisor of the order of $\mathbf{Z}^*_n$. Hence expressions involving div v will show up, due to the relation $a = a \mod v + v (a \operatorname{div} v)$ for $a \in \mathbb{N}$.

Since multiplications and divisions in $\mathbf{Z}^*_n$ are always performed modulo n, the operator mod n will never be mentioned explicitly. So for example $Y^{u_1}$ stands for $Y^{u_1}$ mod n. In case other modulo operations are involved, the modulo operator is explicitly mentioned (like in for example $r_1 = x_1 + x_2c \mod v$). If numbers are chosen from a group, always the smallest positive remainder is implied. For instance, $a \in \mathbf{Z}^*_n$ implies that a is chosen at random from the subset $\{1, \ldots, n-1\}$ containing the numbers co-prime with n (in practice, this set can be taken to be $\{1, \ldots, n-1\}$).

For the restrictive blind signatures in this preferred embodiment use is made of the fact that, given a vector of numbers $(Y_1, \ldots, Y_k)$, all unequal to 1, from the group, and a random elements A from the group it seems infeasible to compute a vector $(a_1, \ldots, a_k; a_{k+1})$ (not equal to $(0, \ldots, 0; 1)$ in case A=1) such that $Y_1^{a_1} \ldots Y_k^{a_k} a_{k+1}^v = A$, where $a_1, \ldots, a_k \in \mathbf{Z}_v$ and $Y_1, \ldots, Y_k, a_{k+1} \in \mathbf{Z}^*_n$. In the vector-notation the symbol ";" is used to stress that the number on its right-hand side is from a different set than the numbers on its left-hand side.

In terms of the general description of restrictive blind signatures given previously the functions $f_1$ and $f_2$ can both be defined by $f_i(a_1, \ldots, a_{k+1}) = Y_1^{a_1} \ldots Y_k^{a_k} a_{k+1}^v$, for i=1,2. That is, $f_1$ can be chosen equal to $f_2$. Doing this in fact is commonly possible, as will be obvious to those of ordinary skill in the art. Henceforth, this function will be denoted simply by f.

At the start of the protocol $\mathcal{R}$ knows a vector $(a_1, \ldots, a_k; a_{k+1})$ such that $f(a_1, \ldots, a_{k+1}) = m$. This vector is called a representation of m with respect to $(Y_1, \ldots, Y_k; v)$.

In the next section, FIGS. 2 and 3 two different types of restrictive blind signature protocol will be described. Here, too, can the functions $I_1$ and $I_2$ be chosen to be the same functions, and they will hence be denoted by I. In the first two flowcharts, the function I is (for example) defined by $I(a_1, \ldots, a_{k+1}) = (a_1 \mod v, \ldots, a_k \mod v)$. (As will be clear to those of ordinary skill in the art, functions of the numbers in $I(a_1, \ldots, a_k)$ are also examples of such a function!) This means that $\mathcal{R}$ in the protocol can only modify $a_{k+1}$, and that modulo v he cannot modify the other numbers. Notice that the ability to arbitrarily modify $a_{k+1}$ is sufficient to guarantee the statistical independence between m and m', as is required by a blind signature protocol. In terms of the general description of restrictive blind signatures, the information "contained" in m is the vector $(a_1 \mod v, \ldots, a_k \mod v)$.

Figure 4:
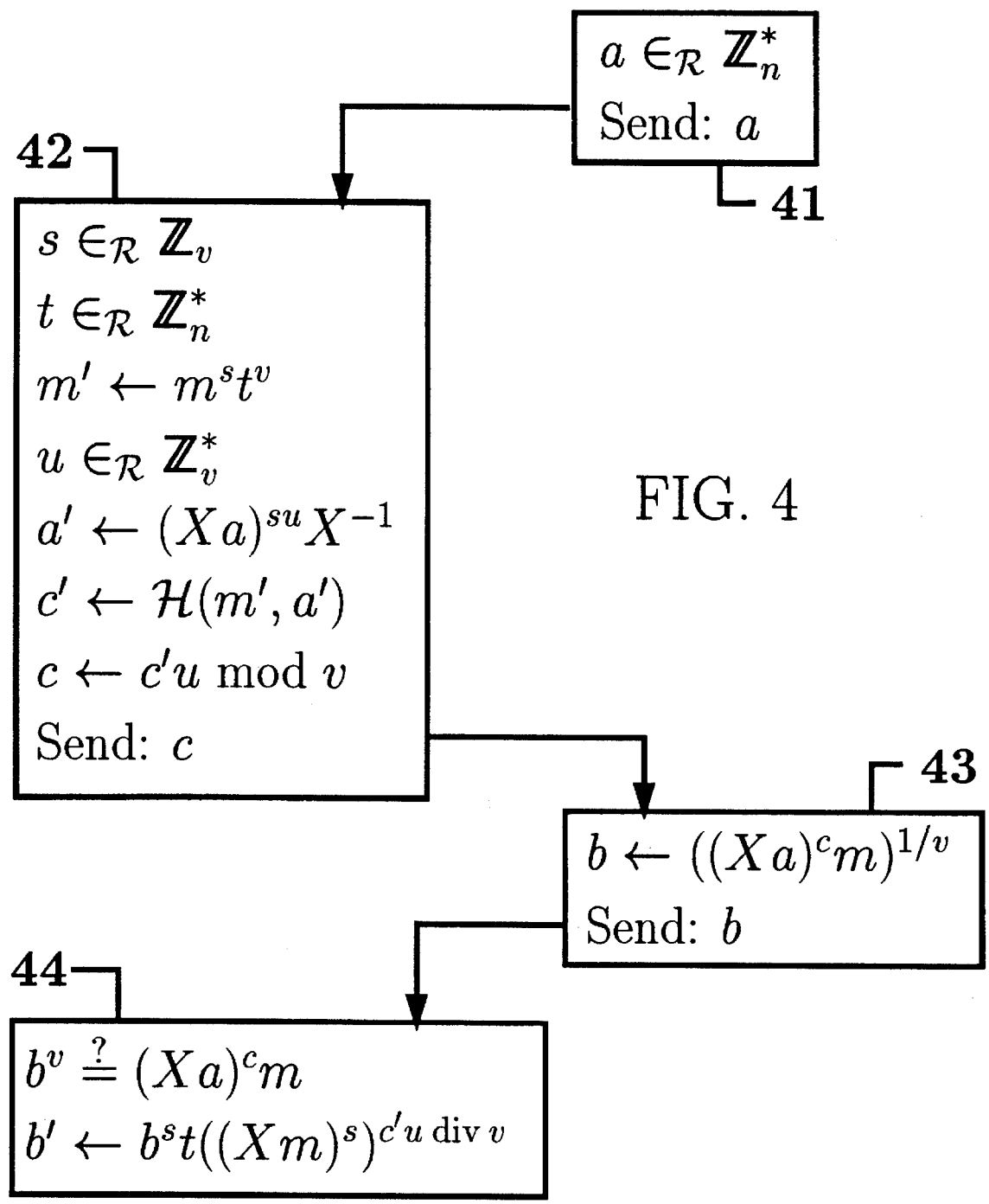
FIG. 4 shows a flowchart of a third restrictive blind signature protocol for the first preferred embodiment in accordance with the teachings of the present invention.

In the protocol of the flowchart of FIG. 4, and its variant described in the text, $\mathcal{R}$ has more freedom in blinding the numbers in the representation. In these protocols one has (for example) $I(a_1, \ldots, a_{k+1}) = (\ldots, a_i/a_j \mod v, \ldots)$, for $1 \leq i \neq j \leq k$. In other words, it is inevitably the case that there exists a number t in $\mathbf{Z}^*_v$ such that $b_i = a_i t \mod v$, for $1 \leq i \leq k$.

Following this, it will be explained how the general technique used to construct these four protocols can be used to construct other restrictive blind signature protocols.

As will be obvious to those of ordinary skill in the art, the protocols can be modified in various obvious ways. In the restrictive blind signature protocols one can take v to be either composite or prime. In the application for off-line electronic cash systems it will be assumed that v is a prime number co-prime with the order of $\mathbf{Z}^*_n$; however, here as well v may be chosen to be of another form. For instance, v=p'q' can be used, for prime numbers p',q' such that one of both properly divides the order of $\mathbf{Z}^*_n$.

Furthermore, n can be taken to be the product of more than just two prime numbers; this however only weakens the security of the system. Such modifications are well-known in the art. It is noted that various suitable choices for n are known in the art.

2 Restrictive blind signatures

Figure 2:
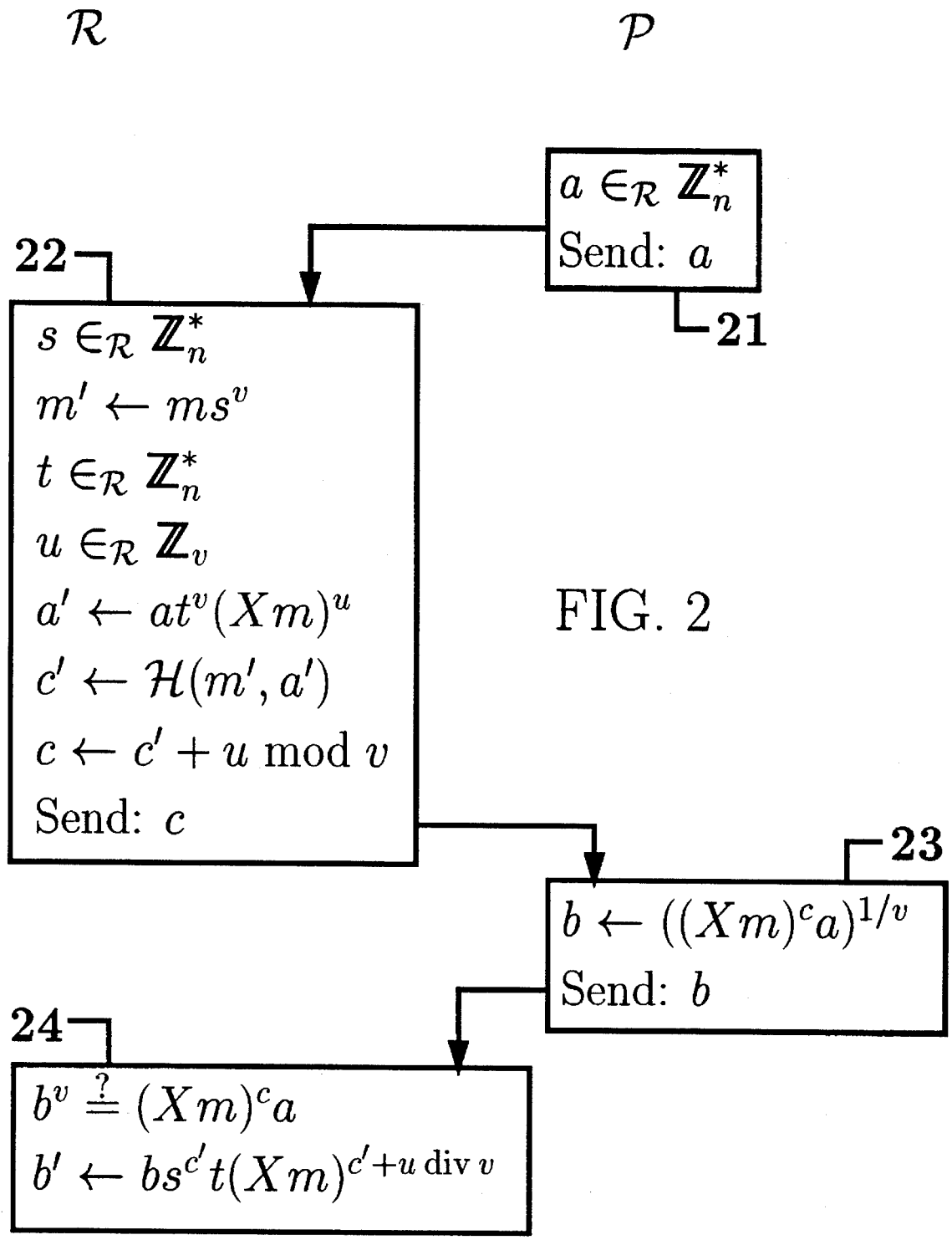
FIG. 2 shows a flowchart of a restrictive blind signature protocol for a first preferred embodiment in accordance with the teachings of the present invention.

Turning now to FIG. 2, the first flowchart of a restrictive blind signature protocol for the first preferred embodiment will now be described in detail.

In a set-up phase, preceding executions of the protocol, $\mathcal{P}$ has made publicly known a triple $(n, v, X \in \mathbf{Z}^*_n)$. The number n is the product of two large prime numbers, suitable choices for such a composite being well-known in the art. The number v is a prime number co-prime with the order, denoted by $\phi(n)$, of the group $\mathbf{Z}^*_n$. As will be obvious to those of ordinary skill in the art, and as explained earlier, other choices of v can also be used; v can even be a power of two. Finally, X is an element of large order in $\mathbf{Z}^*_n$. $\mathcal{P}$ stores the inverse of v modulo $\lambda(n)$ (in the sequel this number will be denoted in the exponent by 1/v) as its secret key.

$\mathcal{P}$ also makes publicly known a function $\mathcal{H}$. $\mathcal{H}$ is a hash-function, preferably "collision free," that maps two numbers from $\mathbf{Z}^*_n$ to a number in $\mathbf{Z}_v$. "Collision-free" means that not only is it infeasible to compute inverses but it also is infeasible to compute two distinct pairs of numbers that are mapped by $\mathcal{H}$ to the same outcome. Such functions are well-known objects in the art.

At the start of the protocol a number m from $\mathbf{Z}^*_n$ is decided on that should be known to both $\mathcal{P}$ and $\mathcal{R}$. A digital signature of $\mathcal{P}$ on a number m in $\mathbb{Z}^*_n$ is defined to be a pair of numbers (a,b) in $\mathbb{Z}^*_n \times \mathbb{Z}^*_n$ such that the v-th power of b is equal modulo n to the product of $(Xm)^c$ and a, where c denotes the image of (m,a) under the hash-function $\mathcal{H}$.

Box 21 shows $\mathcal{P}$ generating a random number a in $\mathbb{Z}^*_n$, which it then sends to $\mathcal{R}$.

The first, third and fourth lines of Box 22 show $\mathcal{R}$ generating two random numbers s,t, both in $\mathbb{Z}^*_n$, and a random number $u \in_{\mathcal{R}} \mathbb{Z}_v$. The box in the second line shows $\mathcal{R}$ computing the blinded form m' of m by multiplying the v-th power of s by m. Furthermore, the fifth line of the box shows how $\mathcal{R}$ computes the blinded form a' of a, by using the numbers t and u. Next a "challenge" c' is computed as the image of (m',a') under the hash-function $\mathcal{H}$. In the seventh line it is shown how $\mathcal{R}$ uses the previously generated random number u to blind this challenge by adding modulo v the number u to it. The outcome of this transformation, denoted by c for clarity, is then sent by $\mathcal{R}$ to $\mathcal{P}$.

Box 23 shows how $\mathcal{P}$, after receiving challenge c from $\mathcal{R}$, computes the "response," which will be denoted by b. Having computed this number, $\mathcal{P}$ sends it to $\mathcal{R}$.

Box 24 defines the actions of $\mathcal{R}$ after receiving response b from $\mathcal{P}$. The first line shows that $\mathcal{R}$ verifies whether the v-th power of b equals modulo n the product of a with a number that $\mathcal{R}$ can compute from the publicly known information. If this test holds then $\mathcal{R}$ "accepts," since it must be the case that $\mathcal{P}$ computed the correct response. $\mathcal{R}$ then computes a transformed form of b, which is denoted for clarity by b', by using the publicly known information, the input m to the protocol, and the numbers generated in the protocol. As is common in the art, the box does not display the action of $\mathcal{R}$ in case the verification in the first line does not hold, since these actions do not influence the correctness of the protocol; $\mathcal{R}$ may complain or take other appropriate action, various such actions being conceivable and depending on the implementation environment of the protocol.

If both $\mathcal{P}$ and $\mathcal{R}$ followed the description of the protocol (and hence $\mathcal{R}$ accepts in Box 24), then the pair (a',b') is a digital signature of $\mathcal{P}$ on m'. Hence, it can be verified by anyone, by using the information $\mathcal{P}$ made publicly known. As will be appreciated, the pair consisting of m' and the signature (a',b') meets the requirement for a blind signature described earlier.

It will be obvious to those of ordinary skill in the art that, without further restrictions, signatures obtained in the above manner are easy to forge. This is not a problem at all, since what matters for restrictive blind signatures is the information "contained" in the signed message m': $\mathcal{R}$ must know a representation of m'. Assuming that $\mathcal{R}$ at the start of the protocol knows a representation $(a_1, \ldots, a_k; a_{k+1})$ of m with respect to a publicly known vector $(Y_1, \ldots, Y_k; v)$, and that at the end of the protocol $\mathcal{R}$ knows a representation $(b_1, \ldots, b_k; b_{k+1})$ of m' with respect to the same vector, the number $a_i$ will inevitably be equal to $b_i$ modulo v for all i such that $1 \leq i \leq k$, if only $\mathcal{R}$ does not know a representation $(c_0, \ldots, c_k; c_{k+1})$ (not equal to $(0, \ldots, 0; 1)$) of 1 with respect to $(X, Y_1, \ldots, Y_k; v)$. This can easily be taken care of by $\mathcal{P}$ by for example generating X and all $Y_i$'s at random.

Several remarks are in order here. As will be appreciated, $\mathcal{P}$ need only know the v-th roots modulo n of both X and m in order to properly perform his part of the protocol. In particular, $\mathcal{P}$ does not need to know the prime factorization of the modulus n. To perform the action in Box 23, in Box 21 $\mathcal{P}$ should generate the number a in such a way that it knows its v-th root modulo n. This can be easily accomplished by generating at random a number $a_0$ in $\mathbb{Z}^*_n$ and taking a equal to the v-th power modulo n of $a_0$.

As will be obvious to those of ordinary skill in the art, the assignments made by $\mathcal{R}$ in the fifth and seventh lines of Box 22 to a' and c, and c, and that made to b' in the second line of Box 24 can be slightly modified in various ways.

In the foregoing description of the flowchart the digital signature is only on one number, denoted by m'. A simple yet important modification suffices to obtain a digital signature on several numbers. If the signature should not only correspond to m' but also to k other numbers, which will be denoted by $B_1, \ldots, B_k$, for a certain positive integer k, then it suffices that $\mathcal{R}$ in the sixth line of Box 22 compute c' as the image of $(m', B_1, \ldots, B_k, a')$ under the hash-function $\mathcal{H}$. The requirements for the hash-function are the same as before, the only difference being that $\mathcal{H}$ must now operate on an argument consisting of k+2 numbers. It is noted that most hash-functions known in the art can take any number of elements as an argument, in which case one can use the same hash-function. A signature on $(m', B_1, \ldots, B_k)$ in this case is a pair (a',b') of numbers in $\mathbb{Z}^*_n \times \mathbb{Z}^*_n$ such that the v-th power of b' modulo n equals $(Xm')^{c'} a'$, where c' now is the image of $(m', B_1, \ldots, B_k, a')$ under the hash-function. Note that the numbers $B_i$ can be chosen from any set.

Furthermore, a signature on a number m in $\mathbb{Z}^*_n$ can alternatively be defined (in a somewhat more efficient way) as a pair (c,b) in $\mathbb{Z}_v \times \mathbb{Z}^*_n$ such that c equals the image of $(m, b^v(Xm)^{-c})$ under the hash-function $\mathcal{H}$. As will be obvious to those of ordinary skill in the art, this definition is equivalent. In particular, its verification relation can be substituted in place of the verification relation specified in the description of the set-up phase for the protocol.

The hash-function $\mathcal{H}$ is not necessarily such that for each element in $\mathbb{Z}_v$ there is a number that is mapped to it by $\mathcal{H}$; $\mathcal{H}$ may as well map its arguments to, say, $\mathbb{Z}_{2^t}$, where the "security parameter" t is of an appropriate length, probably set beforehand by $\mathcal{P}$.

As is well-known by those of ordinary skill in the art, the verification relation $b^v = (Xm)^c a$ in the first line of Box 24 can be implemented such that one side of the equality sign does not require any computations. The expression on the other side can be efficiently computed by using for example "simultaneous repeated squaring" techniques. So for Box 24 the verification relation can be rewritten as, say, $(b^{-1})^v (Xm)^c = a^{-1}$; in that case it is preferable that $\mathcal{P}$ send in Box 21 the inverse modulo n of the number a instead of a itself, and the inverse modulo n of b in Box 23; this avoids computation of inverses by $\mathcal{R}$. For reasons of clarity in this application none of the verification relations will be described in such a form.

As will be appreciated, all these remarks also apply to all the other flowcharts. In particular, as noted, one can modify the verification relation defining a signature in an equivalent way each time.

Figure 3:
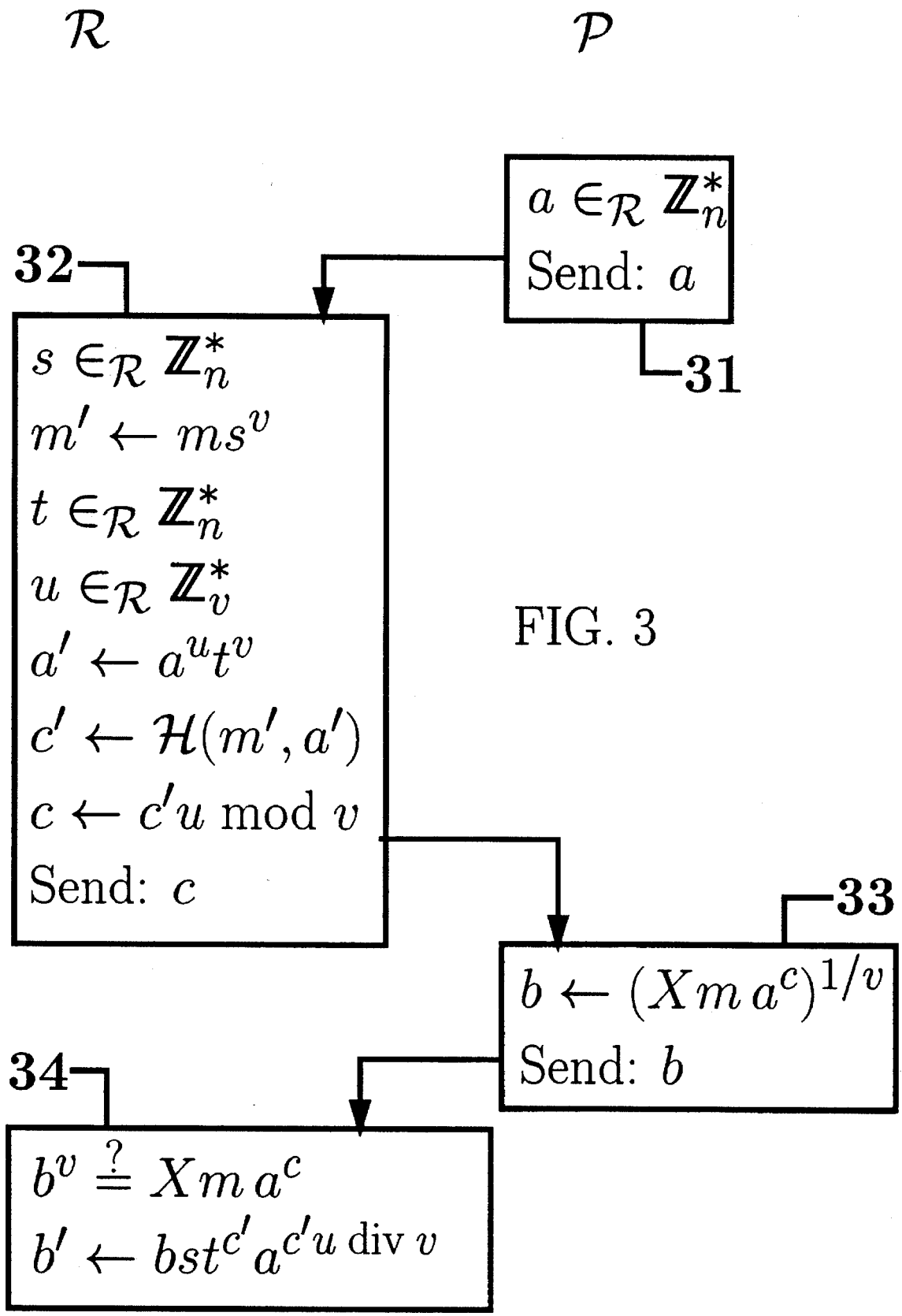
FIG. 3 shows a flowchart of another restrictive blind signature protocol for the first preferred embodiment in accordance with the teachings of the present invention.

Turning now to FIG. 3, a second flowchart of another restrictive blind signature protocol for the first preferred embodiment will now be described in detail.

The set-up is the same as for the previous flowchart, with the only distinction that $\mathcal{H}$ should never map its argument to zero. This is merely a technical detail needed to rigorously prove information-theoretic privacy. A digital signature of $\mathcal{P}$ on a number m in $\mathbf{Z}^*_n$ is defined to be a pair (a,b) in $\mathbf{Z}^*_n \times \mathbf{Z}^*_n$ such that the v-th power modulo n of b is equal to $Xm(a)^c$. Here, as before, the symbol c denotes the image of (m,a) under $\mathcal{H}$. Equivalently, as explained in the description of the previous flowchart, (c,b) can instead be taken to be the signature.

Box 31 shows $\mathcal{P}$ generating a random number a in $\mathbf{Z}^*_n$, which it then sends to $\mathcal{R}$.

The first and third lines of Box 32 show $\mathcal{R}$ generating two random numbers s,t, both in $\mathbf{Z}^*_n$, and the fourth line shows $\mathcal{R}$ generating another random number u in $\mathbf{Z}^*_v$. The second line of the box shows how $\mathcal{R}$ computes the blinded form m' of m by using the random number s. Using t and u $\mathcal{R}$ also computes a blinded form a' of a. $\mathcal{R}$ then computes the challenge, denoted by c', as the image under $\mathcal{H}$ of (m',a'). Finally, $\mathcal{R}$ computes the blinded challenge c by multiplying the number c' modulo v with u, and sends it to $\mathcal{P}$.

Box 33 indicates how $\mathcal{P}$ computes the response b as a v-th root modulo n of an expression involving the challenge c it just received. $\mathcal{P}$ then sends b to $\mathcal{R}$.

Box 34 details in the first line the testing of the response of $\mathcal{P}$ and in the second line the final computation needed to obtain a signature on m'. Specifically, the first line shows how $\mathcal{R}$ raises b to the power v and compares the result for equality with a product involving the publicly known information, the challenge, and the input m of the protocol. When this test completes successfully, $\mathcal{R}$ computes a number b', which in fact is the blinded form of b. As before, if the test does not hold, $\mathcal{R}$ takes other action.

The remark made at the end of the description of the previous flowchart also applies here. That is, if it is assumed that $\mathcal{R}$ at the start of the protocol knows a representation $(a_1, \ldots, a_k; a_{k+1})$ of m with respect to $(Y_1, \ldots, Y_k; v)$, and at the end knows a representation $(b_1, \ldots, b_k; b_{k+1})$ of m' with respect to the same vector, then $a_i$ will inevitably equal $b_i$ modulo v for all i such that $1 \leq i \leq k$, if only $\mathcal{R}$ does not know a representation $(c_0, \ldots, c_k; c_{k+1})$ (not equal to $(0, \ldots, 0; 1)$) of 1 with respect to $(X, Y_1, \ldots, Y_k; v)$.

Turning now to FIG. 4, a third flowchart of yet another restrictive blind signature protocol in the first preferred embodiment will now be described in detail.

The set-up is the same as for the previous flowchart (FIG. 3). A digital signature of $\mathcal{P}$ on a number m in $\mathbf{Z}^*_n$ is a pair (a,b) in $\mathbf{Z}^*_n \times \mathbf{Z}^*_n$ such that the v-th power of b equals $(Xa)^c m$, where c denotes $\mathcal{H}(m,a)$. It turns out that $\mathcal{R}$ now has somewhat more freedom in blinding the input m than in the previous two protocols, however, this is not sufficient to independently blind each number in the representation and so this also is a restrictive blind signature.

Box 41 shows $\mathcal{P}$ generating a random number $a \in \mathbf{Z}^*_n$, which it then sends to $\mathcal{R}$.

The first, second and fourth lines of Box 42 describe that $\mathcal{R}$ generates two random numbers $s \in_\mathcal{R} \mathbf{Z}_v$, $u \in_\mathcal{R} \mathbf{Z}^*_v$ and a random number $t \in_\mathcal{R} \mathbf{Z}^*_n$. Using s,t, $\mathcal{R}$ blinds m to a number m' in the way indicated in the third line. Using s and u, $\mathcal{R}$ also blinds the number a to a number a' in the way specified in the fifth line. $\mathcal{R}$ then computes the challenge c' by applying the hash-function $\mathcal{H}$ to (m',a'). Finally, $\mathcal{R}$ computes the blinded challenge c by multiplying c' modulo v with u, and sends c to $\mathcal{P}$.

Box 43 shows $\mathcal{P}$ computing the response b corresponding to the challenge c it received from $\mathcal{R}$. $\mathcal{P}$ then sends this number to $\mathcal{R}$.

The first line of Box 44 indicates that $\mathcal{R}$ accepts if and only if the v-th power of b equals an expression involving the input m to the protocol, the challenge, and the publicly known information. If that is the case, $\mathcal{R}$ computes a blinded form of b, which as before is denoted by b'.

If it is assumed that $\mathcal{R}$ at the start of the protocol knows a representation $(a_1, \ldots, a_k; a_{k+1})$ of m with respect to $(Y_1, \ldots, Y_k; v)$, and at the end knows a representation $(b_1, \ldots, b_k; b_{k+1})$ of m' with respect to the same vector, then $a_i/a_j$ will inevitably equal $b_i/b_2$ mod v for all distinct i,j such that $1 \leq i,j \leq k$, if only s is not equal to 0 mod v and $\mathcal{R}$ does not know a representation $(c_0, \ldots, c_k; c_{k+1})$ (not equal to $(0, \ldots, 0; 1)$) of 1 with respect to $(X, Y_1, \ldots, Y_k; v)$.

As will be appreciated, in the same way that the second flowchart (FIG. 3) is closely related to the first flowchart (FIG. 2), there is also a restrictive blind signature protocol closely related to the present flowchart. The set-up for that protocol is the same, except for the distinction that a digital signature of $\mathcal{P}$ on a number m in $\mathbf{Z}^*_n$ is now a pair (a,b) in $\mathbf{Z}^*_n \times \mathbf{Z}^*_n$ such that the v-th power of b is equal to $Xa(m)^c$, where again the image of (m,a) under the hash-function $\mathcal{H}$ is denoted by c. $\mathcal{R}$ has exactly the same freedom in blinding m as in the third flowchart (FIG. 4). The remarks made with respect to the flowchart of FIG. 4 hence also apply here. Since the only difference is that the assignments made by $\mathcal{R}$ in Box 42 and Box 43 to a',c and b' have to be modified in a way obvious to those of ordinary skill in the art, a detailed description is omitted.

The four described restrictive blind signature protocols are all based on the signature variant of the Guillou/Quisquater identification protocol, known from Guillou, L. and Quisquater, J., "A practical zero-knowledge protocol fitted to security microprocessor minimizing both transmission and memory," Lecture Notes in Computer Science 330, Proceedings of Eurocrypt '88, pages 123–128, and the 'mirrored' variant (Ohta, K. and Okamoto, T., "A modification of the Fiat-Shamir scheme," Lecture Notes in Computer Science 403, Proceedings of Crypto '88, pages 222–243). The protocol of Guillou/Quisquater is of the so-called Fiat/Shamir type, known from Fiat, A, and Shamir, A., "How to prove yourself: practical solutions to identification and signature problems," Crypto '86, Springer-Verlag, (1987), pages 186–194.

As will be obvious to those of ordinary skill in the art, the technique used to realize the restrictive blind signatures in the previous flowcharts can be applied, at least in principle, to any identification protocol of the Fiat/Shamir type, if only one can convert it to a signature protocol by computing the challenge c as the outcome of a hash-function of, amongst others, numbers that were received earlier (this is the construction of Fiat/Shamir). To this end not $\mathcal{P}$ but $\mathcal{R}$ must compute the challenge c, and the input m must be multiplied (or using another mathematical operation such as exponentiation) in an appropriate way into the verification relation. For example, the verification relation in the Guillou/Quisquater scheme is $b^v=X^c a$; one then gets the verification-relation of the first flowchart (FIG. 2).

For instance, with this technique the identification protocol from Okamoto, T., "Provably Secure and Practical Identification Schemes and Corresponding Signature Schemes," Preproceedings of Crypto '92, pages (1–15)–(1–25) can be turned into a restrictive blind signature protocol. In this identification protocol $\mathcal{P}$ proves that he knows the secret key $(s_1,s_2)$ in $\mathbb{Z}_v \times \mathbb{Z}^*_n$ corresponding to a public key which is of the form $Y^{s_1} s_2^v \mod n$.

Since this is realized in the same way as in the flowcharts of FIGS. 2, 3 and 4 (again, there are in total four variants that result in a restrictive blind signature protocol), and various other protocols that are also all based on this inventive technique will be described in detail in the second preferred embodiment, a detailed description is omitted here; the described flowcharts are believed to be more than sufficient to enable those of ordinary skill in the art to apply the inventive technique to any other identification protocol of the Fiat/Shamir type.

There also exists a different technique to turn an identification protocol of the Fiat/Shamir type into a restrictive blind signature protocol. This technique consists of doubling the verification relation, where in the second verification-relation one of the numbers of the public key is replaced by the input m. As before, $\mathcal{R}$ computes the challenge c himself. In the Guillou/Quisquater protocol one can for example use the verification relations $b_1^v=X^c a_1$ and $b_2^v = m^c a_2$ (so here X is replaced by m in the "copy" of the verification relation). Yet another example of this doubling technique is the restrictive blind signature protocol described in FIG. 23 for the second preferred embodiment. The difference with the first technique, applied in the flowcharts of FIGS. 2, 3 and 4, is that signatures that are constructed in this way cannot be forged by $\mathcal{R}$ even if he does not need to know a representation of the signed numbers.

3 Proving knowledge of a representation

Turning now to FIG. 5, a flowchart of a protocol in the first preferred embodiment will now be described that enables $\mathcal{R}$ to prove that he knows a representation $(a_1, \ldots, a_k; a_{k+1})$ of a number A in $\mathbb{Z}^*_n$ with respect to $(Y_1, \ldots, Y_k; v)$, without revealing the representation itself (so in particular the information contained in A is kept secret).

Box 51 shows $\mathcal{R}$ generating k random numbers $x_1, \ldots, x_k$ in $\mathbb{Z}_v$, and a random number $x_{k+1}$ in $\mathbb{Z}^*_n$. He uses these to compute a number B, as specified in the third line, which he sends to $\mathcal{P}$.

Box 52 shows $\mathcal{P}$ generating a challenge d in $\mathbb{Z}_v$, which it then sends to $\mathcal{R}$.

Box 53 indicates how $\mathcal{R}$ computes the responses $r_i$, for $1 \leq i \leq k+1$. $\mathcal{R}$ then sends $r_1, \ldots, r_{k+1}$ to $\mathcal{P}$.

Box 54 indicates that $\mathcal{P}$ accepts the proof if and only if a product involving the k+1 responses just received from $\mathcal{R}$ is equal modulo n to the product of $A^d$ and B.

This protocol is a generalization of a protocol known in the art, which however serves only for the purpose of identification and signatures. As will be shown in detail, the inventive techniques allow this proof to be used as the basis for protocols that enable $\mathcal{R}$ to prove certain mathematical relations between the numbers in the representation. This inventive concept enables the construction of efficient privacy-protecting credential mechanisms.

As is well-known by those of ordinary skill in the art, there are two basic ways to use this protocol. Firstly, it can be required that d, generated in Box 52, is at most, say, ten bits in length, and the protocol is then repeated a few times. In that case, $\mathcal{P}$ cannot use the transcript of the execution of the protocol to prove to someone else that the proof took place; the protocol is "zero-knowledge," using well-known cryptographic terminology.

Secondly, it can be required that $\mathcal{P}$ determine d in Box 52 as the outcome of a publicly known collision-free hash-function having as argument at least the numbers A and B, and for example also a message m. Often $\mathcal{R}$ will then be able to compute d himself, and so not interaction is needed between $\mathcal{R}$ and $\mathcal{P}$. The transcript of an execution of the protocol can now serve as a digital signature on m, A and B, and in particular it proves that the proof was performed; this is sometimes called a "signed proof" in cryptographic terminology.

In case B can be chosen in each execution of the protocol by $\mathcal{R}$ himself, $\mathcal{R}$ can perform the proof of knowledge of a representation of A as many times as desired without ever enabling $\mathcal{P}$ to compute the representation he knows of A. However, if $\mathcal{R}$ performs the protocol twice using the same number B, then $\mathcal{P}$ can compute the representation $\mathcal{R}$ knows of A by using two different challenges d in Box 52.

In case $\mathcal{R}$ knows a representation of $A_1$, and $\mathcal{R}'$ knows a representation of $A_2$, then they can prove to $\mathcal{P}$ by cooperating that they together know a representation of the number A which is the product $A_1 A_2$ of their individual numbers. To this end, in Box 51 they multiply $B_1$ and $B_2$, and send the outcome B to $\mathcal{P}$. In Box 53 they then pairwise add together their responses $r_i, r'_i$ (for $1 \leq i \leq k$), and multiply $r_{k+1}$ and $r'_{k+1}$. They send the k+1 resulting responses to $\mathcal{P}$, who verifies them as in the flowchart of FIG. 5. As will be obvious to those of ordinary skill in the art, this modification can also be applied in case more than just two receivers are involved.

A somewhat more difficult situation occurs in case one of the two parties is not allowed to leak to $\mathcal{P}$ information about what numbers (including $A_1$, $B_1$ and $r_i$) it is using. This situation is especially of concern in case one computing device represents the interests of an organization or a certifying party. The technique used to construct this protocol will be described in the flowchart of FIG. 10.

Various intermediate forms of these two techniques can be thought of, for example to solve a situation with four computing devices of which two are "embedded" within the other two. Such situations will be described shortly in detail.

4 Application to credential mechanisms

A "credential" mechanism is a collection of cryptographic protocols enabling users to transfer certified information between organizations. A piece of certified information is called a "credential." One may think of various distinct types of credentials such as tax information, money, medical data, driver's license, legal right to vote, and so on. To prevent massive matching of databases (that is, to guarantee privacy of transfer of information between organizations), each user is know under a different pseudonym at different organizations. Possibly one even has multiple pseudonyms with one organization.

Signatures of organizations must hence be transferable between distinct pseudonyms of the same user, such that certified information received from one organization can be shown to another organization without this enabling linkage to the execution of the protocol in which the information was obtained. A description of such a mechanism in the prior art can be found in Chaum, D., Evertse, J. H., "A secure and privacy-protecting protocol for transmitting personal information between organizations," Proceedings of Crypto 86, Lecture Notes in Computer Science, Springer-Verlag 1986, pages 118–168. In this mechanism ordinary blind signatures are used to certify information. It is noted that this essentially is the only credential mechanism known in the previous art (a minor improvement has been proposed in the prior art).

Techniques based on restrictive blind signatures enable the construction of much more sophisticated, efficient and secure credential mechanisms. In the following description it will be assumed throughout without loss of generality that the restrictive blind signature protocol of FIG. 2 is used; that is, m can be blinded to $ms^v$ with a corresponding signature for a secret choice of $s \in \mathcal{R} \, \mathbb{Z}^*_n$. Clearly, the protocol of, for instance FIG. 3 could just as well be used instead; the choice is merely for clarity.

4.1 Validation of pseudonyms

In the credential mechanism known in the prior art a pseudonym of user i with an organization j is of the form $m_i s_j^v$, with the user knowing $m_i$ and $s_j$, both in $\mathbb{Z}^*_n$. Since one at least has to be sure that different users use a different pseudonym of which they do not know the v-th root modulo n, pseudonyms first must be validated by a special certifying party called the "center" for convenience. The center is the only party knowing the factorization of the modulus n. This means that the center has to compute all signatures.

In the present description it will henceforth always implicitly assumed that the center will also certify information at the request of organizations; that is, it is implicitly understood that in case an organization computes a digital signature, this computation is actually performed by the center via for example an on-line connection. As will be clear to those of ordinary skill in the art, this is not an inherent requirement.

The credential mechanism known in the prior art uses the inefficient "cut-and-choose" technique to certify pseudonyms (validation). By using a restrictive blind signature protocol, the validation protocol can be realized much more efficiently and securely, while at the same time also resulting in a much more sophisticated system.

Turning to FIG. 6, a flowchart of a pseudonym validation protocol in the first preferred embodiment will now be described that enables user i to have a pseudonym validated for use with some organization j.

At the start of the protocol, the center chooses a number $u_i$ in $\mathbb{Z}^*_v$ that has not been used in a previous execution of the protocol. Alternatively, user i can determine this number, possibly in cooperation with the center. Box 61 indicates that the protocol of FIG. 2 is performed. In the second line of Box 22 of the flowchart of that protocol, i blinds the number $Y^{u_i}$, which will be denoted by $m_i$, to the pseudonym $m_i s_j^v$ for a random number $s_j$ in $\mathbb{Z}^*_n$. This pseudonym will be denoted henceforth by $P_{ij}$. The number Y is a publicly known number, chosen beforehand by the center. Users are not supposed to know the v-th root modulo n of Y.

Box 62 indicates that, in order to use the pseudonym $P_{ij}$ at organization j, i sends this number together with the obtained signature of the center to organization j.

Box 63 indicates that the user then has to prove to the organization knowledge of a representation of $P_{ij}$ with respect to (Y; v), without revealing the representation. The flowchart of FIG. 5 shows how this can be done. Preferably the proof is done such that the organization can use the transcript of the execution of the proof to prove to for example the center that the proof took place (as explained in the description of FIG. 5).

As will be clear to those of ordinary skill in the art, one can also use restrictive blind signatures for which the mere fact that the user is able to show a signature by itself suffices to prove that the pseudonym is of the correct form. The proof of knowledge indicated in Box 63 can be omitted in that case. Such a signature can be constructed with the second technique from identitication protocols of the Fiat/Shamir type, as described before in detail.

Box 64 specifies that if organization j accepts the proof of knowledge of the user, then it accepts $P_{ij}$ for use as a pseudonym. Clearly, by repeating this protocol several times, i can obtain several pseudonyms for use with various organization.

In some situations, such as in systems for transferring one-show credentials between pseudonyms, as described at the end of this section (as will be appreciated, such systems are not known in the prior art), users should in addition be prevented from using the same pseudonym with various organizations; to this end, Box 63 should in addition specify the organization to contact the center, which can then test if the pseudonym is already in use with some other organization.

If user i would now simply "forget" all about $u_i$, the system reduces to the credential mechanism known in the prior art. Namely, user i in that case has a pseudonym $P_{ij} = m_i s_j^v$ with organization j for $m_i$ and $s_j$ that are known to him. However, the use of restrictive blind signatures in combination with a great many new techniques for proving relations between numbers of representations (described shortly) offers many advantages in working with $u_i$. One such advantage is immediately obvious in that i can henceforth always prove to j that $P_{ij}$ is his pseudonym by proving knowledge of a representation with respect to (Y; v). Note also that in any case the validation protocol is much more efficient; the same also seems to hold for the security.

It is noted that at the start of the protocol of FIG. 6, user i could send the number $m_i = Y^{u_i}$ to the center, and could then prove using a cryptographic protocol such as the Guillou/Quisquater identification protocol (well-known in the art) that he knows a number $u_i$ such that $m_i = Y^{u_i}$ without revealing $u_i$. As would be obvious to those of ordinary skill in the art, one could also use in such a situation a form like $m_i = Y_0^{u_{0i}} Y_1^{u_{1i}}$. This has the advantage that it is impossible (regardless of computational power) for the center to compute $(u_{0i}, u_{1i})$ of i. In this way, framing is prevented.

4.2 Representing credentials as representations of a number with respect to suitably chosen vectors In the new credential mechanism a certain type of credential that one owns is not characterised by the choice of v for the signature (i.e. what kind of RSA-root is computed, as is the case in the system known in the previous art) but by the representation the owner knows of the number m on which he has obtained a blind signature and with respect to what publicly known vector. Proving to an organization that one owns a certain credential is no longer a matter of just revealing a signature of the appropriate type on the pseudonym with that organization (as in the system known in the prior art); one also has to prove knowledge of a representation of the number (or of a mathematical function of several numbers, such as the product or quotient) on which one has obtained a signature, with respect to a vector of numbers composed of a publicly known vector of numbers $(Y_1, \ldots, Y_k; v)$, where each $Y_i$ (and possibly also the choice of v) denotes a different type of credential. The specific vector with respect to which one can successfully perform the proof reflects what types of credentials one owns. In this way a user can, amongst others, "gather" many credentials in an efficient and flexible way in one number with a signature. In the next subsection this will be clarified in detail.

To illustrate this, consider a publicly known vector $(Y_1, \ldots, Y_6; v)$, of which $Y_i$ denotes credential type i. If a user can prove knowledge of a representation of, say, $m/(Y_2Y_6)$ with respect to $(Y; v)$, and has a signature on $m=Y^{u_i}Y_2Y_6s^v$, then this shows that he has credentials of types 2 and 6.

As will be described in detail in a later subsection, one can in addition make use of exponents on the $Y_i$'s, such as for example $Y^{u_i}Y_3^7Y_5^2Y_6^{-5}s^v$, which gives greater functionality.

To prove knowledge of a representation of a number with respect to a certain vector either a "zero-knowledge proof" or a "signed proof" can be used, as explained previously. In the latter case the organization involved in the proof can convince others that the proof was performed, and often no interaction is needed for the proof itself.

In the special case that one should only be capable of showing his credentials to only one organization of ones own choice, such a proof is not even needed; it suffices to show the signature. At the end of this section this will be applied to construct a system for paying-under-pseudonym (that is, a system for allowing transference of one-show credentials between pseudonyms).

4.3 Transitivity of restrictive blind signatures; "updating" credentials

Each credential in the mechanism known in the prior art consists of one signature on a number. The storage requirements for signatures hence grows linearly in the number of credentials that one has. (Although it is known in the art to exchange sets of credentials for one new credential indicating ownership of all credentials in the set.)

Restrictive blind signatures enable an entirely different mechanism, where the credentials of a user are "stored" and "updated" in the representation he knows of one number (on which he knows a signature) with respect to a publicly known vector. Each time he receives a new credential, this representation is, as it were, updated (and a corresponding new signature is obtained). The previous signature may as well be destroyed in that case, since it is no longer needed.

This technique is made possible by the unique property of restrictive blind signatures that information can be blinded repeatedly, such that at least part of the representation known by the user cannot be modified by him throughout (that is, the information contained in m is inevitably conserved). This property will be called "transitivity."

In the simplest form this "transitivity" amounts to taking the output of a previous execution of the protocol as the new input to a next execution of the protocol. For example, $m_0$ can be blinded to $m_0s_0^v$ with a signature. Denoting this number by $m_1$ can in a similar way be blinded to $m_1s_1^v = m_0(s_0s_1)^v$ with signature. Denoting this number by $m_2$, and repeating this process i+1 times, one gets a number $m_{i+1}$ which equals $m_0(s_0 \ldots s_i)^v$. As will be clear to those of ordinary skill in the art, the following holds: considering the representation $(r_1, \ldots, r_k; r_{k+1})$ the receiver of the signature on $m_i$ knows of $m_i$ with respect to a suitably chosen vector $(Y_1, \ldots, Y_k; v)$, only $r_{k+1}$ can be modified by him throughout all the iterations of the blinding process. The first k numbers will remain unchanged modulo v. Clearly, a similar thing holds when the protocol of the third flowchart, or the protocol closely related to the protocol of the third flowchart, is used; in that case the quotients $r_i/r_j$ mod v will remain unmodified for $i,j \leq k$.

More generally the following holds for restrictive blind signatures. A function of the obtained output of a previous execution of the protocol can serve as the new input to a next execution of the protocol; if one receives in the ith execution of the restrictive blind signature protocol a signature on $m_i$, then as input to a next execution of the protocol $f(m_i)$ can be used. The choice for f can vary per execution of the protocol (as well as the choice of v), and can be determined by the certifying party. This technique allows the certifying party to "install" new credentials in the part of the representation that is conserved under blinding.

Suppose that $Y_j$ represents credential type i. To update $m_i$ with a credential type $j, f(m_i)=m_iY_j$ can be taken by the certifying party as input. The user then obtains a signature on $m_{i+1}=m_iY_j$. The certifying party does not need to know the representation the user knows of $m_i$ for this. That is, updating can take place without the certifying party needing to know the credentials that the user already has.

It is noted that the user can very well use this technique in combination with the technique well-known in the art to use one type of signature for each credential. For instance, the user can store and update all the credentials pertaining to medical data in the representation he knows of a number $m_a$ for which he has a signature, and all credentials relating to tax in the representation he knows of a number $m_b$ for which he has a signature. Medical credentials will then be installed, updated etc. in $m_a$ and tax credentials in $m_b$.

4.4 Ways to prove that one has certain credentials

The new techniques offer various gradations in freedom a user has in proving to organizations that he has certain credentials.

The credential mechanism known in the prior art only allow user i to convert a signature of organization j on pseudonym $P_{ij}$ to a signature of organization j on each of his other pseudonyms $P_{ik}$ (clearly it should be infeasible to convert the signature to a signature on the pseudonym of another user, even if that other user cooperates). Each type of credential is represented by a different number $v_i \in \mathbb{Z}^*_{\gamma(n)}$, and $v=\Pi v_i$. The numbers $v_i$ must be mutually co-prime.

Contrary to the credential mechanism known in the art, the new credential mechanism allows for three gradations of freedom to be distinguished:

(1) A user can only use certified information for one of his pseudonyms; which specific pseudonym it is can be hidden by the user from the certifying party.

To explain the technique, it will be supposed that user i has a pseudonym $P_{ij}=Y^{u_i}s_j^v$ with organization j, and a pseudonym $P_{ik}=Y^{u_i}s_k^v$ with organization k. User i wishes to obtain from j a credential of a certain type that he can show to k. The basic technique resolves this by letting i obtain hereto in an execution of a restrictive blind signature protocol with j a signature on output $P_{ik}$ (without j knowing k), by computing $P_{ik}$ as $P_{ik}=P_{ij}s_k/s_j$ in the protocol. In terms of the description of the first (FIG. 2) or second (FIG. 3) flowchart, in the second line of the second box the user must take s to be equal to the quotient $s_k/s_j$, and the input of the protocol is $m=P_{ij}$.

This constitutes the simplest form of the transitivity of blinding, unique to restrictive blind signature protocols; in a first protocol (validation), $Y^{u_i}$ is transformed to a pseudonym $Y^{u_i}s_j^v$, and in a second protocol this output is used as input and transformed to output $Y^{u_i}s_k^v$.

The following more general technique can be applied: to prove to an organization k that he has certain credentials, maintained in one number m, user i must prove knowledge of a representation of $m/P_{ik}$ (and he of course must have a signature on m) with respect to a vector (., . . . ,.), the numbers in which are composed from (mathematical functions of) the numbers $Y_1, \ldots, Y_k$, and none of them is equal to Y or v.

An example will illustrate this general technique. If i may show only to l that he has credentials of all types from a subset S of the numbers $\{1, \ldots, k\}$, then he has to prove knowledge of a representation of $(m/P_{il})/(\Pi_{i \in S} Y_i)$ with respect to a vector for which the following holds: Y and v are not in it, and each $Y_i$ with i not in the set S for which he does not want to reveal whether he has that type of credential must appear in the vector.

Another example is now given, to further demonstrate the technique. Suppose that i has not yet received any credentials, and wants to obtain credentials of types 2 and 5 from j in order to show them to organization k. Then $m=P_{ij} Y_2 Y_5$ will be taken as input to a restrictive blind signature protocol with organization j, and i sees to it that he obtains the (certified) output $P_{ik} Y_2 Y_5$. User i now wants to prove to k that he has credentials of types 2 and 5: in doing so, he does not mind about possibly revealing whether he also owns any of the other types of credential. It then suffices to send the signature ((c',b')) (or (a',b')) in the protocol of the flowchart of FIG. 2; the protocols of FIG. 3 can be used instead without causing any changes to k; k merely needs to verify that (c',b') is a signature on $P_{ik} Y_2 Y_5$. As will be appreciated, it is not necessary to in addition prove knowledge of a certain representation in this particular case; one can actually think of this in terms that a proof of knowledge of a representation must be given with respect to the empty vector.

(2) A user can use certified information for all of his pseudonyms

That is, he can prove possession to any organization at which he has a pseudonym, but not to organizations with which he does not have a pseudonym.

As mentioned, for this particular situation (and only for this one) the mechanism known in the prior art can be used, but that suffers from the disadvantage that one cannot collect various credentials in one number (with signature).

In the new credential mechanism this can be taken care of as follows: to prove possession of certain credentials to an arbitrary organization I, user i must prove to l knowledge of a representation of $m/P_{il}$ with respect to a vector of $Y_i$'s in which Y does not appear, but v does.

For example, if i wants to prove to l that he has credentials of all types corresponding to some subset $S \subseteq \{1, \ldots, k\}$, then he must prove knowledge of a representation of $(m/P_{il})/(\Pi_{i \in S} Y_i)$ with respect to a vector (. . . ; v) for which the following holds: Y does not appear in it, and each $Y_i$ with $i \notin S$ for which he does not want to reveal whether he has that particular credential does appear in it.

Note that the number of elements in the vector gets larger as the number of credential types increases for which i does not want to reveal whether he has them or not; the proof requires i to generate more random numbers if there are more credentials for which he doesn't want to reveal anything.

An example will clarify this technique. Suppose that user i "updates" his credentials in a number m (with signature) that he can write as $m=Y^{u_i} s_k^{v} Y_2 Y_5 Y_7$. He can then prove to an arbitrary organization l that he owns exactly credential types 2, 5 and 7, by proving knowledge of the v-th root modulo n of $(m/P_{il})/(Y_2 Y_5 Y_7)$. In the extreme situation where i does not mind about possibly revealing whether he has any other credentials and what they are, the length of the vector with respect to which he must perform the proof is minimal; the proof of knowledge of a representation degenerates to proving that he knows a v-th root (one can think of this in terms of a proof of knowledge with respect to (; v)). If he wants to prove that he owns at least credential of type 2, and does not want to reveal whether he owns any other credentials, then he must prove knowledge of a representation of $(m/P_{il})/Y_2$ with respect to $(Y_1, Y_3, \ldots, Y_k)$.

(3) A user can prove possession of certified information to any organization, regardless of whether he has a pseudonym with that organization If i wants to be able to prove to anyone that he owns all credentials from a certain subset S of the numbers $\{1, \ldots, k\}$, then he must be able to prove knowledge of a representation of the quotient $m/\Pi_{i \in S} Y_i$ with respect to a vector (Y, . . . ; v) for which the following holds: any $Y_i$ with $i \in S$ for which he does not want to reveal whether he owns the corresponding type of credential does appear in it. Note that Y and v must appear in it in any case.

4.5 Some examples

Next, some examples are described in detail to illustrate the techniques. Suppose that a vector $(Y_1, \ldots, Y_k)$ is made publicly known (each $Y_i$ represents, say, credential type i), as well as a number Y that serves as the "basis" for pseudonyms. User i has a pseudonym $P_{ij} = Y^{u_i} s_j^{v}$ with organization i that he uses to do transactions with j. Since the pseudonym was obtained in the way described earlier in this section, j knows for sure that i knows a representation$(u_i, s_j)$ in $\mathbb{Z}_v \times \mathbb{Z}^*_n$ of $P_{ij}$ with respect to (Y; v).

At the start of his "career" i clearly does not yet have any credentials. Suppose that i by performing the restrictive blind signature protocol of, say, the flowchart in FIG. 2 with organization j obtains a credential of type 1; with $m=P_{ij}$, the input to the protocol is $mY_1$. In the first line of Box 22 of the flowchart of the protocol, i generates a number $t \in \mathbb{Z}^*_n$ to blind $mY_1$ to $(mY_1)t^v$. Note that the number t was denoted by s in Box 22. If the output may only be used with one organization, then an organization can require i to show a signature on the product of his pseudonym with that organization with $Y_1$. To this end i will have to make a suitable choice for t in the restrictive blind signature protocol.

In this way, after having taken part in this credential mechanism for a while, i might at a certain point in time have a number m with a corresponding signature such that he can write m as the product of powers $Y^{u_i} Y_1 Y_3 Y_5 Y_6 s^v$. That is, he knows the representation $(u_i, 1,0,1,0,1,1,0, \ldots, 0; s)$ of m with respect to $(Y, Y_1, \ldots, Y_k; v)$.

If i may prove only to organization j that he has these credentials, it suffices that j verify that the signature corresponds to the product $P_{ij} Y_1 Y_3 Y_5 Y_6$.

If i should be able to prove that he has certain credentials to any j with which he has a pseudonym $P_{ij}$, use is made of the fact that i knows representations of $m/P_{ij}$ with respect to vectors in which Y does not appear. To prove for example that he owns credential type 1 without revealing anything else, i must prove knowledge of a representation of the quotient $(m/P_{ij})/Y_1$ with respect to $(Y_2, \ldots, Y_k; v)$. In a similar way, to prove to j that he has credentials of types 1 AND 5 AND 6 but does not want to reveal any more than that, it suffices for i to prove knowledge of a representation of the quotient $(m/P_{ij})/(Y_1 Y_5 Y_6)$ with respect to $(Y_2, Y_3, Y_4, Y_7, \ldots, Y_k; v)$.

If i should be able to perform the proof to any organization, regardless of whether he has a pseudonym with that organization, then he must in the situation of the previous example prove knowledge of a representation of the quotient $m/(Y_1Y_5Y_6)$ with respect to $(Y,Y_2,Y_3,Y_4,Y_7, \ldots, Y_k; v)$. As explained earlier, if he does not mind about revealing additional information, it suffices that he prove knowledge of a representation of the number with respect to a shorter vector containing at least Y and v.

4.6 How many times may one show a credential?

Three categories can be distinguished regarding the number of times one is allowed to show a certain type of credential without revealing ones identity.

(1) Credentials that may be shown without restriction

This in fact has implicitly been assumed in all the previously discussed examples. The technique to realize this is to use the protocol of the first (or second) flowchart (FIG. 2), without requiring the user to feed extra numbers to the hash-function in the sixth line of Box 22; that is, the signature the user obtains corresponds to only one number A. If the user needs to prove knowledge of a representation of A with respect to a certain vector, he generates a second number B in such a way that he knows a random representation of B with respect to the same vector. He then user the two numbers A and B to perform the proof of knowledge described in the fourth flowchart (FIG. 5). As will be obvious to those of ordinary skill in the art, the more unpredictable the representation is that he knows of B, the better his privacy is guaranteed. So this depends on the quality of the method employed by the user's computing device to generate random numbers.

Summarizing, for each proof that must be performed the user uses a new, randomly chosen number B of which he knows a representation with respect to the required vector.

(2) Credentials that may be shown only once

A coin is a good example of such a credential.

A simple measure can be taken if users are allowed to show such credentials to only one organization with which they have a pseudonym; it can then be required that organizations themselves keep track that credentials have not been shown before to them. An example of a system in which this measure is sufficient is the system for paying under pseudonym, which will be described at the end of this section.

In general, this measure is insufficient. The general technique is the following: should a user show a credential more than once, at a central place (for example at the center) the number $u_i$ of the user should be computable (and hence his identity), so that charges can be pressed. (Note that this in fact also means that not even the center should know $u_i$, in order to enable users to prove framing attempts. This issue will be returned to in the next section, where in detail an off-line cash system is described.)

To this end, in the second box of the first (or second) flowchart the user is required to feed an extra number into the hash-function (sixth line of Box 22), so that the signature corresponds to both numbers.

Suppose that A is the number in which the user updates his credentials and that for showing possession of certain credentials he must be able to prove knowledge of a representation of A with respect to a certain vector, then in Box 22 he has to choose the number B such that he knows a randomly chosen representation of it with respect to the same vector. Using A and B he then performs the proof of knowledge of a representation described in the fourth flowchart (FIG. 5).

If the user at the time of taking part in the signature protocol does not yet know with respect to what vector of numbers, composed from the vector $(Y_1, \ldots, Y_k; v)$, he will have to perform the proof, he can generate B in such a way that he knows a representation of B with respect to $(Y_1, \ldots, Y_k; v)$; from this he can simply determine any representation of B with respect to a vector composed from the numbers in this vector.

Since the same B has to be used in each execution of the protocol for proving knowledge of a representation, showing the same credential twice (for different challenges) enables computation of $u_i$ from the two transcripts of the proof.

(3) Credentials that may be shown k times

One can think of examples such as tickets for the subway and telephone cards: a ticket that can be used to travel by subway 15 times is a coupon that may be shown 15 times.

In the special case in which this kind of credential may only be shown to one organization, the same measure as in (2) suffices.

In the general case of credentials that may be shown no more than k times, a simple modification of the general technique just described to deal with credentials that may be shown only once can be used. Namely, in the sixth line of the second box of the first (or second) flowchart, the user in addition "feeds" to the hash-function $\mathcal{H}$ k numbers $B_i$, such that he knows for each $B_i$ a (randomly chosen) representation with respect to the same vector as the vector with respect to which he has to know a representation of A.

When the user performs the proof that A "contains" certain credentials for the i-th time, he performs the protocol for proving knowledge (FIG. 5) of a representation using A and $B_i$. (This technique will be used in the off-line cash system in the next section to create coins that may spent k times.)

4.7 Powers of base numbers as credentials

Up to now, only the base number $Y_i$ represented a credential type. In the new mechanism it is very well possible to also make use of powers of the numbers $Y_i$ from the publicly known vector $(Y_1, \ldots, Y_k; v)$. Different powers of $Y_i$ can then for example represent different types of credentials, or more detailed specifications of credential type i. A special use for powers is to use them as "counters."

For instance, in the extreme case that one does never need to show more than just that one has one credential type from a set of k possible types of credentials, the center can suffice by making $Y_1$ publicly known instead of $(Y_1, \ldots, Y_k)$. Credential type 1 is then represented by $Y_1^l$. If a user i for example wants to be able to prove to any organization j with which he has a pseudonym $P_{ij}$ that he has credential type 3 (so he knows how to write m as, say, $m=Y^{u_i}Y_1^3 s^v$), then he has to prove knowledge of the v-th root modulo n of $(m/P_{ij})Y_1^3$.

In general, both techniques (different $Y_i$'s and powers) can be combined very well, as will be illustrated in various examples described shortly.

4.8 Negative credentials, positive credentials

Positive credentials are credentials that are in the user's interest to have, such as for instance a diploma. Negative credentials are credentials that are not in his interest to show. Obviously a credential can be positive at one time and negative at another, and this can vary per user. Perhaps a criminal record makes a good impression in case one is interested in joining a criminal organization.

As before, suppose that m is a number in which user i collects (maintains) his credentials. For clarity it will be assumed that he should be able to prove possession of credentials to any organization, regardless of whether he has a pseudonym with the organization. Those of ordinary skill in the art will be able to apply the technique also to the situations described previously.

For a positive credential type j, represented by $Y_j$, i must then prove knowledge of a representation of $m/Y_j$ with respect to a vector in which $Y_j$ does not appear. The same holds in general for products and powers of $Y_j$'s. If for example i wants to show that he has $Y_1^{10}$ AND $Y_3^{20}$ AND $Y_6^3$, then he must prove knowledge of a representation of $m/(Y_1^{10}Y_3^{20}Y_6^3)$ with respect to a vector in which none of the numbers $Y_1, Y_3, Y_6$ appear. In case i cannot perform the proof, one can safely assume that i does not have at least one of these credentials.

To prove that he does not have a certain negative credential, corresponding to $Y_i$, i must prove knowledge of a representation with respect to a vector in which $Y_j$ does not appear. If i wants to prove that he does not have any of the three credential types corresponding to $Y_3, Y_5, Y_7$, then he must prove knowledge of a representation of m with respect to a vector in which none of these three numbers appears. If he cannot perform this proof, one can safely assume that i at least owns one of these negative credentials.

Of course, a user could hide having a certain negative credential by using a older version of m in which the credential was not yet installed; to this end he of course must not have deleted previously the signature corresponding to that older version of m. Such abuse can be prevented by for example providing users with an additional, tamper-resistant computing device. This issue will be returned shortly, and a detailed example will be given in the next section.

4.9 Proving linear relations between credentials

Suppose that i collects credentials in a number m and he currently knows the representation $(u_i, a_1, a_2, a_3, a_4, \ldots; v)$ of m (so m is equal to the product $Y^{u_i}Y_1^{a_1}Y_2^{a_2}Y_3^{a_3}Y_4^{a_4}\ldots s^v$), and he wants to prove for example that $a_2$ modulo v equals $17a_1+13$ (but does not want to reveal the actual values of $a_1$ and $a_2$). He must hereto prove knowledge of a representation of the quotient $m/Y_2^{13}$ with respect to a vector in which the product $Y_1Y_2^{17}$ appears. If he wants to be able to prove that, say, $a_1+a_2$ modulo v equals $a_3$ mod v, then he must know a representation of m with respect to a vector in which both the product $(Y_1Y_3)$ and the product $(Y_2Y_3)$ appear.

A final example will be given; this is believed to be sufficient for those of ordinary skill in the art to apply the technique to other equations. In order to be able to prove that $2a_1+2a_2+3a_3=a_4-5$ mod v, he must know a representation of $m/Y_4^5$ with respect to a vector in which all of the following three products appear: $(Y_1Y_4^2)$, $(Y_2Y_4^2)$, $(Y_3Y_4^3)$.

As will be obvious to those of ordinary skill in the art, in a similar way this technique can be realized to prove any linear relation.

Note that linear relations are being proven modulo v. Since v must be large (say 128 bits in practice), this means for practical purposes that one proves linear relations between integers, which is clear in view of the fact that exponents only have a meaning modulo v; the $Y_i$'s are multiplied into m by the certifying party, and any powers of a number $Y_i$ will be very small in comparison with v.

The technique in the next subsection is a special instance of the above technique.

4.10 Proving possession of 1 out of k specified credentials

Suppose one wants to prove having at his disposal at least 1 out of k specified credentials, corresponding to say $(Y_1, \ldots, Y_k)$. One must then prove knowledge of a representation of $m/Y_k^1$ with respect to a vector in which each of the quotients $Y_1/Y_k, Y_2/Y_k, \ldots, Y_{k-1}/Y_k$ appears.

One is then actually proving that one can write m as the product $Y_1^{a_1}\ldots Y_k^{a_k}\ldots s^v$ such that $a_1+\ldots a_k$ equals 1 modulo v. If the values of $a_i$'s can only be 1 or 0, because certifying parties see to it that they do not multiply the same $Y_i$ twice into m, then the ability to perform the proof exactly proves that 1 out of the k numbers $a_i$ has the value 1, and the modulo v operator in fact does not matter.

A special case of this technique is the "exclusive-or" credential. With such a credential one proves that one has exactly one of two credentials. If these credentials correspond to for instance $Y_1$ and $Y_2$, one must hereto prove knowledge of a representation of $m/Y_2$ with respect to a vector containing the quotient $Y_1/Y_2$.

4.11 Credentials of which one does not want to reveal whether one has them

The technique again seems best explained with a typical example. Suppose that i performs a proof for certain credentials "contained" in m, but in any case does not want to reveal whether he owns the credentials $Y_3, Y_4, Y_5$. To this end, he must perform the proof of knowledge of a representation with respect to a vector in which each of the numbers $Y_3, Y_4, Y_5$ appears.

If he only wants to keep secret whether he owns the ensemble $Y_3, Y_4, Y_5$, it suffices to provide the proof with respect to a vector in which the product $Y_3Y_4Y_5$ appears.

It will be clear to those of ordinary skill in the art how to employ this technique to hide other credentials. In fact, various other situations in which this technique is used are described shortly.

4.12 Extra security by means of a tamper-resistant computing device that is embedded within the computing device of the user In the credential mechanism known in the prior art, the computing device is completely under control of the user. The user can hence show credentials to any organization he wants, and perhaps even destroy negative credentials (such as a criminal record). By using an additional, tamper-resistant computing device that is "embedded" within the computing device of the user (called a "bank-module" in the off-line electronic cash system described in the next subsection), the certifying parties can make sure that they have more control over the way users use their credentials. This idea by itself is well-known in the art; however, no constructions have been proposed in the prior art in conjunction with the credential mechanism known in the prior art.

Using the new inventive concepts, such devices can be incorporated efficiently and securely. Hereto it must be taken care of that the knowledge of the representation that a user should know of a number m on which he has a signature, is "shared" with the embedded module; only as an entity should the user-module and the embedded module know a representation of m. If the user wants to prove that he has certain credentials (for which a proof must be provided of knowledge of a representation of m with respect to a suitable vector), the proof must then necessarily be performed in cooperation with the embedded module.

This can be realized for example in the following way. Each time a user proves something about his credentials, "contained" in a number m as described before, the signature and possibly also m itself are "updated" by means of a restrictive blind signature protocol. As will be appreciated, any restrictive blind signature protocol suitable for the first preferred embodiment can be used. In that case it suffices that the tamper-resistant computing device assist only once in performing the protocol for showing credentials contained in a number m with the same signature. For at least one of the numbers $a_i$ in the representation $(a_1, \ldots, a_k; s)$ of m it should be the case that the tamper-resistant computing device knows, say, $o_i \in \mathbb{Z}_v$ (this number should be unknown to the user) and the computing device of the user knows $x_i \in \mathbb{Z}_v$, such that $a_i=o_i+x_i$ mod v. Possibly also the knowledge of s can be shared.

As will be clear to those of ordinary skill in the art, there are in fact two (extreme) ways in which the knowledge of a representation can be shared over two computing devices. The first is that certain numbers are known only to one of the devices, and the others only to the other device. The second is that each number is taken as a sum (or product) of two numbers, and each of the computing devices knows exactly one of these two factors. These two ways can of course be used in combination.

In general one should take $m=m_1 m_2$, where the tamper-resistant computing device is the only one to know a representation of $m_1$ (however, it should not know $m_2$). This would imply that the user by himself does not know a representation of m, and hence really needs the assistance of the tamper-resistant computing device.

This assistance can always be realized by the following technique. The tamper-resistant computing device proves to the user-module that it knows a representation of $m_1$, in such a way that the proof is split into two stages. The first transmission takes place during the restrictive blind signature protocol, and the other two transmissions (challenge and corresponding responses) during the protocol in which the user proves to the organization knowledge of a certain representation of m. This new technique will be illustrated in detail in the example, pertaining to off-line electronic cash systems, described in the next section.

As will be obvious to those of ordinary skill in the art, this technique can be trivially generalized for the case in which more than two computing devices are involved.

4.13 Relations between credentials contained in distinct m's

If each category of credentials "belonging together" is collected and maintained in its own number $m_i$, one can still consider representation for different $m_i$'s with respect to the same vector $(Y_1, \ldots, Y_k; v)$. In doing so, it can be taken as a convention that only, say, $Y_k$ is distinct per category of credentials. $Y_k$ in fact then indicates what category of credentials is involved. In performing a proof of knowledge of a representation with respect to a certain vector one should at the same time prove that the correct $Y_k$ is involved.

Suppose for example that one gathers his credentials related to chess in $m_1$ and credentials related to money in $m_2$. The exponent on $Y_1$ denotes ELO-rating in case of $m_1$, and the exponent on $Y_1$ in case of $m_2$ denotes the hight of monthly income. Clearly it should not be possible that one can prove to the chess federation that one has an ELO-rating of 2800 by using $m_2$ (while 2800 would in fact be the monthly income). By seeing to it that for chess credentials one also has to show $Y_{k1}$, and for income credentials $Y_{k2}$, this is prevented. In order to show certain credentials contained in $m_2$ for chess purposes the user then has to prove knowledge of a representation of $m_2/Y_{k1}$ with respect to an appropriate vector, which he cannot do since he does not know a representation $m_2$ with respect to a vector in which this number appears.

Since the other $Y_i$'s are the same for both $m_1$ and $m_2$, it is possible to prove relations between chess credentials and income credentials by using quotients or products of $m_1$ and $m_2$. For example a user may want to prove that his monthly income exceeds his ELO-rating by 500. As will be appreciated, one can apply all of the previously described techniques also to the quotient or product of various m's. This technique will be illustrated shortly with an example.

In the same way, different users can together prove that the ensemble of their credentials meets certain criteria, for example they can prove that as a group they have a certain credential. Furthermore one can allow for collective pseudonyms, such that none of the individual parties knows a representation of the collective pseudonym. A collective pseudonym can for example be the product of individual pseudonyms.

These techniques will be extensively illustrated in the subsection on off-line electronic cash systems. Again, the described techniques allow for many combinations which are believed to be obvious to those of ordinary skill in the art.

4.14 Further techniques for credentials in the new mechanism

It will be clear to those of ordinary skill in the art that there are a great many possible variations of the described techniques, without deviating in any way from the following nucleus of the inventive techniques: credentials of a user are represented by means of the representation the user knows of a certain number (corresponding to which he has a digital signature) with respect to a certain vector. The function of the number for which he can perform the proof and the vector with respect to which he is able to perform the proof indicate what credentials he owns or certain relations between them.

To illustrate the point, several of such variations will now be described.

A specially appointed number $Y_k$ can for instance perform the role of a counter for the number of credentials in m, or an expiration date. This can be realized because the center (which after all computes the signatures, at the request of organizations) in its role of certifying party can multiply each number that it is requested to sign by a number $Y_k$ (or a power thereof) before computing the signature.

An organization can also divide out a credential (destroying the credential). This can be used for example to prevent the length of the representation from growing all the time. Suppose that i can write the number m as $Y^{u_i} Y_1 Y_3 Y_5 Y_6 s^v$, and a certain organization only provides credential type 7 if one has credential types 1 and 5 but not 2. User i will then first have to prove to the organization that he meets this requirement, i.e. that he owns credential types 1 and 5 but not 2. This can be done with the techniques described before; the organization engages in a restrictive blind signature protocol where $mY_7/(Y_1 Y_5)$ is taken as input. The output will then be $m'=Y^{u_i} Y_3 Y_6 Y_7 t^v$ for a certain number $t \in \mathbb{Z}^*_n$. The user can henceforth suffice by proving that he has credential type 7, since this implies that he has credential types 1 and 5 but not 2. In this way one can realize "summarizing" credentials.

One can prove possession of for example credential type k OR l by proving knowledge of a representation with respect to at least one of two different vectors, without revealing with respect to which of the two vectors one knows the representation.

An additional advantage of gathering credentials in one number m (with signature) is that positive and negative credentials are all linked to one another. As noted before, a potential danger is that users who do not want to show negative credentials will try to make use of an earlier version of m (with corresponding signature). By letting the tamper-resistant computing device control a part of the representation of m (that is, the user-module by itself does not know a representation with respect to the required vector), and letting it assist only once per signature with the proof of knowledge of a representation of m (as explained earlier), the problem is solved to a big extent. Namely, in case a user wants to use an earlier version of a number m in which a certain negative credential was not yet installed, he cannot perform the proof of knowledge of a representation since the tamper-resistant device will not cooperate. Since positive and negative credentials are linked to one another within m, this also means that he will no longer be able to show his other credentials, including the positive ones. The user will hence have to be able to extract the memory contents of the tamper-resistant computing device in order to cheat in this way. Breaking the tamper-resistance by itself should be a very difficult task. By requiring that each signature is on a pair (m,B) instead of just on m, the number m can only be used once, as explained before. Using it twice in a proof reveals the identity of the user. In this way it is ensured that even if the user would be able to extract the contents of the tamper-resistant device, he will still be identified after the fact if he performs the proof for the same m. Obviously the center must hereto store all numbers m for which proofs have been given, and the proofs that users give to organizations must be of the "signed proof" type. The cash system described in the next section extensively makes use of this technique.

Another remark pertains to the power of the center, which indirectly does all the certification. (As explained, there is actually just one certifying party: if an organization wants to have a number f(m) certified for a certain user, it requests the center to do so.) To prevent the center from knowing what it certifies, the organization can have $f(m)r^v$ certified, where $r \in \mathbb{Z}^*_n$ is some random number. In the third box of, say, the flowchart of FIG. 2 the organization then receives a number b from the center, from which it first "strips" $r^c$ mod n (in the case of FIG. 2; a similar thing holds when any other restrictive blind signature protocol suitable for the second preferred embodiment is used) before sending it on to the user. Furthermore, in FIGS. 2 and 3 signatures can be forged on arbitrary numbers, although one will not know a representation of these numbers. In this way an organization can even hide how many certifications are actually performed; the organization can offer a "dummy" number m for certification to the center, even if the center always wants to receive in addition a corresponding signature (since the organization is not supposed to know a representation of m). Another measure is to use a "threshold" scheme to ensure that at least 1 out of k computing devices have to cooperate in order to perform the role of $\mathcal{P}$ in the restrictive blind signature protocol; in that way the power of the center can be decentralized.

A user may not just use as pseudonyms numbers $Y^{u_i}s_j^v$ for the same Y, but also for different Y's, and there can be many distinct centers that each certify different categories of credentials; each center should then use a different modulus n.

As will be appreciated, all described techniques can be effortlessly combined. Various examples of this have already been described, and others will be described shortly. It is believed that it is an obvious matter for those of ordinary skill in the art to use the new techniques in various combinations by studying the descriptions in this application.

4.15 Implementation

Some remarks concerning efficiency of implementation are in order. In the computing device of the user the numbers Y, $(Y_1, \ldots, Y_k; v)$, X and n have to be stored in non-volatile memory. However, the center can generate these numbers for example according to the recursion $Y_{i+1}=f(Y_i)$ for some simple, publicly known function f (with $Y=Y_0$) and randomly chosen $Y_0$. For instance, $Y_{i+1}=Y_i+1$ mod n. In that case, the user-module need only store (n,v,X,Y). Clearly, taking X to be equal to $Y_{k+1}$, storage of X can also be prevented.

To maintain credentials not much dynamic storage is required: only the representation that one knows of m must be stored (and of course the signature received last).

In the restrictive blind signature protocols in each of the described flowcharts (FIGS. 2, 3 and 4), the need for the first transmission (specified in the first box) can be prevented. To this end, the certifying party provides the user with a number $a_1$, and it is agreed that, say, $a_i=a_{i-1}+1$ mod n will be used as the number a in first box of the i-th execution of the protocol between the two parties. Clearly in a system where the certifying party performs the protocol with many users, care has to be taken that in the first box the same number a is not used in more than one execution of the protocol. When user j first "registers," the certifying party can provide him hereto with for example the number $a_{1,j}=a_{1,j-1}+10^7$ mod n, and agree that in the i-th execution of the protocol with j, in the first box the number $a_{i,j}=a_{i-1,j}+1$ mod n will be used. Assuming that no user will execute the protocol more than $10^7$ times, it can never happen that the same number a is used twice in Step 1 of different executions of the protocol. (This measure can even be taken for each different pseudonym $P_{ij}$, rather than only for different users). As will be obvious to those of ordinary skill in the art, various other recursive relations can be used as well instead of those described here.

In the next two subsections several systems will be described by way of illustrating the techniques. In the next section an application of specific interest will be described in great detail.

4.16 An example

Suppose that a number m (with corresponding signature) is used to maintain credentials relating to the game of chess; other categories of credentials are maintained in different m's. The center in this case might be the national chess confederation. Organizations are committees of tournaments, of chess clubs, sponsors, issuers of chess magazines etcetera. The national chess confederation has made publicly known a vector $(Y_1, \ldots, Y_5; v)$, in addition to the information needed to verify the restrictive blind signatures and Y.

Credential $Y_1$ denotes whether one plays chess. More specifically, an exponent on $Y_1$ denotes ones ELO-rating.

The exponent on $Y_2$ denotes how many games one has won in the past year, and that on $Y_3$ how many games were lost.

Credential $Y_4$ is somewhat more complicated; it denotes that one has taken part in the national chess championship, and the exponent denotes what ranking one achieved in which edition of the national championship. Supposing that one can only end up in one of the positions 1 up to and including 9, the following encoding is used. If in the i-th edition of the national championship one ended in position j then this is represented by $j \cdot 10^i$. (Hence, a zero denotes that one did not participate.) By expanding in radix 10 (in general a suitable radix; if there are d possible positions, radix d+1 is used) each possible history can be uniquely represented by one positive integer.

Finally, credential $Y_5$ denotes whether one has ever maltreated an opponent.

Suppose that a chess player i has a number $m_i$ (with signature) that he can write as $Y^{u_i}Y_1^{2350}Y_2^{150}Y_3^{10}Y_4^{2400}s^v$. That is, he knows the representation $(u_i,2350,150,10,2400,0; s)$ of $m_i$. This means that i has an ELO-rating of 2350, has won 150 times and lost 10 times in the past year, ended in fourth place in the third edition of the national championship and in second place in the succeeding edition, and has never maltreated an opponent.

Suppose i only wants to prove that the number of games he won is 15 times the number of games he lost, without revealing the respective numbers, and that he ended in fourth position in the third edition and second in the fourth edition of the national championship, but has never maltreated an opponent. He does not want to reveal any information about his ELO-rating. He should be able to perform the proof to any chess organization j with which he has a pseudonym $P_{ij}$.

To this end, i shows a signature on $m_i$ and proves knowledge of a representation of the quotient $(m_i/P_{ij})/Y_4^{2400}$ with respect to $(Y_1, Y_2^{15}Y_3; v)$ (using for instance the protocol depicted in FIG. 5).

Suppose now that i participates in the fifth issue of the national championship, looses all 16 games, and is so frustrated that he maltreats the champion. Suppose furthermore that, as a consequence of this result, his ELO-rating drops by 250 points. The following credentials should then be updated in $m_i$: ELO-rating minus 250, 16 games lost, ended in 9th position in the fifth edition of the national championship, maltreated an opponent. To this end, the organizing committee uses as the input to the restrictive blind signature protocol $m_i Y_1^{-250} Y_3^{16} Y_4^{90000} Y_5$. The number $m_i$ will be transformed by i by means of the protocol to an output (that will for simplicity still be denoted by $m_i$) $m_i = Y^{u_i} Y_1^{2100} Y_2^{150} Y_3^{26} Y_4^{92400} Y_5 t^v$ with a new signature.

Now suppose another chess player k has a number $m_k$ of the form $Y^{u_k} Y_1^{2500} Y_5$ with a signature. In order to show that their average ELO-rating is exactly 2300, to any organization, i and k have to prove that they together know a representation of $(m_k m_i)/Y_1^{4600}$ with respect to $(Y, Y_2, Y_3, Y_4, Y_5; v)$. If on the other hand they are only supposed to prove this to an organization j at which they both have a pseudonym, (or one collective pseudonym), then they have to prove that together they know a representation of $(m_k m_i / (P_{ij} P_{kj}))/Y_1^{4600}$ with respect to $(Y_2, Y_3, Y_4, Y_5; v)$ ($P_{ij} P_{kj}$ can be the collective pseudonym). In both cases they have at their disposal two techniques: firstly, they can perform the proof in such a way that one of them will not know what the other is actually proving (the protocol is then as in the situation with the additional, tamper-resistant computing device). Secondly, they can perform the proof in such a way that it does not matter whether they will know what the other is proving. In the second case it is required that i and k combine in each step the numbers they would actually have sent were they to give the proof on their own. This protocol has been described after the description of the fourth flowchart (FIG. 5).

4.17 A second example: off-line payments under pseudonym

To further illustrate the described techniques, a secure and highly efficient off-line cash system is described here. In this system users are assumed to have a different pseudonym with each organization to which they want to be able to pay. A more complex off-line cash system is described in the next section.

For clarity it will be assumed that coins of only one denomination are issued. Although this system is referred to as a cash system, and the one-show credentials as coins, clearly the one-show credentials might as well be coupons, or any other type of credential that may only be used once.

Set-up

In the set-up of the system user i opens an account at the bank. To this end he (or the bank) generates a number $u_i$ in $\mathbb{Z}_v$. His "pseudonym" with the bank will be $Y^{u_i}$, and this number will be denoted by $m_i$.

User i then performs the validation protocol with the bank (see the flowchart of FIG. 6), such as to obtain pseudonym $P_{ij} = Y^{u_i} s_j^v$ for use with organization j. This protocol is repeated as many times as i requires pseudonyms for use with organization. In case i wants to use pseudonym $P_{ij}$ with organization j, he not only shows $P_{ij}$ and the signature to j but also has to prove knowledge of a representation of $P_{ij}$ with respect to $(Y; v)$ (using the protocol of FIG. 5). If j accepts, it contacts the bank to verify that the pseudonym is not already in use. If this also holds, then j registers the number as a pseudonym.

Withdrawal of a coin

To this end, i and the bank perform the protocol of the first or second flowchart, using $m_i$ as the input. At this moment i must already know at what organization he will spend the coin. Assuming he intends to spend it at j, he transforms $m_i$ to a signature (c',b') on $P_{ij}$ by means of the protocol; to this end he uses in the first line of the second box the number $s_j$.

Paying with a coin

User i sends the signature (c',b') on $P_{ij}$ to j. Organization j accepts this information as a means of payment if it is a signature on $P_{ij}$ and the signature has not been received before. (Notice that there are a great many signatures corresponding to one pseudonym, and that the user can hence see to it in the withdrawal protocol that he will receive a different one each time.) The signature is then stored by j in a database with a reference to pseudonym $P_{ij}$.

Crediting the account of the organization

After some time j can send the set of received signatures corresponding to $P_{ij}$ to the bank. The bank verifies all the signatures and verifies that there are no duplicates among them or signatures that have been "deposited" earlier. If this holds, then the bank credits the account of j.

Remarks

In order to realize the issuing of coins of various denominations (in general, one-show credentials of distinct types) the bank can make publicly known a vector $(Y_1, \ldots, Y_k)$, where $Y_l$ denotes denomination type 1. In case user i wants to withdraw a coin of type 1, the number $m_i Y_l$ will be taken as input. In the payment "protocol" organization j then verifies that the received information is a signature on $P_{ij} Y_l$.

Another technique is to represent the denomination type using an exponent on only one publicly known number $Y_1$. To withdraw type k the input to the protocol will be $m_i Y_1^k$. In the payment protocol j verifies that the received information is a signature of the bank on $P_{ij} Y_1^k$.

In the next section a more complex type of cash system is described, in which a user can pay anywhere, regardless of whether he has a pseudonym with the payee. The system described above, in which users can only pay under one pseudonym, is much simpler because organizations can themselves verify whether a coin has already been spent before. For this reason, sending the signature is the only requirement to pay (challenge and response are not needed).

5 Off-line electronic cash system

The off-line cash system that will now be described is the most complete example given in this application to illustrate the powerful techniques for privacy-protected transfer of certified information. Many of the techniques described before are illustrated once more in great detail with this system.

In the description the restrictive blind signature protocol from the first flowchart (FIG. 2) will be used. As will be obvious to those of ordinary skill in the art, any other restrictive blind signature protocol can be substituted instead (for example one of the other protocols described in this application). All protocols in that case require merely some minor modifications, depending only on the specific relation that is conserved in the representations known of input and output.

5.1 Basic system

Set-up of the system

Before the system can be put to use, $\mathcal{B}$ generates the following numbers:

1. Two large prime numbers p, q. The product n of p and q is made publicly known by $\mathcal{B}$. Suitable choices for p, q are well-known in the art.

2. A large prime number v, co-prime to $\phi(n)$. $\mathcal{B}$ computes $v^{-1}$ mod $\lambda(n)$. This number will henceforth be denoted by 1/v. As is well-known in the art, the function $\phi$ is the Euler phi-function, and $\lambda$ is the Carmichael function.

3. Two different numbers X,Y $\in \mathbb{Z}^*_n$, preferably of order $\lambda(n)$.

In practice n is often taken to be at least 512 bits, and v for example 128 bits. The requirement that v be a prime number is not necessary though it seems preferable in this particular system. It will be obvious to those of ordinary skill in the art how to make the necessary adaptations in case a composite v is used.

$\mathcal{B}$ also chooses two "collision-free" hash functions $\mathcal{H}$ and $\mathcal{H}_0$. Here, $\mathcal{H}$ maps an argument consisting of three numbers in $\mathbb{Z}^*_n$ to $\mathbb{Z}_v$ and, for example, $\mathcal{H}_0$ maps an argument consisting of a vector of four numbers from $\mathbb{Z}^*_n \times \mathbb{Z}^*_n \times$SHOP-ID$\times$DATE/TIME to $\mathbb{Z}^*_v$. The function $\mathcal{H}$ is used as detailed in the description of the first flowchart (FIG. 2), with the distinction that the signature will correspond to a pair of numbers, by letting $\mathcal{R}$ feed an extra number in the sixth line to $\mathcal{H}$. This usage has been explained after the description of the first flowchart.

The function $\mathcal{H}_0$ specifies in what way the shop in the payment protocol must generate the challenge. The above specified format of $\mathcal{H}_0$ assumes that each shop $\mathcal{S}$ has a unique identification number I$\mathcal{S}$ that should be known at least to $\mathcal{S}$ itself and to $\mathcal{B}$. It might for example be the account number of $\mathcal{S}$ at $\mathcal{B}$. In that case, SHOP-ID denotes the set of all possible account numbers of shops. The set DATE/TIME consists of numbers that represent a date and time; in the payment transaction $\mathcal{S}$ must choose from this set the number that represents date and time of the transaction. As will be clear to those of ordinary skill in the art, this format for $\mathcal{H}_0$ is only exemplary; other formats can be used instead (for example, $\mathcal{S}$ can feed a randomly chosen number, possibly in addition, to $\mathcal{H}_0$; also, the signature of $\mathcal{U}$ might be taken as part of the argument), although to prevent forgery of payment transcripts at least A and B should both be in the argument.

$\mathcal{B}$ makes $(X,Y,v,n)$ and the description of $\mathcal{H}$, $\mathcal{H}_0$ publicly known. The prime factorization of n is the secret key of $\mathcal{B}$. It is noted that in the basic system and the first extension (additional, tamper-resistant computing devices) $\mathcal{B}$ in principle need only know $X^{1/v}$ and $Y^{1/v}$ as the secret key in order to properly perform the protocols. The way this can be realized has already been indicated after the description of the first flowchart.

A digital signature of $\mathcal{B}$ on a pair (A,B) in $\mathbb{Z}^*_n \times \mathbb{Z}^*_n$ consists of a pair (c,b) in $\mathbb{Z}_v \times \mathbb{Z}^*_n$ such that the verification relation $c = \mathcal{H}(A,B,b^v(XA)^{-c})$ holds, (as explained in the description of the first flowchart, this is equivalent to using (a,b) as the signature.)

$\mathcal{B}$ also arranges a database for its own use to store relevant information related to the account holders (such as identity-related information in the form of name, address etcetera), and a database to store the relevant parts of the information sent by shops to $\mathcal{B}$ in the deposit protocol.

Clearly, the publicly known information will be incorporated into the software of the computing devices of the account holders (or in the hardware, for example in ROM).

Opening an account with $\mathcal{B}$

In order to open an account with $\mathcal{B}$, $\mathcal{U}$ must first identify himself (using for example a passport). $\mathcal{B}$ registers the identity-related information (such as name and address) together with a number $u_i$ in $\mathbb{Z}_v$. $\mathcal{B}$ chooses this number such that it is different for each account holder. If $\mathcal{U}$ cheats by spending the same coin various times, $\mathcal{B}$ will be able to compute $u_i$. Since it is registered in this stage, $\mathcal{B}$ then knows that $\mathcal{U}$ was the double-spender, and can hence press charges. The number $Y^{u_i}$ will henceforth be denoted by m.

The withdrawal protocol

Turning now to FIG. 7, the flowchart for the withdrawal protocol between $\mathcal{U}$ and $\mathcal{B}$ for a coin will now be described in detail.

Box 71 shows $\mathcal{B}$ generating a random number a $\in \mathbb{Z}^*_n$, which it then sends to $\mathcal{U}$.

Box 72 is almost the same as Box 22. The only distinction is that the number m' is here denoted by A, and an additional number B is generated. This is done by generating two additional random numbers, as specified in the third, fourth and fifth lines. This number is also included in the argument to $\mathcal{H}$. Reference is made to Box 22 for the other actions taken by $\mathcal{U}$. Note that the blinded challenge c is sent to $\mathcal{B}$.

Box 73 is the same as Box 23. Likewise, the actions taken by $\mathcal{U}$ in Box 74 are the same as those taken by $\mathcal{R}$ in Box 24.

Not displayed is that $\mathcal{B}$ debit the account of $\mathcal{U}$ with the value of the withdrawn coin. This can take place at any time, independent of the actions in the flowchart.

If both parties followed the protocol as specified by the flowchart, $\mathcal{U}$ now has at his disposal five number $(s,x_1,x_2,c',b')$ such that $(c',b')$ is a signature on (A,B), where A is equal to $Y^{u_i} s^v$ and B is equal to $Y^{x_1} x_2^v$.

The payment protocol

Turning now to FIG. 8, the flowchart for the payment protocol between $\mathcal{U}$ and $\mathcal{S}$ is described in detail.

Box 81 shows $\mathcal{U}$ sending (A,B) and the signature (c',b'), obtained in the withdrawal protocol, to $\mathcal{S}$.

Box 82 indicates that $\mathcal{S}$ computes the challenge d as the image of (A,B, I$\mathcal{S}$,date/time) under the hash-function $\mathcal{H}_0$, where date/time is the number that represents date and time of the transaction.

The first two lines of Box 83 specify how $\mathcal{U}$ computes the two responses $r_1$ and $r_2$. $\mathcal{S}$ sends these responses to $\mathcal{S}$.

The first line of Box 84 shows $\mathcal{S}$ testing the correctness of the signature sent in Box 81 by $\mathcal{U}$. The next line specifies how $\mathcal{S}$ tests whether the responses sent by $\mathcal{U}$ in Box 83 are correct.

As will be appreciated, $\mathcal{U}$ can compute the challenge d in Step 2 himself if he has access to a clock, and can "look up" I$\mathcal{S}$ of $\mathcal{S}$ himself.

The deposit protocol

Next, the deposit protocol will be described. Since there is no interaction needed, a figure has been omitted.

For example at the end of the day $\mathcal{S}$ sends the "payment transcript," consisting of $((A,B), (c',b'),(r_1,r_2))$ and date/time of the transaction, to $\mathcal{B}$.

$\mathcal{B}$ searches its database in order to determine whether A has been deposited before by a shop. Two cases can be distinguished:

1. A is not yet in the database. In that case $\mathcal{B}$ computes the number d by using I $\mathcal{S}$ of $\mathcal{S}$ and the provided number date/time of the transaction. $\mathcal{R}$ then verifies whether c' is equal to $\mathcal{H}(A,B,(b')^v(XA)^{-c'})$ and $Y^{r_1}r_2^v$ is equal to $A^dB$. If both verifications hold, $\mathcal{R}$ stores the vector $(A,d,r_1)$ in the database and credits the account of $\mathcal{S}$ with the value of the coin in question.

2. A is already stored in the database. In that case a fraud has taken place. If the information that is already stored was also provided by $\mathcal{S}$, and date/time is equal to that of the newly provided payment transcript, then $\mathcal{S}$ is trying to get credited twice for the same transcript. If this is not the case, the $\mathcal{B}$ computes the number d, and verifies the two verification relations as in the first case. If both verifications hold, an account holder must have paid (at least) twice with the same coin. $\mathcal{B}$ then has at its disposal $(d,r_1)$ from the newly presented payment transcript, and $(d',r'_1)$ which is already stored. The number $(r_1-r'_1)/(d-d') \bmod v$ must then be the exponent $u_i$ of the account holder $\mathcal{U}$ that double-spent. Hence $\mathcal{B}$ can determine the identity of the cheater and take appropriate actions.

Remarks

It will be appreciated by those of ordinary skill in the art that the flowcharts can be modified in various ways, without needing to deviate from the use of the inventive concept of restrictive blind signatures in combination with knowledge of representations. For example, it is well-known that one can also use "blank" coins. These do not have a fixed value; the computing device of the user, or a part of it, is made tamper-resistant so as to prevent access to memory. A counter in the computing device then keeps track of the amount of money for which the user spends the blank coin. Withdrawing money and spending then simply consists of updating the counter. In case the user tampers with the counter, he still cannot spend the same money many times without being identified afterwards.

One can employ various of the techniques described earlier in the cash system. For instance, instead of $m=Y^{u_i}$ the number $m=Y^{u_i}Y_1^t$ can be used as input to the withdrawal protocol. The number t can in that case represent for example a specific month in which the coin may be spent. The rest of the protocol remains the same. In order to pay in a certain month represented by the number t', $\mathcal{U}$ must perform the same proof in the payment protocol as described above, only now using the quotient $m/Y_1^{t'}$ instead of m (he in fact is then proving that he has a credential corresponding to $Y_1^{t'}$). Another possibility is that t represents the value of the coin. In this way, as in the general credential mechanism, various $Y_i$'s and powers thereof can be multiplied with $Y^{u_i}$ by the bank and then taken as input to the withdrawal protocol.

In practical implementations one will often want to use pseudo-random numbers instead of "truly random" numbers. For example, $\mathcal{U}$ uses a linear congruential generator with modulus v and unknown parameters and $\mathcal{B}$ uses a cryptographically strong generator, possibly mixed (bitwise exclusive-or) with the output of e.g. a noise generator.

Note that throughout the protocols $\mathcal{H}(B)$ can be used instead of B, for a suitable hash-function $\mathcal{H}$ (possibly the same hash-function as the one that is already used). In the withdrawal protocol in Box 72 the number $\mathcal{H}(B)$ is then fed as an argument to the hash-function. In the payment protocol $\mathcal{U}$ then sends the image of B under $\mathcal{H}$ instead of B itself, and $\mathcal{S}$ verifies that c' equals $\mathcal{H}(A, \mathcal{H}(B),(b')^v(XA)^{-c'})$ and $\mathcal{H}(Y^{r_1}r_2^v A^{-d})$ equals $\mathcal{H}(B)$.

Furthermore (although it is not so clear any more that this should be secure) the two verification relations that have to be verified by $\mathcal{S}$ in the payment protocol can be combined into one by substituting one of the relations into the other.

In a practical implementation the efficiency can be increased by not, only occasionally, or only afterwards letting the user check the verification relation in Step 3 of the withdrawal protocol. Likewise, the bank can perform the search through its database to detect double-spending and the test for double-spending only occasionally instead of doing this at the very moment the payment transcript is received.

Finally, as noted in the previous section, the bank can agree with $\mathcal{U}$ on a number $a_0$ when $\mathcal{U}$ opens his account; in the i-th execution of the withdrawal protocol with $\mathcal{U}$, say, $a=a_0+i \bmod n$ will be used instead of a randomly chosen a. The withdrawal protocol then only requires two steps.

As will be obvious to those of ordinary skill in the art, this system can be implemented such that the privacy of payments is optional. That is, in case $\mathcal{B}$ wants to "turn off" the privacy, all the blinding factors are set to fixed values (preferably the numbers in $\mathbb{Z}^*_n$ are set to 1, and those in $\mathbb{Z}_v$ to zero). Since the bank can in that case compute them, there need be no interaction in the withdrawal protocol.

Clearly all these remarks also apply to all the extensions that will be described.

5.2 EXTENSION: additional bank-module that is embedded in the computing device of the user A possible disadvantage of the basic system is that $\mathcal{B}$ will only afterwards find out that a coin has been double-spent. It is well-known in the art that $\mathcal{B}$ can make double-spending a priori infeasible. To this end each account holder with $\mathcal{B}$ will receive a so-called bank-module that is tamper-resistant. The bank-module is a computing device with its own memory (such as a smart card), just like the computing device of the user. Because of its tamper-resistance, contrary to the user's own computing device the contents of the bank-module cannot be studied and/or copied. It is then seen to it that the computing device of the user can only perform transactions in cooperation with the bank-module. This offers prior restraint of double-spending of coins, since the bank-module does not cooperate in double-spending.

It is known in the art that the bank-module must be "embedded" within the computing device of the user in order to guarantee his privacy. Various criteria are known that must be met by the protocols in order to guarantee various gradations in privacy. The extension is described here under the most stringent of all requirements for privacy, and such that even if the tamper-resistance of the bank-module is broken $\mathcal{B}$ can still identify a double-spender afterwards (as before). That is, there is a "safety net" in case the tamper-resistance of the bank-module is broken. As will be appreciated by those of ordinary skill in the art, such a system is not known in the prior art.

Obviously, if one is content with weaker requirements then there are many modifications possible, without deviating from the essential techniques. Such modifications are believed to be easily derivable from the detailed descriptions and the many examples in the present application by those of ordinary skill in the art.

Set-up of the system

This is the same as in the basic system.

Opening an account with $\mathcal{B}$

First, $\mathcal{U}$ and $\mathcal{B}$ perform the procedure described in the basic system for opening an account. $\mathcal{B}$ then gives a bank-module $\mathcal{O}$ to $\mathcal{U}$. $\mathcal{O}$ has stored in its memory (e.g. in ROM) a number $o_1$ in $\mathbb{Z}^*_n$ that $\mathcal{B}$ has chosen at random. $\mathcal{B}$ does not reveal this number to $\mathcal{U}$. $\mathcal{B}$ does reveal the number $o_1^v$ to $\mathcal{O}$; this number will be denoted by $A\mathcal{O}$. The number $Y^{u_i}A\mathcal{O}$ will perform the role played by $Y^{u_i}$ in the basic system. As before, $Y^{u_i}$ will be denoted by m. One can in fact think of $mA\mathcal{O}$ as the collective pseudonym of $\mathcal{O}$ and $\mathcal{U}$ with $\mathcal{B}$.

The withdrawal protocol

Turning now to FIG. 9, the flowchart for the withdrawal protocol of a coin between $\mathcal{U}$, assisted by $\mathcal{O}$, and $\mathcal{B}$ is described in detail.

Box 91 shows $\mathcal{O}$ generating a random number $o_2$ in $\mathbb{Z}^*_n$, and computing the v-th power modulo n of it. $\mathcal{O}$ then sends this number, which will be denoted by $B\mathcal{O}$, to $\mathcal{U}$. It is noted that $\mathcal{O}$ can perform this step at any time before it is needed in Box 93.

Box 92 is the same as Box 71.

Box 93 is similar to Box 72. The second line shows that the input to the protocol is the product of m and $A\mathcal{O}$, and it is blinded by $\mathcal{U}$ as in Box 72. The next three lines specify how $\mathcal{U}$ must compute B. The difference with Box 72 is that $\mathcal{U}$ must multiply the numbers $A\mathcal{O}$ and $B\mathcal{O}$ into it; as will be appreciated, otherwise the assistance of $\mathcal{O}$ in the payment protocol will not help $\mathcal{U}$ in computing the responses expected by $\mathcal{S}$. The remaining lines specify how the number a must be blinded, and the construction of c' and c. Finally, $\mathcal{U}$ sends the blinded challenge c to $\mathcal{B}$.

Box 94 is the similar to Box 73, the distinction being that in the assignment in the first line the product of $A\mathcal{O}$ with m is used, instead of only the number m.

Box 95 shows similar to Box 74, the distinction being the same as in Box 94.

Not displayed is that $\mathcal{B}$ debits the account of $\mathcal{U}$ with the value of the withdrawn coin.

The payment protocol

Turning now to FIG. 10, the flowchart for the payment protocol between $\mathcal{U}$, assisted by $\mathcal{O}$, and $\mathcal{S}$ is now described in detail.

Box 101 shows $\mathcal{U}$ sending (A,B) and the signature to $\mathcal{S}$. It is the same as Box 81.

Box 102 shows $\mathcal{S}$ computing a challenge d as the image of $(A,B,I\mathcal{S}, \text{date/time})$ under $\mathcal{H}_0$. $\mathcal{S}$ sends this number to $\mathcal{U}$. It is the same as Box 82.

Box 103 indicates how $\mathcal{U}$ blinds d to a number d' by adding modulo v a number generated in Box 93 to it. This blinded challenge is sent to $\mathcal{O}$.

Box 104 specifies that $\mathcal{O}$ verifies whether it has helped before in spending the particular coin. The box shows that this is done by $\mathcal{O}$ by verifying whether $o_2$ is still stored in its memory. As will be obvious to those of ordinary skill in the art, $\mathcal{O}$ does not actually need to erase $o_2$ once used. The second line shows $\mathcal{O}$ computing a response $r'_1$ to challenge d', which it sends to $\mathcal{U}$. $\mathcal{O}$ then erases $o_2$ from memory, or at least sets a flag indicating that it has assisted once in spending the coin.

Box 105 is similar to Box 83. The first line of Box 105 shows $\mathcal{U}$ testing the response of $\mathcal{O}$. If the response of $\mathcal{O}$ is correct, $\mathcal{U}$ computes the two response $r_1$ and $r_2$ in the manner specified by the second and third lines, corresponding to d and expected by $\mathcal{S}$. Note that the first response is computed in the same way as in Box 83, but to compute the second response $\mathcal{U}$ must now also make use of the response just sent by $\mathcal{O}$. $\mathcal{U}$ then sends the two responses to $\mathcal{S}$.

Box 106 indicates that $\mathcal{S}$ tests the validity of the signature and the responses. It is the same as Box 84.

As in the basic system $\mathcal{U}$ can compute the challenge d in Box 102 himself if he has access to date/time and $I\mathcal{S}$.

The deposit protocol

This is similar to the procedure described in the basic system. In case $\mathcal{B}$ finds out that a coin has been double-spent (and hence the double-spender must have been able to break the tamper-resistance of his bank-module), then $\mathcal{B}$ can compute the account number $u_i$ of the double-spender as before, and hence his identity.

5.3 Extension: Coins that may be spent multiple times

The basic system uses credentials that may be shown only once. As described earlier, one can also use credentials that may be shown k times. In the ninth line of Box 72 of the withdrawal protocol for the basic system, $\mathcal{U}$ then should not feed one additional number, B, to $\mathcal{H}_0$, but k numbers $B_1$, ..., $B_k$. These numbers are chosen by $\mathcal{B}$ such that he knows for each $B_i$ a pair $(x_{i1}, x_{i2})$ in $\mathbb{Z}_v \times \mathbb{Z}^*_n$ such that $B_i$ is equal to $Y^{x_{i1}} x_{i2}^v$.

In the payment protocol $\mathcal{U}$ must send in Box 81 all $B_i$'s along. For the i-th payment $\mathcal{U}$ sends in Box 83 the numbers $r_{i1} = du_i + x_{i1} \mod v$ and $r_{i2} = Y^{du_i + x_{i1} \text{div} v} S^d x_{i2}$ to $\mathcal{S}$. The value of i should be clear from the payment transcript, and can hereto for example be required to be used as an argument of $\mathcal{H}_0$. (Of course one can pay with various such "unities" in one payment.)

If $\mathcal{B}$ ever finds out that a coin has been spent k+1 times, then he can compute from two distinct pairs $(r_{i1}, r_{i2})$ and $(r'_{i1}, r'_{i2})$ and the corresponding challenges d and d', contained in a payment transcript that has been performed necessarily at least twice for the same $B_i$, the number $u_i$ of the double-spender as in the basic system.

A way to reduce the number of bits that has to be sent in Box 81 for the payment protocol has already been described: instead of using $B_i$, one can use $\mathcal{H}(B_i)$ for some suitable choice of $\mathcal{H}$. That means that the hash-values of the $B_i$'s are used as argument to the hash-function in Step 2 of the withdrawal protocol, and it is these numbers that are transmitted in Step 1 of the payment protocol. Similar other optimizations are obvious to those of ordinary skill in the art.

As will be appreciated, the protocols are such that the actions of $\mathcal{B}$ in the withdrawal protocol and those of $\mathcal{S}$ in the payment protocol are the same as in the basic system (without the tamper-resistant part). This will be the case in all cash systems described in this application. This clearly is an advantage when implementing the system; it does not matter whether $\mathcal{U}$ uses $\mathcal{O}$ or not. Note however that $\mathcal{B}$ can control whether $\mathcal{U}$ has to use it or not, depending on the way $\mathcal{B}$ computes the input m of the withdrawal protocol.

5.4 Extension: protection against framing of $\mathcal{U}$ by $\mathcal{B}$

In the basic system $\mathcal{U}$ cannot prove his innocence in case $\mathcal{B}$ falsely accuses him of double-spending, since $\mathcal{B}$ knew $u_i$ of $\mathcal{U}$ all along.

This problem can be easily solved due to the restrictive blind signature technique. To this end, in the stage where $\mathcal{U}$ opens his account with $\mathcal{B}$ not $\mathcal{B}$ but $\mathcal{U}$ himself generates the number $u_i$. $\mathcal{U}$ then discloses $I=Y^{u_i}$ to $\mathcal{B}$ but not $u_i$ itself. No further modifications are required in the system, since this is exactly the number m. It is noted that for security reasons $\mathcal{U}$ should prove to $\mathcal{B}$ that he knows a number $u \in \mathbb{Z}_v$ such that $I=Y^u$ and that $u<v$ (although a looser upper bound than v will do as well), without revealing any other information about u. It suffices that $\mathcal{U}$ do this only once.

In case $\mathcal{U}$ double-spends, $\mathcal{B}$ can compute $u_i$ mod v from the payment transcripts. Since each account holder has proven that the exponent u for his I is smaller than v, this enables identification since I of the double-spender can be computed.

On the other hand, in order to falsely accuse $\mathcal{U}$ of double-spending $\mathcal{B}$ will have to show the exponent $u_i$ of the double-spender (a "judge" will require this). However, computing $u_i$ is a task that is believed to be infeasible.

This technique can be easily modified in order to guarantee that $\mathcal{B}$ cannot frame a user, independent of $\mathcal{B}$'s computation power. To this end, the form $I=m=Y_1^{u_1}Y_2^{u_2}$ is used in the protocols, where $u_1, u_2 \in \mathbb{Z}_v$ have been determined by $\mathcal{U}$, and $\mathcal{B}$ only knows m.

As will be clear to those of ordinary skill in the art, if one makes the privacy optional by setting all blinding factors to fixed values (1 for "base" numbers, 0 for exponents; $\mathcal{B}$ uses these values in the withdrawal protocol so there is no interaction), but does not modify the payment protocol, then a user still digitally signs a confession of double-spending; previously known systems in the art do not have such a provision for protection against framing even in their fully traceable variants.

5.5 Extension: electronic cheques

To realize cheques, m is first multiplied with a variable part and the outcome is used as input to the withdrawal protocol; note that this can only work if it is allowed by the bank. This illustrates the technique applicable to restrictive blind signature protocols to use a function of a known number as input to a next execution of the protocol.

Set-up of the system

This is the same as described in the basic system, with the distinction that $\mathcal{B}$ in addition makes publicly known k random numbers $Y_1, \ldots, Y_k \in \mathbb{Z}^*_n$ of large order (preferably $\lambda(n)$). These $Y_i$'s represent different denominations.

For security reasons $\mathcal{B}$ must use a different v (and/or n) than in the basic system.

Opening an account with $\mathcal{B}$

This is the same as in the basic system.

The withdrawal protocol

Turning now to FIG. 11, the flowchart for the withdrawal protocol of a cheque between $\mathcal{U}$ and $\mathcal{B}$ will now be described in detail.

Box 111 shows $\mathcal{U}$ generating a number $m_1$ such that he knows a random representation of it with respect to $(Y_1, \ldots, Y_k; v)$. $\mathcal{U}$ sends this number to $\mathcal{B}$.

Box 112 is similar to Box 71, with $\mathcal{B}$ in addition registering $m_1$ with the account of $\mathcal{U}$.

Box 113 is similar to Box 72. Note that in the second and eighth lines the product $m_1 m$ is used instead of m. The only other difference is that in the third, fourth, and fifth lines $\mathcal{U}$ generates k+1 random numbers instead of just two, and uses them all to compute B.

Box 114 is the similar to Box 73, with the only distinction being that $m_1 m$ is used (so this in fact is the input to the protocol; note that this is an example where $\mathcal{U}$ and $\mathcal{B}$ in cooperation determine the input to the protocol) instead of just m.

Box 115 is similar to Box 74, the distinction being the same as in the previous box.

Not shown is that $\mathcal{B}$ debits the account of $\mathcal{U}$ for an amount corresponding to the maximum amount for which the cheque may be spent.

The payment protocol

Turning now to FIG. 12, the flowchart for the payment protocol for a cheque between $\mathcal{U}$ and $\mathcal{S}$ is now described in detail.

Box 121 is the same as Box 81: $\mathcal{U}$ sends the signed information (cheque) received in the withdrawal protocol to $\mathcal{S}$. Not displayed is that $\mathcal{U}$ also informs $\mathcal{S}$ of the amount (below the maximum amount) for which he wants to pay with the cheque. Without loss of generality, it will be assumed that $\mathcal{U}$ wants to spend an amount corresponding to $Y_1, \ldots, Y_j$, where $1 \leq j \leq k$.

Box 122 is the same as Box 82: it specifies how $\mathcal{S}$ must compute the challenge d which it sends to $\mathcal{U}$.

Box 123 is quite similar to Box 83. The difference is that $\mathcal{U}$ computes not two but k+2 responses, which are sent to $\mathcal{S}$. The box specifies how $\mathcal{U}$ should compute these responses. A clarification: for every denomination (corresponding to a $Y_i$) that $\mathcal{U}$ wishes to spend, the corresponding two exponents on $Y_i$ (one in A and the other in B) are revealed. This is specified in the second and third lines. For the identity part (corresponding to Y) as before a point on a line is disclosed; this is specified in the first line. So $\mathcal{U}$ discloses part of the information contained in A immediately at the first "test," but does not reveal the complementary part. The computation of the other responses in fact merely serves to enable $\mathcal{S}$ to prove the correctness of the reponses. Clearly, the "exponents" $r_1$ up to and including $r_j$ may instead be sent in Box 121.

Box 124 specifies the actions of $\mathcal{S}$. The first line is the same as in Box 84: $\mathcal{S}$ tests the validity of the signature.

The other lines display the test applied by $\mathcal{S}$ to verify that the responses of $\mathcal{U}$ are correct. If both tests hold, $\mathcal{S}$ accepts and provides the services corresponding to the part of the cheque that $\mathcal{U}$ has spent in this protocol.

The deposit protocol

As before, $\mathcal{S}$ sends the payment transcript to $\mathcal{B}$, and $\mathcal{B}$ verifies its correctness. If the verifications hold, and a transcript containing the same A is not yet registered in the deposit database, then $\mathcal{B}$ stores the numbers (A,$r_0$, d), and also $r_i$ for i=1 up to and including j. $\mathcal{B}$ credits the account of $\mathcal{S}$ with an amount corresponding to the spent part of the cheque.

In case a cheque has been spent before, $\mathcal{B}$ computes the identity $u_i$ of the double-spender as before, by using d and $r_0$.

The refund protocol

Turning now to FIG. 13, a flowchart for the refund protocol between $\mathcal{U}$ and $\mathcal{B}$ is now described in detail.

Not shown is that $\mathcal{U}$, in order to get a refund for the unspent part of the cheque, informs $\mathcal{B}$ of the number $m_1$ corresponding to the cheque in question;

Box 131 shows that $\mathcal{B}$ verifies that $m_1$ is registered with the account information of $\mathcal{U}$. Only if this is the case, the rest of the protocol is performed. As will be clear, Box 131 may be combined with Box 133 if the part of $\mathcal{U}$ informing $\mathcal{B}$ of $m_1$ is combined with Box 132.

Box 132 shows $\mathcal{U}$ sending the numbers $a_i$, for j<i≤k, to $\mathcal{B}$, i.e. the exponents corresponding to the terms $Y_i$ of the cheque that have not been spent. In compliance with FIG. 12, it is assumed that these are the last k-j terms. The box also shows $\mathcal{U}$ a number A such that he knows a random representation of it with respect to $(Y_1, \ldots, Y_j; v)$. As will become clear, this is similar to the actions in Box 51 (the only difference is that other symbols are used).

Box 133 indicates that $\mathcal{B}$ verifies that none of the k-j numbers in $\mathbb{Z}_v$ sent by $\mathcal{U}$ is in its deposit database. If this is the case, then $\mathcal{U}$ must prove to $\mathcal{B}$ knowledge of a representation of $m_1/(\Pi_{i=j+1}^{k} Y_i^{a_i})$ with respect to $(Y_1, \ldots, Y_j; v)$. The specific protocol described in the flowchart in FIG. 5 has been used for explicitness the figure. Note that the third and fourth lines are in fact the same as in Box 52.

Box 134 is similar to Box 53, in fact only the symbols differ.

Finally, Box 135 is in fact the same as Box 54, with the addition that if $\mathcal{B}$ accepts the proof, then $\mathcal{B}$ erases $m_1$ and stores the numbers $a_i$ sent by $\mathcal{U}$ in Box 132. Not shown is that $\mathcal{B}$ in that case also credits the account of $\mathcal{U}$ with an amount corresponding to the unspent part of the cheque.

5.6 Extension: anonymous accounts

Until now, the privacy of the account holders only concerns their payments (they are untraceable). $\mathcal{B}$ still can see exactly the flow in and out of the accounts of its account holders, and how much money they have. Even this can be prevented; account holders can open accounts using a fictituous name (a pseudonym in the true sense of the word!).

In order to open an anonymous account, $\mathcal{U}$ withdraws the number m, which in the basic system was of the form $Y^{u_i}$, in a preceding restrictive blind signature protocol with $\mathcal{B}$. To this end use is made of what in fact is exactly the protocol of (for example) the first flowchart (FIG. 2), where the signature corresponds to one number $I=Y^{u_i}t^v$: so it is exactly the protocol described in the previous section for validating pseudonyms. The number I will now play the role that m played in the basic cash system.

A possible realization of this "pseudonym issuing" protocol is as follows. $\mathcal{B}$ generates a unique random number $u_i$ in $\mathbb{Z}_v$ for $\mathcal{U}$, and sends it to $\mathcal{U}$. $\mathcal{U}$ identifies himself as before. $\mathcal{B}$ stores the relevant information in a database. As will be obvious to those of ordinary skill in the art from previous descriptions, one can even protect against framing by letting $\mathcal{U}$ choose the number $u_i$ and reveal only $Y^{u_i}$ to $\mathcal{B}$ (with a proof that the exponent is less than v). Next the restrictive blind signature protocol exactly as described by the first flowchart (FIG. 2) is performed, where $m=Y^{u_i}$. $\mathcal{U}$ obtains a signature on $Y^{u_i}t^v$, denoted for brevity by I, for some number $t \in \mathbb{Z}_v$ chosen at random by him. I is the certified (it is accompanied by a signature of $\mathcal{B}$) pseudonym of $\mathcal{U}$.

In the stage in which $\mathcal{U}$ opens his account, $\mathcal{U}$ sends I and the signature to $\mathcal{B}$ but does not identify himself. $\mathcal{B}$ only verifies that I is certified, and $\mathcal{U}$ has to prove, as described in the flowchart of FIG. 5, that he knows a representation of I with respect to (Y; v) (in this way $\mathcal{U}$ can later also prove ownership of the account when he needs to withdraw money). Note that the proof can in fact be omitted, since if $\mathcal{U}$ uses a forged pseudonym he will not be able to pay with withdrawn information anyway.

The rest of the system is the same as before. If $\mathcal{U}$ double-spends $\mathcal{B}$ will be able to compute $u_i$, and hence the identity of the double-spender (note: not by searching its database with account information but by searching its database with information about issued pseudonyms).

In this extension the techniques of the general credential mechanism are applied as follows. The bank first chooses a pseudonym $P_i$ for account holder i. To this end the blank chooses $u_i \in \mathbb{Z}^*_v$, and uses as input to the protocol (called m in FIG. 2) the number $m_i=Y^{u_i}$. The accountholder blinds this to a pseudonym $P_i=m_i s^v$ for a random choice of $s \in \mathbb{Z}^*_n$. The accountholder then uses this pseudonym to open an anonymous account with the bank. If the account holder wants to withdraw a coin, then $P_i$ resp. a function of it will be blinded by the account holder in a protocol with the bank to a coin or cheque. This once more illustrates the transitivity characteristic of restrictive blind signatures.

SECOND PREFERRED EMBODIMENT

6 Introduction

In the second preferred embodiment computations are performed in a (multiplicatively written) group, denoted by $G_q$, that contains q numbers, where q is a prime number. Many types of such groups are known. A suitable choice is for example the unique subgroup of order q of $\mathbb{Z}^*_p$, where p is a prime number such that q is a divisor of p−1. Another choice is for example an elliptic curve over a finite field. For this reason, no explicit choice for $G_q$ is made in the descriptions.

Because of this, an expression such as $g_1^{a_1}$ should be understood to be a computation in $G_q$. In case computations modulo q are performed, (as for example in $r_1=x_1+x_2c$ mod q), the modulo operator will be denoted explicitly. In case an element is chosen from a group, it is implicitly assumed that this is the smallest positive representative. The same holds for outcomes of computations.

For the restrictive blind signatures in this preferred embodiment it is necessary that, given a vector $(g_1, \ldots, g_k)$ and a random number A in the group, it should be infeasible to compute a vector $(a_1, \ldots, a_k)$ (not all zeroes if A=1) such that $g_1^{a_1} \ldots g_k^{a_k} = A$, where $a_i \in \mathbb{Z}_q$ and $g_i \in G_q$. As will be obvious to those of ordinary skill in the art, this is the case when groups $G_q$ are used in which it seems infeasible to compute so-called discrete logarithmes. (The discrete logarithm in $G_q$ of a number m with respect to a number g, denoted by $\log_g m$, is the number x in $\mathbb{Z}_q$ such that $g^x$ is equal to m.)

In terms of the general description of restrictive blind signatures the function $f_1$ and $f_2$ are equal to one another: denoting them by the function f, they are defined as $f(a_1, \ldots, a_{k+1}) = g_1^{a_1} \ldots g_k^{a_k} g^{a_{k+1}}$, where $a_1, \ldots, a_{k+1} \in \mathbb{Z}_q$. At the start of the protoco z,2 knows a vector $(a_1, \ldots, a_{k+1})$ such that $f(a_1, \ldots, a_{k+1}) = m$. Such a vector is called a representation of m with respect to $(g, \ldots, g_k, g)$.

As will be appreciated by those of ordinary skill in the art, the protocols can be modified in various obvious ways. For example, in the description it will be assumed that q is known to the users, and so they can perform computations modulo q. A possible variation is to make sure that the order q of the group remains unknown. To this end one can for example take $G_q$ to be a subgroup of $\mathbb{Z}^*_p$; all computations modulo q will then need to be replaced by computations modulo p−1. Such modifications are well-known in the art. It is noted here that in literature suitable choices for p are known.

In the next section two different types of restrictive blind signature protocols will be described for this preferred embodiment. In the protocols depicted by the flowcharts of FIG. 14 and 15, the functions $I_1$ and $I_2$ can be taken to be the same function I, defined (for example) by $I(a_1, \ldots, a_{k+1}) = (a_1 \bmod q, \ldots, a_k \bmod q)$. This means that $\mathcal{R}$ can only modify $a_{k+1}$ in the protocol, and that the other numbers cannot be modified (modulo q of course).

Figure 16:
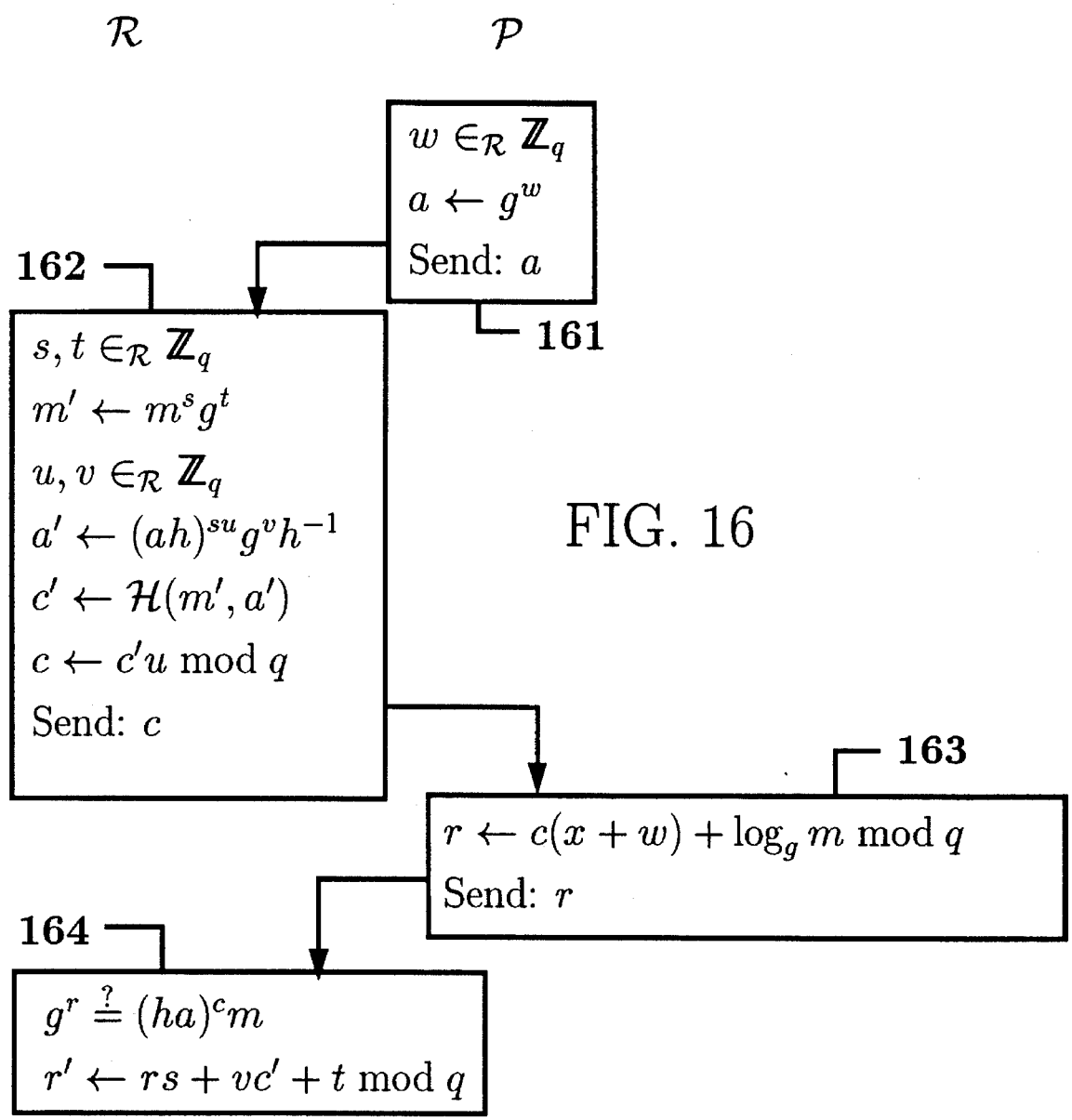
FIG. 16 shows a flowchart of a third restrictive blind signature protocol for the second preferred embodiment in accordance with the teachings of the present invention.

In the protocol depicted by the flowchart of FIG. 16, and its variant described in the text, $\mathcal{R}$ has some more freedom in blinding the numbers in the representation. Here, $I_1$ and $I_2$ can be taken to be the same function I, which for example is defined by $I(a_1, \ldots, a_{k+1}) = \ldots, a_i/a_j \bmod q, \ldots)$, for $1 \leq i \neq j \leq k$. In other words, there is inevitably one number $t \in \mathbb{Z}^*_q$ such that $b_i = a_i t \bmod q$, for $1 \leq i \leq k$.

It will then be described how the technique employed to construct these four protocols can be used to construct many other restrictive blind signature protocols.

7 Restrictive blind signatures

Figure 14:
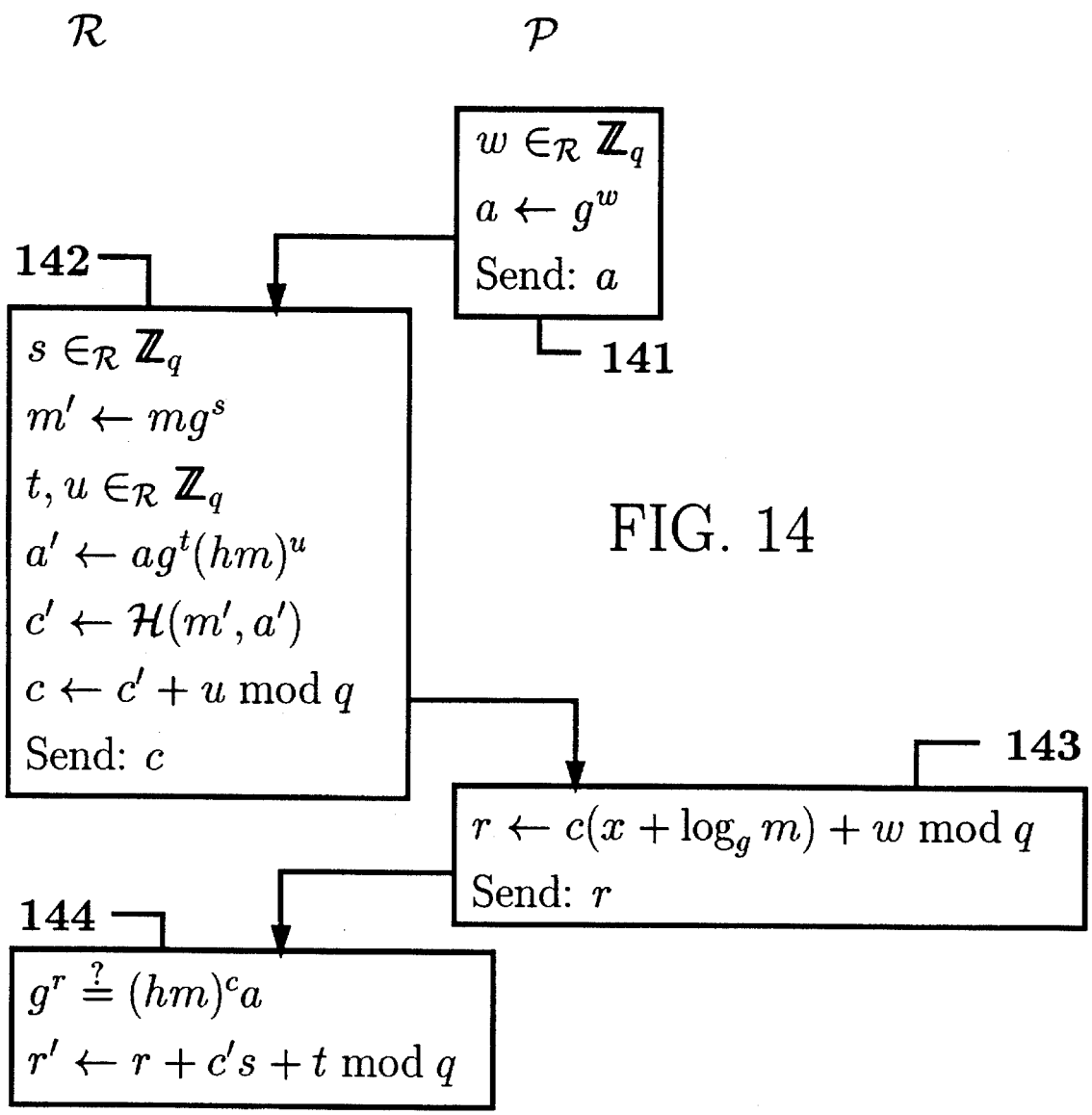
FIG. 14 shows a flowchart of a restrictive blind signature protocol for a second preferred embodiment in accordance with the teachings of the present invention.

Turning now to FIG. 14, a flowchart of a first restrictive blind signature protocol in the second preferred embodiment will now be described in detail.

In a set-up phase, preceding executions of the protocol, $\mathcal{P}$ has chosen a number g in $G_q$ and a number x in $\mathbb{Z}_q$, and has made g and $g^x$ publicly known. The number x is the secret key of $\mathcal{P}$. The number $g^x$ will be denoted by h.

$\mathcal{P}$ also makes publicly known a function $\mathcal{H}$. $\mathcal{H}$ is a collision-free hash-functie, as described in the first flowchart, that operates on two numbers from $G_q$ and maps them to a number in $\mathbb{Z}_q$.

At the start of the protocol a number $m \in G_q$ is chosen that both parties know. For example because one party generates it and informs the other party of it, or because it is the output, or a function thereof, of a previous execution of the protocol.

A digital signature of $\mathcal{P}$ on a number m in $G_q$ is a pair (a,r) in $G_q \times \mathbb{Z}_q$ such that the verification relation $g^r = (hm)^c a$, holds. Here, c denotes the image of (m,a) under the hash-function $\mathcal{H}$.

Box 141 shows $\mathcal{P}$ generating a random number w in $\mathbb{Z}_q$, and raising the publicly known number g to this power. The outcome, denoted by a, is sent to $\mathcal{R}$.

Box 142 details blinding actions of $\mathcal{R}$. The first lines shows $\mathcal{U}$ generating a random number which it uses to blind the input m to an output m'. The other lines specify how $\mathcal{R}$ blinds the number a just received from $\mathcal{P}$, and computes c' from m and a'. The sixth line shows $\mathcal{R}$ blinding this "challenge" to a number denoted by c by adding to it one of the random numbers used also in blinding a. This number c is sent to $\mathcal{P}$.

Box 143 specifies $\mathcal{P}$ computing the response r from the publicly known information, the input m, the challenge and its secret key. Note that $\mathcal{P}$ in this particular protocol must know the discrete logarithm of m to the base g, denoted by $\log_g m$, in order to succeed.

The first line of Box 144 specifies the way in which $\mathcal{R}$ tests the correctness of the response r it just received. If the test holds, then $\mathcal{R}$ computes a blinded form of r', as specified in the second line.

The pair (a',r') is a digital signature of $\mathcal{P}$ on m'. Furthermore, the pair m' with signature (a',r') satisfies the requirement for a blind signature protocol.

As will be obvious to those of ordinary skill in the art, the assignments made by $\mathcal{R}$ to a',c (in Box 142) and r' (in Box 144) can be modified in various ways. This remark also applies to the other restrictive blind signature protocols whose flowcharts are described shortly.

Without further restrictions signatures obtained in the above manner can be easily forged. However, if it is assumed that $\mathcal{R}$ at the start of the protocol knows a representation $(a_0, a_1, \ldots, a_k)$ of m with respect to $(g, g_1, \ldots, g_k)$, and at the end knows a reputation $(b_0, \ldots, b_k)$ of m' with respect to the same vector, then $a_i$ will inevitably modulo q be equal to $b_i$ for all i with $1 \leq i \leq k$, if only $\mathcal{R}$ does not know a representation $(c_0, \ldots, c_k)$ (not equal to $(0, \ldots, 0)$) of 1 with respect to $(g, g_1, \ldots, g_k)$.

Several remarks are in order, similar to the remarks made in the description of the flowchart of FIG. 2. In the description of the protocol the signature is only on one number, denoted by m'. A simple modification suffices to obtain a blind signature on several numbers. If the signature should not only pertain to m' but also to k numbers $B_1, \ldots, B_k$ for certain $k \in \mathbb{N}$, it suffices that $\mathcal{R}$ in the fifth line of Box 142 compute c' as the image of $(m', B_1, \ldots, B_k, a')$ under $\mathcal{H}$. The requirements for $\mathcal{H}$ are as before, the only difference is that $\mathcal{H}$ now operates on k+2 numbers. (Most known candidate collision-free has-functions known in the art do not mind about the number elements fed into them.) A signature on $(m', B_1, \ldots, B_k)$ in this case is a pair (a',r') in $G_q \times \mathbb{Z}_q$ such that $g^r$ is equal to $(hm')^c a'$, where c' denotes $\mathcal{H}(m', B_1, \ldots, B_k, a')$. Note that the numbers $B_i$ can be chosen from any set.

Furthermore, a signature on $m \in G_q$ can alternatively be defined in a somewhat more efficient way as being a pair (c,r) in $\mathbb{Z}_q \times \mathbb{Z}_q$ such that c is equal to $\mathcal{H}(m,g^r(hm)^{-c})$. This definition is equivalent.

The hash-function $\mathcal{H}$ is not necessarily an onto map (surjection) to $\mathbb{Z}_q$; $\mathcal{H}$ may as well map its argument to, say, $\mathbb{Z}_{2^t}$, where the "security parameter" t is of an appropriate length.

These remarks also apply to all the other protocols that are to be described (one need only modify the equivalent yet more efficient definition of a signature in the obvious way each time).

Figure 15:
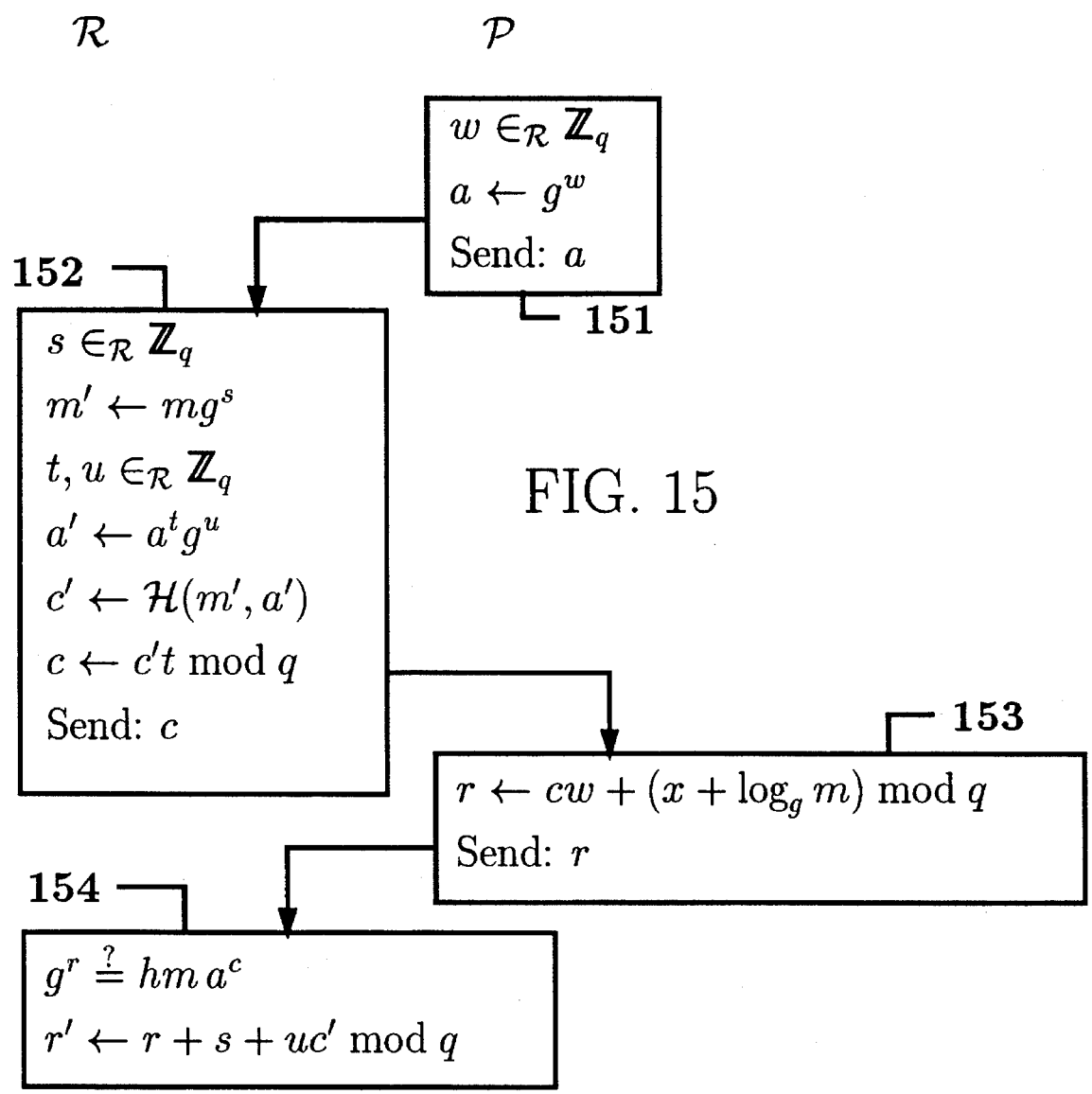
FIG. 15 shows a flowchart of another restrictive blind signature protocol for the second preferred embodiment in accordance with the teachings of the present invention.

Turning now to FIG. 15, a flowchart of another restrictive blind signature protocol in the second preferred embodiment will now be described in detail.

This protocol in fact is highly similar to the previous one. The set-up is almost the same, with the only distinction being that $\mathcal{H}$ never maps its argument to zero (a technical detail that is only needed to rigorously prove the privacy).

A digital signature of $\mathcal{P}$ on a number m in $G_q$ is a pair (a,r) in $G_q \times \mathbb{Z}_q$ such that $g^r$ is equal to hm $a^c$, where c denotes $\mathcal{H}(m,a)$. (Or, as mentioned in the foregoing description, a signature on m can equivalently be defined as a pair (c,r) in $\mathbb{Z}_q \times \mathbb{Z}_q$ such that c equals $\mathcal{H}(m,g^{r/c}(hm)^{1/c})$.)

Box 151 is the same as Box 141.

Box 152 is similar to Box 142, the distinction being the way in which $\mathcal{R}$ uses the randomly generated numbers to blind a to a' (fourth line) and c' to c (sixth line).

Box 153 is similar to Box 143, with the first line specifying how the response r must be computed by $\mathcal{P}$.

Box 154 is similar to Box 144, with the test applied by $\mathcal{R}$ being different (first line) and the succeeding assignment to r' also being different (second line).

Exactly the same as in the protocol of the foregoing flowchart (FIG. 14) holds. That is, if it is assumed that $\mathcal{R}$ at the start of the protocol knows a representation $(a_0, a_1, \ldots, a_k)$ of m with respect to $(g, g_1, \ldots, g_k)$, and at the end knows a representation $(b_0, b_1, \ldots, b_k)$ of m' with respect to the same vector, then $a_i$ will inevitably equal $b_i$ mod q for i such that $1 \leq i \leq k$, if only $\mathcal{R}$ does not know a representation $(c_0, \ldots, c_k)$ (not equal to $(0, \ldots, 0)$) of 1 with respect to $(g, g_1, \ldots, g_k)$.

Turning now to FIG. 16, a flowchart of yet another restrictive blind signature protocol in the second preferred embodiment will now be described in detail.

The set-up is as the flowchart of FIG. 14. A digital signature of $\mathcal{P}$ on a number m in $G_q$ is a pair (a,r) in $G_q \times \mathbb{Z}_q$ such $g^r$ is equal to $(ha)^c m$, where c denotes $\mathcal{H}(m,a)$. Or, equivalently, a signature on m is a pair (c,r) in $\mathbb{Z}_q \times \mathbb{Z}_q$ such that c is equal to $\mathcal{H}(m,(g^r m^{-1})^{1/c} h^{-1}))$. As can be verified by those of ordinary skill in the art, $\mathcal{R}$ in this protocol has somewhat more freedom in blinding m than in the previous two protocols.

Box 161 is the same as Box 141.

Box 162 is similar to Box 142, with $\mathcal{R}$ generating one extra number. Using the random numbers s and t, $\mathcal{R}$ computes the blinded form m' of m as specified in the second line. Using the random numbers u and v, $\mathcal{R}$ computes the blinded form a' of a as specified in the fourth line. The assignment to c' is the same as in the foregoing two flowcharts. The sixth line specifies how $\mathcal{R}$ blinds c' to c, which it then sends to $\mathcal{P}$.

Box 163, similar to Box 143, specifies how $\mathcal{P}$ must compute the response r, which it then sends to $\mathcal{R}$.

Box 164 is similar to Box 144. The first line specifies the test applied by $\mathcal{R}$ to check the validity of the response r, and the second line shows the assignment made by $\mathcal{R}$ to r' in case the test holds.

Assuming $\mathcal{R}$ knows at the start of the protocol a representation $(a_0, a_1, \ldots, a_k)$ of m with respect to $(g, g_1, \ldots, g_k)$, and at the end a representation $(b_0, b_1, \ldots, b_k)$ of m' with respect to the same vector, then it will always be the case that the quotient $a_i/a_j$ will modulo q equal $b_i/b_j$, for all i and j such that $1 \leq i,j \leq k$ and $i \neq j$, if only $s \neq 0$ and $\mathcal{R}$ does not know a representation $(c_0, \ldots, c_k)$ (not equal to $(0, \ldots, 0)$) of 1 with respect to $(g, g_1, \ldots, g_k)$.

As will be obvious to those of ordinary skill in the art, g can in this protocol be excluded from the (k+1)-vector of generators of $G_q$ with respect to which $\mathcal{R}$ must know a representation, while conserving the fact that a blind signature has been obtained (assuming that $m \neq 1$). In that case $\mathcal{R}$ will inevitably have to use t=0 if he wants to know a representation of m' with respect to $(g_1, \ldots, g_k)$ at the end.

Also, anyone can then verify if $\mathcal{R}$ has used s=0 in Box 162; if s=0 then m'=1. This will be used in the detailed description of the off-line digital cash system described later.

As will be appreciated, in the same way that the flowchart of FIG. 15 is closely related to the flowchart of FIG. 14, there is also a restrictive blind signature protocol closely related to the present flowchart. The set-up for that protocol is the same, except for the distinction that a digital signature of $\mathcal{P}$ on a number m in $G_q$ is now a pair (a,r) in $G_q \times \mathbb{Z}_q$ such that $g^r$ equal to ha $m^c$, where c denotes $\mathcal{H}(m,a)$. (Equivalently, a signature on m is a pair (c,r) in $\mathbb{Z}_q \times \mathbb{Z}_q$ such that c is equal to $\mathcal{H}(m, g^r m^{-c} h^{-1})$.)

$\mathcal{R}$ has as much freedom in blinding as in the flowchart of FIG. 16. So the remarks made in the foregoing description of that flowchart hold as well. The only difference with the flowchart of FIG. 16 is that the assignments of $\mathcal{R}$ in Box 162 to a',c and in Box 164 to r' have to be modified. This will be an obvious task to those of ordinary skill in the art, by studying the preceding restrictive blind signature protocols. For this reason, a detailed description is omitted here.

As will be appreciated by those of skill in the art, the restrictivity characteristic is far from trivial. Hereto, one may note that the blind signatures (using the technique employed to construct the four previously described protocols), are not (!) restrictive in case a signature of $\mathcal{P}$ on m in $G_q$ is defined as being a pair (a,r) in $G_q \times \mathbb{Z}_q$ such that one of the following four verification relations holds: $g^r = h(am)^c$ or $g^r = (ham)^c$ or $g^r = ham$. (Or as being a pair (c,r) with modified verification relations.)

Namely, in each of these four cases $\mathcal{R}$ in what would be the second line of the second box of the flowchart can assign anything to m' that he wants, since the assignment can be "cancelled" using a suitable assignment to a' in the same box. (As will be clear to those of skill in the art, in essence m and a must be "separated" from one another in the defining verification relation of the signature, by means of an exponent c= $\mathcal{H}(m,a)$ on precisely one of both numbers in the product.)

The four described protocols are based on the signature variant of the Schnorr identification protocol, known from Schnorr, C., "Efficient Signature Generation by Smart Cards," Journal of Cryptology, Vol. 4, No. 3, (1991), pages 161–174, and its "mirrored" variant. The protocol of Schnorr is of the earlier mentioned Fiat/Shamir type.

As explained in detail in the first preferred embodiment, the technique used to construct the restrictive blind signature protocols in principle can be applied to any identification protocol of the Fiat/Shamir type, in case one can turn it into a signature protocol by taking the challenge c as the outcome of a hash-function of, amongst others, numbers that were transmitted in the first step.

By studying the various examplary protocols described in this application, is believed to be a simple matter for those of ordinary skill in the art to apply the technique to other Fiat/Shamir-like identification protocols. It is noted here that using this technique, any of the following such protocols, known in the art, can be turned into a restrictive blind signature protocol: T. Beth, "Efficient zero-knowledge identification scheme for smart cards," Proceedings of EuroCrypt '88, pages 77–86; Brickell, E. and McCurley, K., "An interactive identification scheme based on discrete logarithms and factoring," Journal of Cryptology, Vol. 5, no. 1 (1992), pages 29–39. The NIST-DSS algorithme (standardized in the USA) can in principle also be converted with this technique.

To illustrate this important point once more, another well-known identification protocol is now used to convert into a restrictive blind signature protocol. (See: Okamoto, T., "Provably Secure and Practical Identification Schemes and Corresponding Signature Schemes," Preproceedings of Crypto '92, pages (1-15)–(1-25).)

Figure 17:
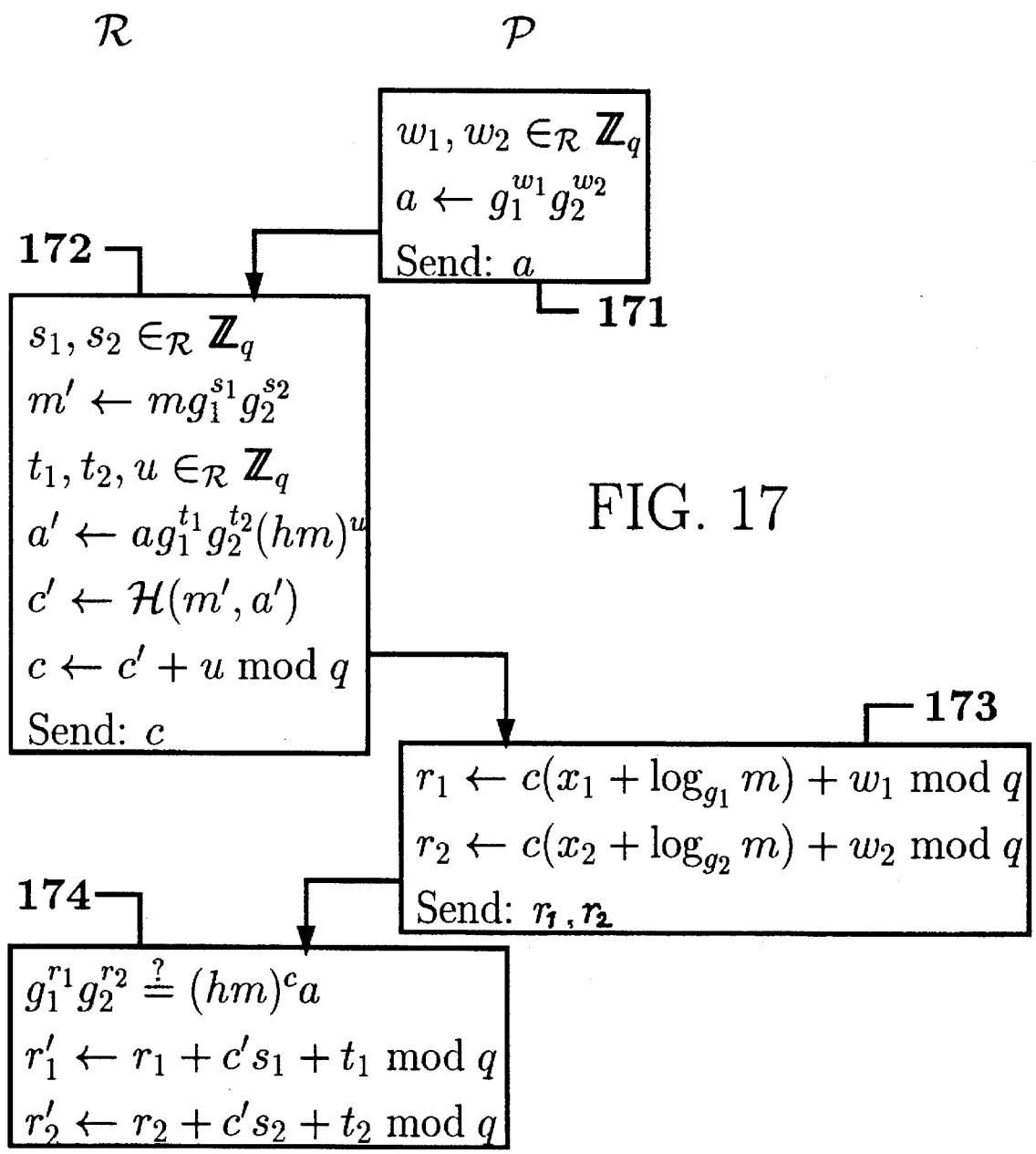
FIG. 17 shows a flowchart of yet another restrictive blind signature protocol for the second preferred embodiment in accordance with the teachings of the present invention.

Turning to FIG. 17, a flowchart of the resulting restrictive blind signature protocol will now be described in detail.

It is assumed that $\mathcal{P}$ has chosen two numbers $g_1$ and $g_2$ in $G_q$ and two numbers $x_1, x_2$ in $\mathbb{Z}_q$, and has made $g_1$, $g_2$ and $g_1^{x_1}g_2^{x_2}$ publicly known. The latter product of powers will be denoted by h. The numbers $x_1, x_2$ are the secret key of $\mathcal{P}$. The function $\mathcal{H}$ is again a collision-free hash-function, as in the foregoing protocols. Furthermore, as before at the start of the protocol a number m from $G_q$ is chosen (the input) that both parties should know.

A digital signature of $\mathcal{P}$ on a number m in $G_q$ is a triple $(a,r_1,r_2)$ in $G_q \times \mathbb{Z}_q \times \mathbb{Z}_q$ such that $g_1^{r_1}g_2^{r_2}$ is equal to $(hm)^c a$, where c denotes $\mathcal{H}(m,a)$. (Equivalently, a signature on m is a triple $(c,r_1,r_2)$ in $\mathbb{Z}_q \times \mathbb{Z}_q \times \mathbb{Z}_q$ such that c is equal to $\mathcal{H}(m,g_1^{r_1}g_2^{r_2}(hm)^{-1})$.)

Box 171 shows $\mathcal{P}$ generating two random numbers, which it uses to compute a number a as specified in the second line. $\mathcal{P}$ then sends the number a to $\mathcal{R}$.

The first and third lines of Box 172 show $\mathcal{R}$ generating five random numbers, all in $\mathbb{Z}_q$. Using two of these, $\mathcal{R}$ computes the blinded form m' of m as specified in the second line. Using the other three, $\mathcal{R}$ computes the blinded form a' of a as specified in the fourth line. The fifth line shows the same assignment as in the foregoing flowcharts. $\mathcal{R}$ then computes the blinded challenge c of c' by adding modulo v one of the random numbers to it (as specified in the sixth line), and sends c to $\mathcal{P}$.

Box 173 indicates how $\mathcal{P}$ must compute the two responses $r_1$ and $r_2$, which it then sends to $\mathcal{R}$.

The first line of Box 174 shows the testing of $\mathcal{R}$ of the two responses. If the test holds, $\mathcal{R}$ computes blinded forms of the responses in the manner specified by the second and third lines.

As is easy to verify by those of ordinary skill, the triple $(a',r'_1,r'_2)$ is a digital signature of $\mathcal{P}$ on m'. The pair m' with signature satisfies the requirement for blind signatures.

Without further restrictions, signatures are, as before, easy to forge. Similar to the flowcharts of FIGS. 14 and 15, the following holds if one considers the representations $\mathcal{R}$ knows of m and m' with respect to a suitably chosen k-vector of generators: $\mathcal{R}$ can blind the number m to $mg_1^{s_1}g_2^{s_2}$ for random choices of $s_1, s_2$, but he cannot blind it for example to $m^s$ for a choice s.

By modifying the verification relation that defines the signature ("moving" c'), as has been demonstrated in detail with respect to the flowchart of FIGS. 14 and 2, three other verification relations are obtained to each of which corresponds a restrictive blind signature protocol. Since the modifications should by now be straightforward for those of ordinary skill in the art (similar to the first four protocols), a detailed description is omitted here.

It will be clear to those of ordinary skill in the art that the latter protocol in fact is a generalization of the first protocol of FIG. 14, and the same holds for the variants. A further generalization clearly is possible by taking $h=g_1^{x_1} \ldots g_k^{x_k}$ and $(g_1, \ldots, g_k)$ to be the public key of $\mathcal{P}$; in fact the protocol of FIG. 14 (and its variants) has k=1, and the protocol of FIG. 17 (and its variants) has k=2. Such variations should be easily constructed by those of ordinary skill in the art by studying the many restrictive blind signature protocols described in this application.

8 Proving knowledge of a representation

Turning now to FIG. 18, a flowchart will be described of a basic protocol for proving knowledge of a representation. This protocol enables $\mathcal{R}$ to prove to $\mathcal{P}$ knowledge of a representation $(a_1, \ldots, a_k)$ of a number A in $G_q$ with respect to $(g_1, \ldots, g_k)$.

Box 181 shows $\mathcal{R}$ first generating k random numbers $x_i$ from $\mathbb{Z}_q$. These are used to construct a number B such that the vector of these $x_i$'s is a randomly chosen representation of B with respect to $(g_1, \ldots, g_k)$. $\mathcal{B}$ sends B to $\mathcal{P}$.

Box 182 displays $\mathcal{P}$ generating a challenge d in $\mathbb{Z}_q$, and sending it to $\mathcal{R}$.

The first line of Box 183 specifies how $\mathcal{R}$ computes k responses $r_i$ from the challenge and the representations it knows of A and B. The responses $r_i$, for i=1, ..., k, are then sent to $\mathcal{P}$.

Box 184 specifies the test for correctness of the responses applied by $\mathcal{P}$.

As discussed in detail in the first preferred embodiment there are two basic ways in which $\mathcal{P}$ in Box 182 can choose the number d. Furthermore one can let various parties collectively prove knowledge of a representation of the product or quotient of their individual A's. Studying the described inventive techniques for both preferred embodiments should enable those of ordinary skill in the art to construct such variations without any difficulty.

9 Application to credential mechanisms

Restrictive blind signatures can be used in much the same way as in the first preferred embodiment to construct credential mechanisms in Groups $G_q$ of prime order. The pseudonym of user i with organization j is then $m_i g^{s_j} \in G_q$, and $m_i = g_0^{u_i}$. Different types of credentials are represented by different $g_i$'s; hereto a vector $(g_1, \ldots, g_k)$ is made publicly available. What credentials one has depends as in the first preferred embodiment on the representation one knows of (a function of) m, and with respect to which vector of numbers composed from $(g_1, \ldots, g_k)$.

As will be readily apparent to those of ordinary skill in the art, the numbers $g_i$ perform the role that the numbers $Y_i$ played in the first preferred embodiment, $g_0$ that of Y, and g that of v. That is, the exponent on g is the only one that can be modified by means of the protocol as the user wants (assuming that here too, as in the first preferred embodiment, the protocol of FIG. 14 or 15 is used.)

Again, not only can one prove knowledge of representations of m with respect to various vectors but also of quotients such as $m/P_{ij}$ or $m/\Pi_v g_i$ for a subset V of the vector of $g_i$'s, or even of m/m' for a second number m' on which one has a signature. The cash system for the second preferred embodiment illustrates this analogy in great detail. Some study of the first preferred embodiment should enable those of ordinary skill in the art to easily construct such protocols for the second preferred embodiment without difficulty.

For this reason, only a detailed description of a specific credential mechanism, off-line electronic cash systems, will be described in detail. Similar to the description in the first preferred embodiment, one of the two restrictive blind signature protocols described in FIGS. 14 and 15 will be used throughout, without loss of generality. Any other restrictive blind signature scheme can be used as well, needing only a few minor modifications. Although this should be obvious to those of ordinary skill in the art, following the description will be detailed description of how to construct the cash system based on yet another restrictive blind signature protocol; as will be appreciated, such substitution requires only minor modifications.

Note that there actually is one, and in fact just one, difference between the restrictive blind signatures described here and in the first preferred embodiment. This pertains to the techniques using the transitivity of the restrictive blind signatures. In the protocols described in the first preferred embodiment the certifying party must be able to compute the v-th root of m in order to properly perform the protocol, which it can since it knows the factorization of the modulus. In the specific protocols described for the second preferred embodiment the certifying party must be able to compute $\log_g m$ in order to properly perform the protocol. However, it is not known in the art if there exists "trapdoor" information, as in the RSA-groups, that enables one to do so. Therefore the certifying party in the described protocols will have to know in advance $\log_g m$, for example because the user informs him about it or because he chooses it himself. Therefore, in the case of making use of the transitivity of restrictive blind signatures one cannot use the restrictive blind signature protocols described explicitly for the second preferred embodiment.

For example in the system for paying under pseudonym described in the first preferred embodiment, transitive blinding is not used, and hence that system can be directly "translated" to the second preferred embodiment.

Although the restrictive blind signature protocols explicitly described in this application for the second preferred embodiment in general cannot be used in a situation where the transitivity property is applied, it will be obvious to those of ordinary skill that this is merely a peculiar characteristic of the particular protocols described. As will be appreciated, there also exist restrictive blind signature protocols for the second preferred embodiment in which the certifying party does not need to know $\log_g m$ in order to properly perform the protocol. One such protocol will be described at the start of the second description of an off-line electronic cash system. This protocol will be shown to have exactly the same functionality as the two protocols described in the description of FIG. 4 of the first preferred embodiment.

As will be appreciated, it is therefore possible to straightforwardly realize all the constructions possible in the first preferred embodiment, and vice versa. For this reason the description of the techniques in the first preferred embodiment will not be "copied" here (since this is almost a literal translation).

Note that the described flowcharts of FIG. 14 up to and including FIG. 17 are constructed by the technique used to construct the protocols of the first three flowcharts in the first preferred embodiment. The other restrictive blind signature protocol described after the detailed description of the cash system will be seen to be constructed using the second technique ("doubling") explained in the first preferred embodiment.

10 Off-line electronic cash systems

In this section the use of restrictive blind signatures in the second preferred embodiment for the construction of privacy-protecting off-line electronic cash systems is described in detail. Without loss of generality, the restrictive blind signature protocol from FIG. 14 will be used. As will be illustrated in detail later or, if any other restrictive blind signature protocol is used instead only a minor modification to the protocols suffices, depending on the specific form of the contained information in the representations the user knows of the input and the output that is conserved.

10.1 Basic system

The protocols for withdrawal of a coin at $\mathcal{B}$ paying with a coin at a shop, and the deposit protocol will be described, assuming coins of only one denomination are issued. This is called the basic system.

Set-up of the system.

Before the system can be put in use, $\mathcal{B}$ generates a number g in $G_q$ not equal to 1, and two numbers x and y in $\mathbb{Z}_q$. $\mathcal{B}$ also chooses two collision-free hash functions $\mathcal{H}$ and $\mathcal{H}_0$. Here, $\mathcal{H}$ maps an argument from $G_q \times G_q \times G_q$ to $\mathbb{Z}^*_q$ and, for example, $\mathcal{H}_0$ maps an argument from $G_q \times G_q \times \text{SHOP-ID} \times \text{DATE/TIME}$ to $\mathbb{Z}_q$. The function $\mathcal{H}$ is used as described in the flowchart of FIG. 14, with the distinction that the signature corresponds to a pair of numbers, by letting $\mathcal{R}$ in Box 143 feed an additional argument to $\mathcal{H}$. The function $\mathcal{H}_0$ specifies in what way shops must generate the challenge in Box 202 of the payment protocol. That is, the two hash-functions perform the same role as played by the two hash-functions in the basic cash system described in the first preferred embodiment. As for the format of $\mathcal{H}_0$, exactly the same remarks as made with respect to the cash system described in the first preferred embodiment apply.

$\mathcal{B}$ makes publicly known $(g,g^x)$, $g^y$ and the description of $\mathcal{H}$, $\mathcal{H}_0$. The number $g^x$ will be denoted by h, and $g^y$ by $g_1$. The pair $(x,y)$ is the secret key of $\mathcal{B}$.

A digital signature of $\mathcal{B}$ on a pair (A,B) in $G_q \times G_q$ consists of a pair $(c,r)$ in $G_q \times \mathbb{Z}_q$ such that c equals $\mathcal{H}(A,B,g^r(hA)^{-c})$. Clearly, the equivalent definition of the signature can be used instead, but storing the pair $(c,r)$ requires somewhat less memory.

$\mathcal{B}$ also arranges for its own use a database to store relevant information concerning its account holders (such as identity-related information in the form of name, address etcetera), and a database to store the relevant parts of the information that shops send in the deposit stage to $\mathcal{B}$.

The publicly known information will of course need to be incorporated in the software of the computing devices of the account holders (or in the hardware, e.g. in ROM).

Opening an account with $\mathcal{B}$

In order to open an account with $\mathcal{B}$, $\mathcal{U}$ must identify himself (for example by means of a passport). $\mathcal{B}$ registers the identity-related information (such as name and address) together with a number $u_i$ in $\mathbb{Z}_q$. This number is chosen differently for each account holder. In case $\mathcal{U}$ double-spends, $\mathcal{B}$ will be able to compute $u_i$. Since the number is registered in this stage, $\mathcal{B}$ then can determine the identity of the double-spender, and take appropriate actions. The number $g_1^{u_i}$ will be denoted by m. Note that m varies per account holder.

The withdrawal protocol

Turning now to FIG. 19, the flowchart for the withdrawal protocol between $\mathcal{U}$ and $\mathcal{S}$ is described in detail.

Box 191 is the same as Box 141.

Box 192 is similar to Box 142. It in addition shows in the second and third lines $\mathcal{U}$ specifying a number B in $G_q$ such that he knows a random representation of it with respect to $(g_1,g)$. This number is fed as well into $\mathcal{H}$, as shown in the seventh line. The other actions are the same as in Box 142. $\mathcal{U}$ then sends the challenge c to $\mathcal{B}$.

Box 193 specifies how $\mathcal{B}$ computes the response. This is the same as in Box 143; note, however, that use is made of the fact that $\mathcal{B}$ knows $\log_g m$, which is equal to $yu_i$. $\mathcal{B}$ sends the response to $\mathcal{U}$.

The first line of Box 194 specifies the test for correctness of the response r as applied by $\mathcal{U}$. If the test holds, $\mathcal{U}$ blinds the challenge r to r' as specified by the second line.

Not shown is that $\mathcal{B}$ debits the account of $\mathcal{U}$ with the value of the coin.

$\mathcal{U}$ now has at his disposal five numbers $(s,x_1,x_2,a',r')$ such that $(c',r')$ is a signature on $(A,B)$, where A is equal to $g_1^{u_i}g^s$ and B is equal to $g_1^{x_1}g^{x_2}$.

As will be obvious to those of ordinary skill in the art, $\mathcal{U}$ can do a lot of pre-computations for Box 192, only the computations that depend on a have to be performed (partly) in real time.

The payment protocol

Turning now to FIG. 20, the flowchart for the payment protocol between $\mathcal{U}$ and $\mathcal{S}$ is now described in detail.

Box 201 shows $\mathcal{U}$ sending the pair $(A,B)$ and the signature, as obtained in the withdrawal protocol, to $\mathcal{S}$.

Box 202 shows $\mathcal{S}$ specifying the challenge d, which it sends to $\mathcal{U}$.

The first two lines of Box 203 specify how $\mathcal{U}$ must compute the two responses from the challenge and the representations known of A and B. These responses are sent to $\mathcal{S}$.

The first line of Box 204 specifies the test applied by $\mathcal{S}$ to verify that the signature on $(A,B)$ is correct. The second line specifies how $\mathcal{S}$ tests that the responses are correct.

Obviously, $\mathcal{U}$ can compute the challenge d in Box 202 by himself if he has access to a clock and can "look up" I of $\mathcal{S}$.

The deposit protocol

Next, the deposit protocol will be described. Since there is no interaction needed, a figure has been omitted.

For example at the end of the day $\mathcal{S}$ sends the "payment transcript," consisting of $((A,B), (c',r'), (r_1,r_2))$ and date/time of the transaction, to $\mathcal{B}$.

$\mathcal{B}$ searches its database to determine if A has been deposited already before by some shop. Two cases can be distinguished:

1. A is not yet in the database. In that case $\mathcal{B}$ computes the number d by using I$\mathcal{S}$ of $\mathcal{S}$ and the provided number date/time of the transaction. $\mathcal{B}$ then verifies whether c' is equal to $\mathcal{H}(A,B,g^{r'}(hA)^{-c'})$ and whether $g_1^{r_1}g^{r_2}$ is equal to $A^d B$. If both verifications hold, $\mathcal{B}$ stores the vector $(A,d,r_1)$ in the database with a reference to $\mathcal{S}$ (in practice, $\mathcal{B}$ might also want to store data/time) and credits the account of $\mathcal{S}$ with the value of the coin in question.

2. A is already stored in the database. In that case a fraud has occured. If the information that is already stored was also provided by $\mathcal{S}$, and date/time is equal to that of the newly provided payment transcript, then $\mathcal{S}$ is trying to get credited twice for the same transcript. If this is not the case, then $\mathcal{B}$ computes the number d, and verifies the two verification relations as in the first case.

If both verifications hold, an account holder must have paid (at least) twice with the same coin. $\mathcal{B}$ then has at its disposal $(d,r_1)$ from the newly presented payment transcript, and $(d',r'_1)$ which is already stored. The number $(r_1-r'_1)/(d-d') \bmod q$ must then be the number $u_i$ of the accountholder $\mathcal{U}$ that double-spent. Hence $\mathcal{B}$ can determine the identity of the cheater and take appropriate actions.

As will be obvious to those of ordinary skill in the art, $\mathcal{B}$ can e.g. store $\mathcal{H}(A)$ instead of A for a suitable hash-function $\mathcal{H}$.

Remarks

All the remarks made in the basic cash system of the first preferred embodiment apply here as well.

10.2 Extension: additional, tamper-resistant bank-module that is embedded in the computing device of the user Set-up of the system This is as described in the basic system.

Opening an account with $\mathcal{B}$ $\mathcal{U}$ and $\mathcal{B}$ first perform the procedure described in the basic system for opening an account. $\mathcal{B}$ then gives a bank-module $\mathcal{O}$ to $\mathcal{U}$. $\mathcal{O}$ has stored in its memory (e.g. in ROM) a number $o_1$ in $\mathbb{Z}^*_q$ that $\mathcal{B}$ has chosen at random. $\mathcal{B}$ does not reveal this number to $\mathcal{U}$.

$\mathcal{B}$ makes the number $g_1^{o_1}$ known to $\mathcal{U}$; this number will henceforth be denoted by $A\mathcal{O}$. The sum $o_1+u_i \bmod q$ will be called the account number. $A\mathcal{O}g_1^{u_i}$ will perform the role played by $g_1^{u_i}$ in the basic system (input to the protocol). As before, $g_1^{u_i}$ will be denoted by m.

As will be obvious to those of ordinary skill in the art, everything that is described here can be trivially modified in case $\mathcal{O}$ has stored two numbers $o_1$, $o_2$, and $\mathcal{U}$ the numbers $g_1^{o_1} g_2^{o_2}$ for a certain fixed $g_2$ chosen by $\mathcal{B}$. For illustrative purposes, this modification will be used in the second description of the payment system, using a different restrictive blind signature protocol.

Of course, the random numbers of $\mathcal{O}$ can in practice be implemented by pseudo-random numbers (preferably of high quality).

The withdrawal protocol

Turning now to FIG. 21, the flowchart for the withdrawal protocol of a coin between $\mathcal{U}$, assisted by $\mathcal{O}$, and $\mathcal{B}$ is described in detail.

Box 211 shows $\mathcal{O}$ generating a random number $o_2$ in $\mathbb{Z}_q$, and computing $g_1^{o_2}$. $\mathcal{O}$ then sends this number, which will be denoted by B$\mathcal{O}$, to $\mathcal{U}$. It is noted that $\mathcal{O}$ can perform this step at any time before it is needed in Box 213.

Box 212 is the same as Box 141.

Box 213 is similar to Box 142. The second line shows that the input to the protocol is the product of m and A$\mathcal{O}$, and it is blinded by $\mathbb{Z}$ as in Box 142. The third line specifies how $\mathcal{U}$ must compute B. The difference with Box 142 is that $\mathcal{U}$ must multiply the numbers A$\mathcal{O}$ and B$\mathcal{O}$ into it; as will be appreciated, otherwise the assistance of $\mathcal{O}$ in the payment protocol will not help $\mathcal{U}$ in computing the responses expected by $\mathcal{S}$. The remaining lines specify how the number a must be blinded, and the construction of c' and c. Finally, $\mathcal{U}$ sends the blinded challenge c to $\mathcal{B}$.

Box 214 is similar to Box 143, the distinction being that in the assignment in the first line the product of A$\mathcal{O}$ with m is used, instead of only the number m. Note that $\log_g A$ m is equal to $y(o_1+u_i)$.

$\mathcal{O}$Box 215 is similar to Box 144, the distinction being the same as in Box 214.

Not displayed is that $\mathcal{B}$ debits the account of $\mathcal{U}$ with the value of the withdrawn coin.

The payment protocol

Turning now to FIG. 22, the flowchart for the payment protocol between $\mathcal{U}$, assisted by $\mathcal{O}$, and $\mathcal{S}$ is now described in detail.

Box 221 shows $\mathcal{U}$ sending (A,B) and the signature to $\mathcal{S}$. It is the same as Box 201.

Box 222 shows $\mathcal{S}$ computing a challenge d as the image of (A,B,I$\mathcal{S}$, date/time) under $\mathcal{H}_0$. $\mathcal{S}$ sends this number to $\mathcal{U}$. Note that the actions are the same as in Box 202.

Box 223 indicates how $\mathcal{U}$ blinds d to a number d' by adding modulo q a number generated in Box 213 to it. This blinded challenge is sent to $\mathcal{O}$.

Box 224 specifies that $\mathcal{O}$ tests whether it has helped before in spending the particular coin. The box shows that this is done by $\mathcal{O}$ verifying whether $o_2$ is still stored in its memory. As will be obvious to those of ordinary skill in the art, $\mathcal{O}$ does not actually need to erase $o_2$ once used. The second line shows $\mathcal{O}$ computing a response $r'_1$ to challenge d', which it sends to $\mathcal{U}$. $\mathcal{O}$ then erases $o_2$ from memory, or at least sets a flag indicating that it has assisted once in spending the coin.

Box 225 is similar to Box 203. The first line of Box 105 shows $\mathcal{U}$ testing the response of $\mathcal{O}$. If the response of $\mathcal{O}$ is correct, $\mathcal{U}$ computes the two responses $r_1$ and $r_2$ in the manner specified by the second and third lines, corresponding to d and expected by $\mathcal{S}$. Note that the second response is computed in the same way as in Box 203, but to compute the first response $\mathcal{U}$ must now also make use of the response just sent by $\mathcal{U}$. $\mathcal{O}$ then sends the two responses to $\mathcal{S}$.

Box 226 indicates that $\mathcal{S}$ tests the validity of the signature and the responses. It is the same as Box 204.

As in the basic system, $\mathcal{U}$ can compute the challenge d in Box 222 himself if he has access to date/time and $\mathcal{S}$.

The deposit protocol

This is similar to the procedure described in the basic system. In case $\mathcal{B}$ finds out that a coin has been double-spent (and hence the double-spender must have been able to break the tamper-resistance of his bank-module), then $\mathcal{B}$ can compute the number $u_i+o_1$ mod q of the double-spender as explained before, and hence his identity.

10.3 Extension: coins that may be spent multiple times

As mentioned in the description of the flowchart of FIG. 14, the signature can correspond to a vector of numbers instead of to just one number. In the basic system this was used for a pair of numbers. The basic system can be straightforwardly modified in order to obtain coins that may be spent k times, for some k∈$\mathbb{N}$. From the description of this extension in the first preferred embodiment, it will be obvious to those of ordinary skill in the art how to do this. For clarity, a description follows.

In Box 192, U must feed not just one number B as additional argument to $\mathcal{H}_0$ but k number $B_1, \ldots, B_k$. These numbers are chosen by $\mathcal{B}$ such that for each $B_i$ he knows a pair $(x_{i1}, x_{i2})$ in $\mathbb{Z}_q \times \mathbb{Z}_q$ such that $B_i$ is equal to $g_1^{x_{i1}} g^{x_{i2}}$.

In the payment protocol $\mathcal{U}$ must then send in Box 201 all $B_i$'s along. In the i-th payment $\mathcal{U}$ sends in Box 203 the numbers $r_1=du_i+x_{i1}$ mod q and $r_2=ds+x_{i2}$ mod q to $\mathcal{S}$. The value of i must be apparent from the payment protocol, and can hereto be required to be part of the argument of $\mathcal{H}_0$.

If $\mathcal{B}$ ever finds out that a coin was spent k+1 times, then he can compute from two different pairs $(r_1, r_2)$ corresponding to a payment that was performed (at least) twice involving the same $B_i$ the exponent of the cheater as in the basic system.

Obviously one can reduce the number of bits transmitted in Box 201 of the payment flowchart. There are various ways to do this, as will be obvious to those of ordinary skill in the art. One possibility has been mentioned before: instead of using $B_i$ throughout, $\mathcal{H}(B_i)$ is used for a suitable choice of $\mathcal{H}$. That means that the hash-values of the $B_i$'s will be used as argument of the hash-functie in Box 192 of the withdrawal protocol.

11 Off-line electronic cash systems: using a different restrictive blind signature protocol In accordance with the remark at the beginning of the previous section, yest another restrictive blind signature protocol will be described. Contrary to the restrictive blind signature protocol used in the foregoing description of the cash system, the certifying party need not know $\log_g$ m in order to compute the response r, and so the extensions of the protocol to anonymous accounts and cheques can be realized as in the first preferred embodiment. As will be appreciated, hardly any modifications to the foregoing protocols are needed.

First, a set-up phase is needed. In this phase, $\mathcal{P}$ chooses a number $g \in G_q$ and a number $x \in \mathbb{Z}_q$, and makes g and $h = g^x$ publicly known. The number x is the secret key of $\mathcal{P}$. The function $\mathcal{H}$ is a collision-free hash-function that maps four numbers in $G_q$ to a number in $\mathbb{Z}^*_q$.

As before, at the start of the protocol a number m in $G_q$ is chosen that both parties know; this is the input of the protocol.

A digital signature of $\mathcal{P}$ on a number $m \in G_q$ is a vector (z,a,b,r) such that $g^r$ is equal to $h^c a$ and $m^r$ is equal to $z^c b$, with c denoting $\mathcal{H}(m,z,a,b)$. As noted before, the numbers (c,r) can be used as the signature instead.

Figure 23:
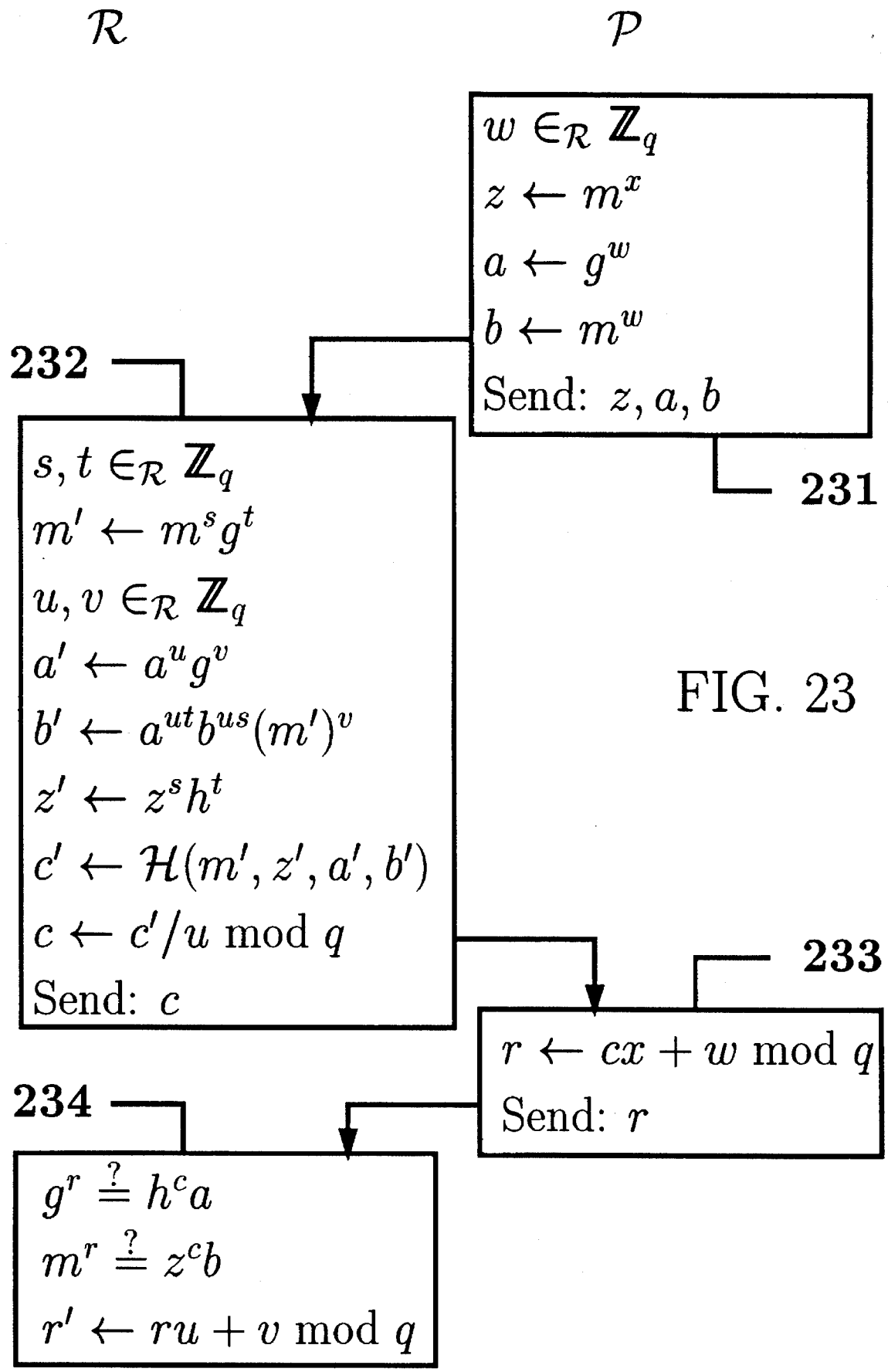
FIG. 23 shows a flowchart of yet another restrictive blind signature protocol for the second preferred embodiment in accordance with the teachings of the present invention.

Turning now to FIG. 23, a flowchart of a restrictive blind signature protocol will now be described in detail.

As will be appreciated, this protocol is constructed from the earlier mentioned Schnorr protocol for identification, which is of the Fiat/Shamir type, by applying the inventive second technique explained in the description of the first preferred embodiment.

Box 231 shows $\mathcal{P}$ generating a random number w from $\mathbb{Z}_q$. The third and fourth lines show how $\mathcal{P}$ applies this number to g and the input m of the protocol in order to obtain two numbers, denoted by a and b. Using the secret key x, $\mathcal{P}$ also computes a number z by applying it to m, as specified in the second line. $\mathcal{P}$ then sends z, a, and b to $\mathcal{R}$.

The first line of Box 232 shows $\mathcal{R}$ generating two random numbers from $\mathbb{Z}_q$ which are then applied to blind m to m' as indicated in the second line. The third line shows $\mathcal{R}$ generating two more random numbers, which are used to blind the numbers a and b, sent by $\mathcal{P}$ in the preceding box, to numbers a' resp. b' as specified in the fourth resp. fifth lines. The sixth line shows how $\mathcal{R}$ blinds z, also send by $\mathcal{P}$ in the previous box, to a number z'. Then $\mathcal{R}$ uses the blinded numbers to compute challenge c' by applying the hash-function to them, and blinds c' to c as specified in the eightth line. Finally, $\mathcal{R}$ sends c to $\mathcal{P}$.

Box 233 shows how $\mathcal{P}$ computes the response r, which it then sends to $\mathcal{R}$.

The first two lines of Box 234 indicate the test applied by $\mathcal{R}$ to verify the correctness of the response r. If both equalities hold, then $\mathcal{R}$ computes the blinded form r' of r in the manner specified in the third line.

This protocol allows for exactly the same blinding manipulations with respect to m, and restrictions thereof, as the protocol in FIG. 16 and its variant described in the description of the corresponding flowchart. The vector (z', a',b',r') is a digital signature of $\mathcal{P}$ on m'. The pair m', (z',a',b',r') satisfies the requirement for a blind signature protocol. For clarity the notation sign(m) will henceforth be used to denote a signature on m'.

As remarked in the protocol of FIG. 16 and its variant, g can be excluded from the (k+1)-vector with respect to which $\mathcal{R}$ must know a representation, not influencing the fact that a blind signature has been obtained (assuming that m≠1). In that case $\mathcal{R}$ must inevitably use t equal to zero if he wants to know a representation of m' with respect to $(g_1, \ldots, g_k)$ at the end. Also, anyone can in that case verify if $\mathcal{R}$ has set s equal to zero in Box 232: if s=0 then m'=1.

As will be obvious to those of ordinary skill in the art, and in accordance with earlier the descriptions of restrictive blind signature protocols, it is easy to derive related variants from this protocol. For instance, the variant for which the verification relations are $g^r = ha^c$ and $m^r = zb^c$ is also a restrictive blind signature protocol (although the assignments made to a,b and z will in that case be somewhat more complicated).

Next it will be shown how to use this protocol in the construction of off-line cash systems; the resulting system allows for precisely the same extensions as the system described in the first preferred embodiment. As promised, only minor adaptations to the foregoing description are needed.

11.1 Basic system

As before, in the description it is assumed that only one type of coin is issued. The issuing of coins of different representations can be realized as described earlier.

Set-up of the system.

Before the system can be put to use, $\mathcal{B}$ generates a random number x in $\mathbb{Z}_q$ and a number g in $G_q$. $\mathcal{B}$ computes $g^x$, which will be denoted by h, and makes (g,h) publicly known. The number x is the secret key of $\mathcal{B}$.

$\mathcal{B}$ also generates two numbers $g_1, g_2$ in $G_q$. These are also made publicly known. As will be clear to those of ordinary skill in the art, for security reasons $\mathcal{B}$'s choices for $g,h,g_1,g_2$ should be such that it seems infeasible for other parties to compute a non-zero representation of 1 with respect to $(g,h,g_1,g_2)$; this is easily taken care of by generating the numbers at random.

$\mathcal{B}$ also makes publicly known a suitable hash-function $\mathcal{H}$. This function operates on five numbers from $G_q$ and maps them to $\mathbb{Z}_q$. The function $\mathbb{Z}$ should be collision-free.

Opening an account with $\mathcal{B}$

In order to open an account with $\mathcal{B}$, $\mathcal{U}$ must identify himself. $\mathcal{B}$ registers the identity-related information together with a number $u_1 \in \mathbb{Z}^*_q$. This number is chosen differently for each account holder. In case $\mathcal{U}$ double-spends, $\mathcal{B}$ will be able to compute $u_1$.

Withdrawal protocol

Turning to FIG. 24, the flowchart of a withdrawal protocol will now be described in detail.

Box 241 is similar to Box 231, with the distinction that the number m is computed from $g_1, g_2$, and the number $u_1$ of the account holder participating in the protocol, in the manner specified in the second line. As will be clear to those of ordinary skill in the art, m need be computed only once for each account holder; it can be stored beforehand. Moreover, the number m does not need to be sent to $\mathcal{U}$, since $\mathcal{U}$ can compute it by himself (possibly doing this only once, with the computing device storing it). $\mathcal{B}$ then sends the numbers z, a, b to $\mathcal{U}$.

Box 242 is similar to Box 232, with a few distinctions. First of these is that $\mathcal{U}$ in fact sets t equal to zero, instead of choosing it at random. Second is that s may not be chosen equal to zero. Thirdly, $\mathcal{U}$ feeds two numbers, denoted by A and B, into the hash-function, rather than just one. As in the previously described withdrawal protocols, this can be done by taking A equal to m' and B such that a randomly chosen representation with respect to $(g_1,g_2)$ is known of it. To once more illustrate the fact that many small modifications are possible without needing to deviate in any way from the inventive techniques, another way to generate A and B will be used here. This consists of $\mathcal{U}$ "splitting" m' into A and B, meaning that the product AB is equal to m', and that $\mathcal{U}$ must know representations of both A and B. To this end, $\mathcal{U}$ generates random numbers $x_1$ and $y_1$, both from $\mathbf{Z}_q$, and computes A and B from this in the manner specified in the sixth and seventh lines. The number $u_1 s - x_1$ mod q will be denoted by $x_2$ and $y_2$ will be denote $s - y_1$ mod q.

Box 243 is the same as Box 233. Not shown is that $\mathcal{B}$ debits the account of $\mathcal{U}$.

Box 244 is the same as Box 234.

$\mathcal{U}$ now has at his disposal numbers A,B together with a corresponding signature sign(A,B) (being the vector (z',a', b',r')), such that he knows representations of A and B with respect to $(g_1, g_2)$.

As will be obvious to those of ordinary skill in the art, if $\mathcal{B}$ in the set-up phase also makes $g_1^x$ and $g_2^x$ publicly known, then in Box 241 $\mathcal{B}$ need not send z to $\mathcal{U}$, since $\mathcal{U}$ can compute z himself. In any case, $\mathcal{B}$ only needs to send the number z at most once to $\mathcal{U}$, since it is always the same when the same account holder is involved in the protocol: $\mathcal{U}$ can store z. Computations and transmissions that need be done only once for each account holder are denoted in square brackets ('[]').

The payment protocol

Turning now to FIG. 25, the flowchart of the payment protocol will now be described in detail.

Box 251 shows $\mathcal{U}$ sending A,B and the signature obtained in the withdrawal protocol to $\mathcal{S}$.

The first line of Box 252 shows $\mathcal{S}$ verifying that $\mathcal{U}$ in Box 242 did not take s equal to zero; as will be clear to those of ordinary skill in the art, if s=0 could be used then account holders can double-spend without ever being identified afterwards. As indicated by the second line, $\mathcal{S}$ also verifies that the signature sent by $\mathcal{U}$ is correct. The relations that must hold in order for the signature to be correct have been described in the description of the set-up phase for the signature protocol of FIG. 23. The third line of the box shows $\mathcal{S}$ generating a challenge d from $\mathbf{Z}_q$ that may not be equal to 1. This challenge is then sent to $\mathcal{U}$.

Note that the flowchart specifies the test for correctness of the signature to take place in this box, rather than in Box 254, as is the case in earlier flowcharts of payment protocols; this is merely to once more point out that various tests can be performed in different orders than indicated in the flowcharts. That is, the test might as well be performed in Box 254, or even while $\mathcal{U}$ is performing the computations of Box 253.

Box 253 shows $\mathcal{U}$ verifying that the challenge differs from 1. The second and third lines show $\mathcal{U}$ generating two responses based on the challenge and the representations he knows of A and B. As will be clear, the test for inequality of the challenge to 1 is to protect the privacy of $\mathcal{U}$; if d=1 then the responses reveal the number $u_1$ to $\mathcal{S}$.

Box 254 shows $\mathcal{S}$ testing the correctness of the responses. As before, if the test holds then $\mathcal{S}$ accepts the payment.

The challenge d may be determined in the same way as in the earlier payment protocols. As will be obvious to those of ordinary skill in the art, however, the requirement that d be the outcome of a collision-free hash-function can be weakened in this case, due to the fact that the particular restrictive blind signature protocol does not allow forgery even if one does not need to know a representation of the output of the signature protocol.

The deposit protocol $\mathcal{S}$ sends the payment transcript to $\mathcal{B}$. $\mathcal{B}$ verifies the validity of the transcript by performing the same verifications as $\mathcal{S}$ did in the payment protocol (that is, AB $\neq$ 1, verification of the signature and of the responses $r_1, r_2$, is d of the required format). In effect, this stage is the same as in earlier descriptions of payment protocols. In case of double-spending $\mathcal{B}$ knows (at least) two distinct payment transcripts involving the same A,B but different challenges and corresponding responses. This enables $\mathcal{B}$ to compute $u_1$ as will be clear to those of ordinary skill in the art.

11.2 Extension: protection against framing

As in the earlier descriptions, a minor modification suffices to protect users against framing attempts. Hereto, in the stage where $\mathcal{U}$ opens his account with $\mathcal{B}$, not $\mathcal{B}$ but $\mathcal{U}$ himself should generate the number $u_1$. $\mathcal{U}$ then reveals $g_1^{u_1}$, which will be denoted with I, to $\mathcal{B}$, but not $u_1$ itself. Note that this is sufficient for $\mathcal{B}$ to compute m ($=Ig_2$) in Box 241 of the withdrawal protocol. As will be obvious to those of ordinary skill in the art, $\mathcal{U}$ can generate I in cooperation with $\mathcal{B}$ in such a way that $\mathcal{B}$ does not know $u_1$; the advantage of this is that $\mathcal{B}$ can ensure that $u_1$ is a random number to $\mathcal{U}$, rather than a deliberate choice of $\mathcal{U}$.

In case $\mathcal{U}$ cheats by spending the same coin more than once, $\mathcal{B}$ can compute $u_1$ as before, and hence determine the identity of the double-spender.

Although the descriptions given thus far in the application should be more than sufficient to enable those of ordinary skill to make the necessary modifications themselves without any difficulty, for the sake of completeness a description will be given of the incorporation of unconditional protection against framing.

Set-up of the system

This is almost the same as in the description of the basic system, with the extension being that $\mathcal{B}$ also makes publicly known a number $g_3 \in G_q$, different from each of g, h $g_1$ and $g_2$.

Opening an account

When opening an account with $\mathcal{B}$, $\mathcal{U}$ must identify himself. $\mathcal{U}$ generates two random numbers $u_1$ and $u_2$ from $\mathbf{Z}_q$ (possibly in cooperation with $\mathcal{B}$, as described before), computes $g_1^{u_1} g_2^{u_2}$ (denoted by I), and sends I to $\mathcal{B}$. In case $\mathcal{U}$ double-spends, $\mathcal{B}$ will be able to compute $u_1, u_2$. Since $I = g_1^{u_1} g_2^{u_2}$ is registered together with the account of $\mathcal{U}$ and information related to his identity, $\mathcal{B}$ can find out the identity of the double-spender and press charges.

The withdrawal protocol

First, it is noted that $\mathcal{U}$ can prove that the money that will be withdrawn is withdrawn from his legitimate account, by proving to $\mathcal{B}$ that he knows a representation of I with respect to $(g_1, g_2)$; the protocol of FIG. 18 can be used to this end. Alternatively, $\mathcal{U}$ can sign a withdrawal request using a public key set-up.

Figure 26:
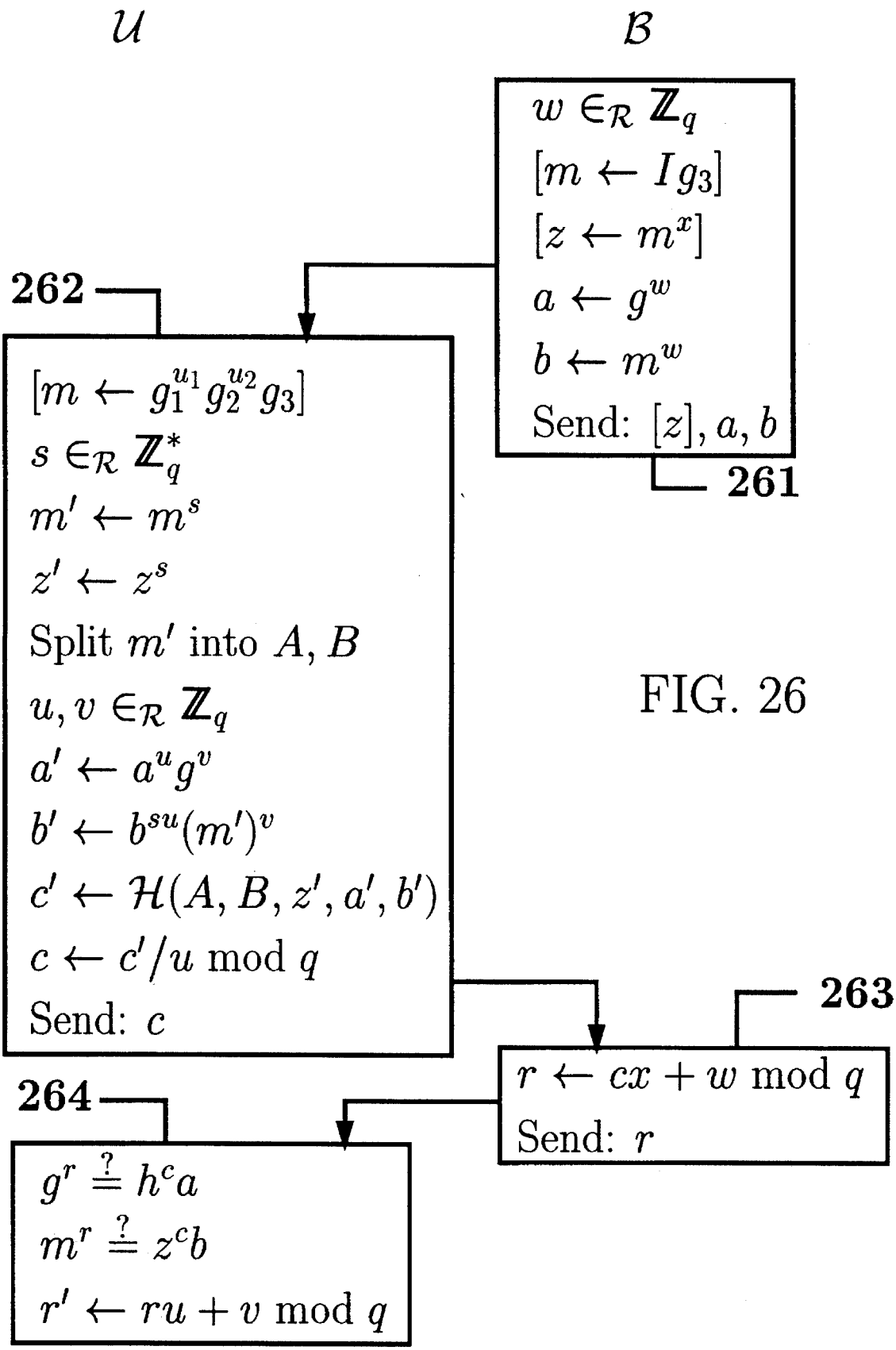
FIG. 26 shows a flowchart of a withdrawal protocol with unconditional protection against framing for the second preferred embodiment in accordance with the teachings of the present invention.

Turning now to FIG. 26, a flowchart of the modified withdrawal protocol will now be described.

Box 261 is similar to Box 241. As remarked, $\mathcal{B}$ can compute m from I; this is shown in the second line of the box. The other actions are the same.

Box 262 is similar to Box 242, the only distinction being that m is computed as I times $g_3$. Since the splitting of m' into A and B is the same as in Box 242, it is not explicitly written out.

Box 263 is the same as Box 243, and Box 264 is the same as Box 244.

The payment protocol

Figure 27:
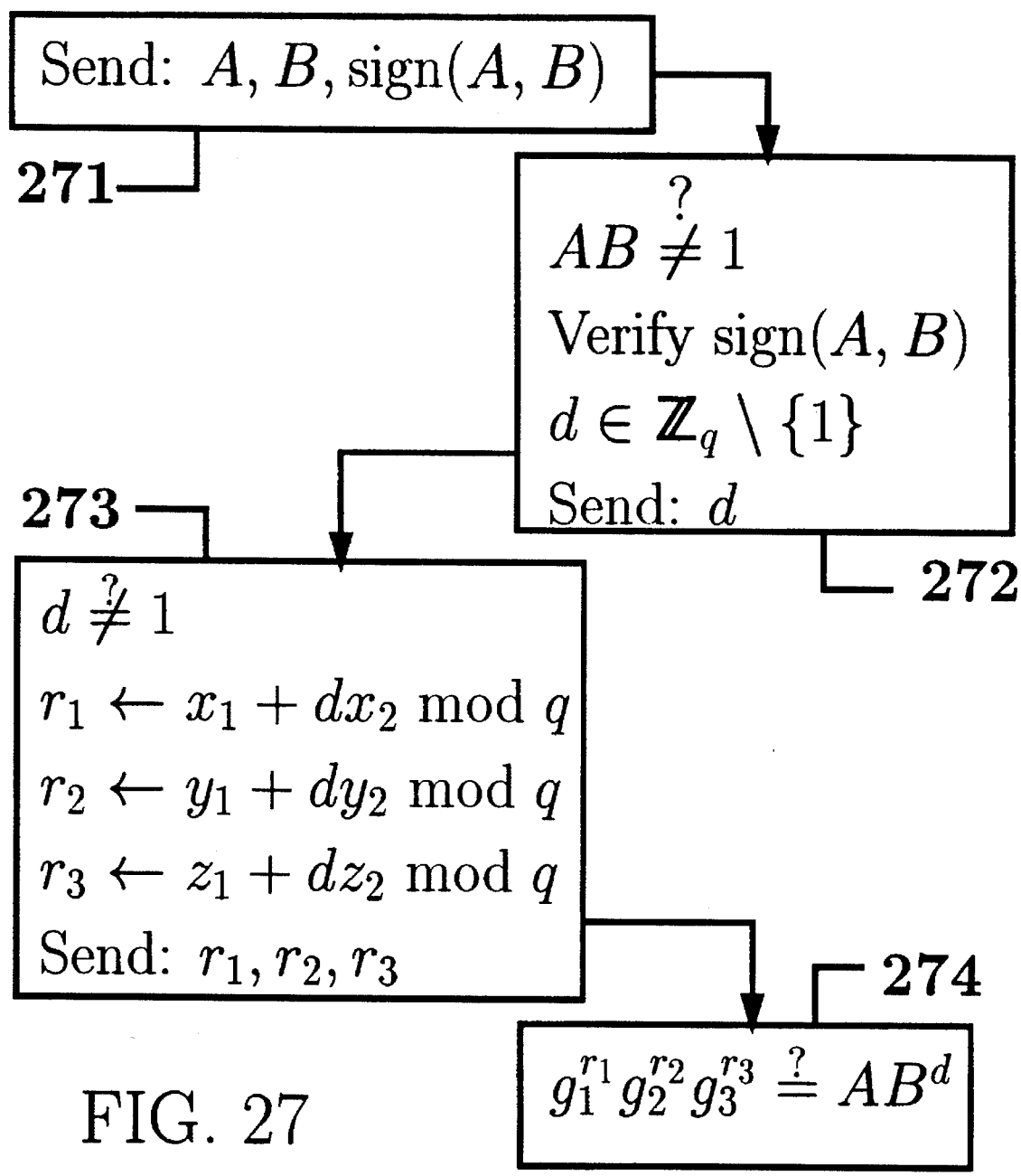
FIG. 27 shows a flowchart of a payment protocol with unconditional protection against framing for the second preferred embodiment in accordance with the teachings of the present invention.

Turning to FIG. 27, the flowchart of the modified payment protocol will now be described.

Box 271 resp. Box 272 are the same as Box 251 resp. Box 252.

Box 273 is similar to Box 253, with the distinction that $\mathcal{U}$ computes three responses instead of just two.

Box 274 is similar to Box 254, with the test for the correctness of the responses modified, considering that there are three responses that must be tested.

The deposit protocol

This is the same as in the basic system; only the computation performed by $\mathcal{B}$ in case double-spending has taken place needs to be modified in the obvious way.

11.3 Extension: additional, tamperresistant bank-module that is embedded in the computing device of the user For illustrative purposes the description of this extension is as such that the feature of protection against framing, independent of computational power of $\mathcal{B}$, is incorporated. This is merely to illustrate the fact that all the extensions can be easily incorporated simultaneously, as will be obvious to those of ordinary skill in the art.

Set-up of the system

This is exactly as in the previous extension of the basic system.

Opening an account

As before, one may let $\mathcal{B}$ generate at random a pair $(o_1,o_2)$, which B stores in, say, the ROM of the tamper-resistant device $\mathcal{O}$ before giving it to the accountholder $\mathcal{U}$.

Figure 28:
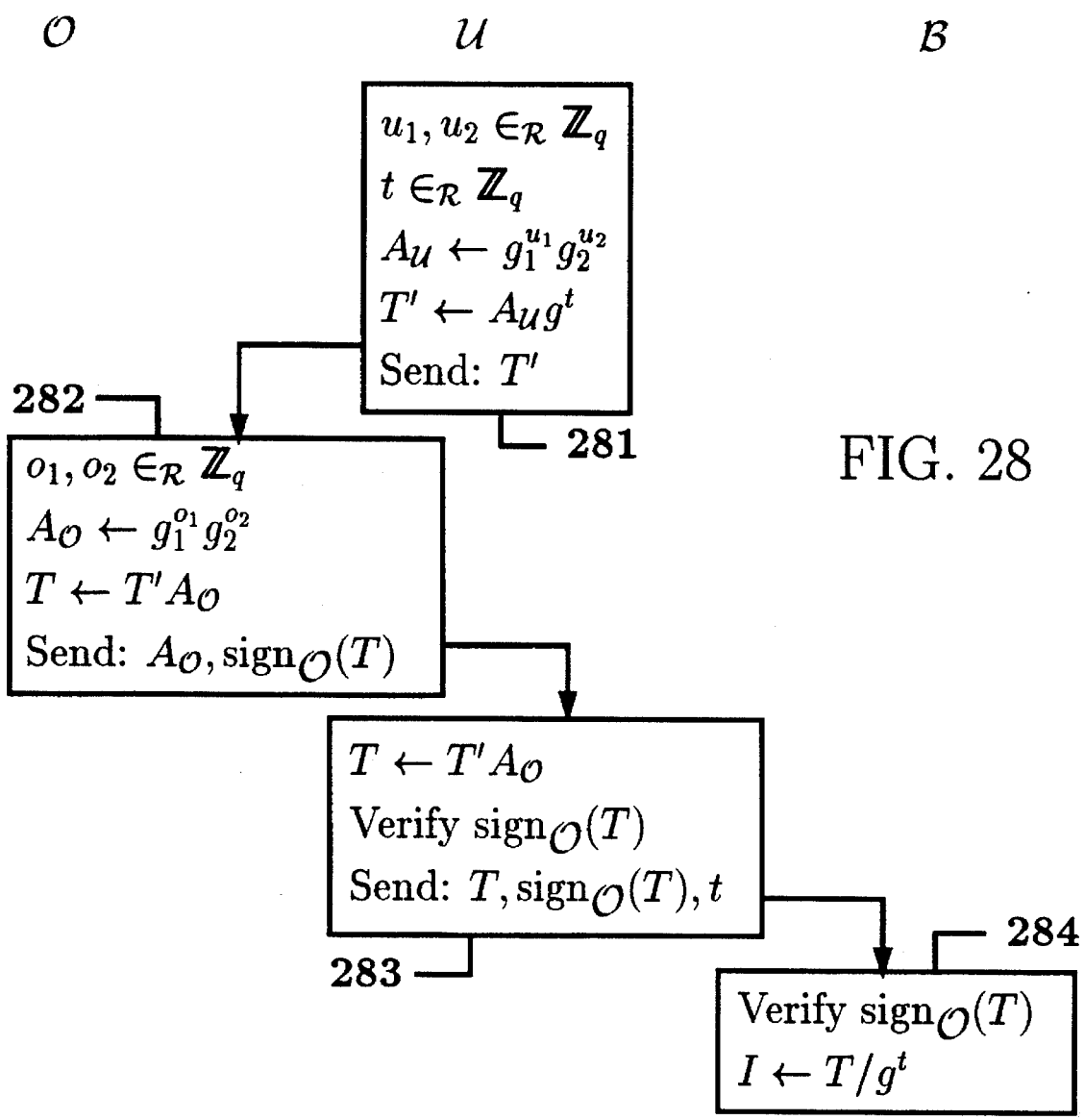
FIG. 28 shows a flowchart of a protocol for opening an account, when a tamper-resistant device must cooperate with the computing device of the user, for the second preferred embodiment in accordance with the teachings of the present invention.

To illustrate the way in which the inventive techniques displayed in this application can be combined in straightforward ways, an alternative realization is described. Turning to FIG. 28, a flowchart of this protocol will now be described in detail.

In this protocol, a signature by $\mathcal{O}$ must be computed, so a public-key set-up is needed; this can be installed by some organization trusted by $\mathcal{B}$ into $\mathcal{O}$. As will be obvious to those of ordinary skill in the art, this organization need not be the bank itself; it may be an issuer of the tamper-resistant devices for instance. In this way, previously issued tamper-resistant modules can be used to assist in cash systems that are initiated in a later stage, without users having to hand their tamper-resistant part to the bank in order to let it install $A\mathcal{O}$. In it illustrates that there in fact is no need for $\mathcal{B}$ to know $A\mathcal{O}$. It is noted that, in order to prevent $\mathcal{O}$ from sending encoded information to $\mathcal{B}$, the public-key signature set up of $\mathcal{O}$ must be such that for each number there exists only one signature.

Box 281 shows $\mathcal{U}$ generating a number $A\mathcal{U}$ such that he knows a random representation of it with respect to $(g_1,g_2)$. This number will be used by $\mathcal{U}$ throughout. The fourth line shows $\mathcal{U}$ blinding this number to a number T', which is sent to $\mathcal{O}$.

Box 282 shows $\mathcal{O}$ generating a number $A\mathcal{O}$ such that it knows a random representation $(o_1,o_2)$ of it with respect to $(g_1,g_2)$. The third line shows $\mathcal{O}$ computing the product of this number with the number sent by $\mathcal{U}$ in the previous box. $\mathcal{O}$ then signs this product using its public-key set-up, and sends $A\mathcal{O}$ and the signature on the product to $\mathcal{U}$.

Box 283 shows $\mathcal{U}$ computing the product as $\mathcal{O}$ did, and testing that $\mathcal{O}$ indeed sent his signature on it. If this is the case, then $\mathcal{U}$ sends the product, the signature of $\mathcal{O}$, and the number used to blind $A\mathcal{U}$ in Box 281, to B.

Box 284 shows $\mathcal{B}$ verifying the signature on T as $\mathcal{U}$ did. If the signature of is correct, and hence $\mathcal{B}$ is ensured that a tamper-resistant part cooperated, then it computes $T/g^t$. This number will be denoted by I, and is registered by $\mathcal{B}$ together with the identity of $\mathcal{U}$ under the new account.

As will be appreciated, $\mathcal{O}$ and $\mathcal{U}$ can now or in a later stage prove that they know a representation of I with respect to $(g_1,g_2)$, without revealing any additional information about the numbers, and such that $\mathcal{O}$ does not reveal useful information about the pair $(o_1,o_2)$ to $\mathcal{U}$. This protocol has been described earlier; it is similar to the payment protocol of FIG. 22. It is noted that in this way $\mathcal{U}$ can always prove ownership of his account, for example in the withdrawal protocol.

Should $\mathcal{U}$ unexpectedly be able to determine the contents of the tamper-resistant device (by breaking the tamper-resistance), and spend the same information more times than allowed, then $\mathcal{B}$ will be able to determine $(o_1+u_1,o_2+u_2)$. As before, by computing I from this $\mathcal{B}$ can then determine the identity of the double-spender.

As will be obvious to those of ordinary skill in the art, $o_2$ may be (required to be) set to zero by $\mathcal{O}$. In that case, in the withdrawal protocol, to be described shortly, $\mathcal{U}$ can set $u_4$ to zero and $\mathcal{O}$ can set $o_4$ to zero. Also, $\beta$ may be set to zero. In the payment protocol, only $r_1'$ must be computed and sent to $\mathcal{U}$ in that case.

The withdrawal protocol

Turning now to FIG. 29, a flowchart of the payment protocol of a coin between $\mathcal{U}$, assisted by $\mathcal{O}$, and $\mathcal{B}$ is described in detail.

Box 291 shows $\mathcal{O}$ generating two random numbers in order to generate a number denoted by $B\mathcal{O}$ such that it knows a representation of it with respect to $(g_1,g_2)$. $\mathcal{O}$ then sends $B\mathcal{O}$ to $\mathcal{U}$. As in the protocol of FIG. 21, $\mathcal{O}$ can perform this step at any time before it is needed in Box 293.

Box 292 is the same as Box 261.

Box 293 is similar to Box 262. The first line shows $\mathcal{U}$ computing m as the product of I and $g_3$, which need be done only once. The second and third lines show that this number is blinded by $\mathcal{U}$ as in Box 262. Note that the blinding number is denoted by $\alpha$ instead of s, the reason for which is only to avoid notational conflicts in denoting all the random numbers. In accordance with the splitting of A and B as used in the basic system, the eighth and ninth lines show $\mathcal{U}$ generating A and B. Note that $\mathcal{U}$ to this end multiplies the numbers $A\mathcal{O}$ and $B\mathcal{O}$ into the splitting; as before, otherwise the assistance of $\mathcal{O}$ in the payment protocol will not help $\mathcal{U}$ in computing responses expected by $\mathcal{S}$. The remaining lines are the same as in Box 262.

Box 294 is the same as Box 263, and Box 295 is the same as Box 264.

The payment protocol

Turning now to FIG. 30, a flowchart for the payment protocol between $\mathcal{U}$, assisted by $\mathcal{O}$, and $\mathcal{S}$ is now described in detail.

Box 301 shows $\mathcal{U}$ sending (A,B) and the signature on the pair to $\mathcal{S}$. It is the same as Box 201.

Box 302 is the same as Box 272.

Box 303 indicates how $\mathcal{U}$ blinds d to a number d' by using random numbers generated in Box 293. This blinded challenge is sent to $\mathcal{O}$.

Box 304 is similar to Box 224. It specifies that $\mathcal{O}$ tests whether it has helped before in spending the particular coin. The second line shows shows $\mathcal{O}$ testing that the received challenge differs from zero. As will be appreciated, the actions in Box 293 and Box 303 can be modified such that no such testing is needed; in that case, $r'_1$ must be computed as $d'o_1+o_3$ rather than as specified in the Box (likewise for $r'_2$), and the tests in Box 305 and 306 must be changed accordingly. Such modification will be obvious to those of ordinary skill in the art; in fact, in all earlier payment protocols including the tamper-resistant part, no such test for the challenge is needed.

The third and fourth lines show $\mathcal{O}$ computing two responses to challenge d', both of which it sends to $\mathcal{U}$. $\mathcal{O}$ then erases $o_2$ from memory, or at least sets a flag indicating that it has assisted once in spending the coin.

Box 305 is similar to Box 225. The first line of Box 305 shows $\mathcal{U}$ testing the responses of $\mathcal{O}$. If the responses of $\mathcal{O}$ are correct, $\mathcal{U}$ computes the three responses $r_1, r_2$, and $r_3$ in the manner specified by the next three lines. $\mathcal{U}$ then sends the three responses to $\mathcal{S}$.

Box 306 is the same as Box 274.

The deposit protocol

This is as in the previous extension.

As will be appreciated, framing attempts of $\mathcal{B}$ have negligible probability of success, even if the tamperresistant device of the accused user is programmed such as to help $\mathcal{B}$ in such an attempt. That is, determining $u_1, u_2$ has negligible probability of success even if $\mathcal{O}$ pretends to have used different values for $o_1, o_2$ than it actually did.

Furthermore, as will be obvious to those of ordinary skill in the art $o_2, o_4, u_2$ and $u_4$ can be set to zero and $g_3$ to 1. In that case, framing is protected, but only in case $\mathcal{B}$ does not have "unlimited" computing power.

As in all other withdrawal and payment protocols described in this application, the actions of $\mathcal{O}$ in this pair of protocols are precisely such that the inventive technique of it performing in effect an identification protocol of the Fiat/Shamir type is applied; in the withdrawal protocol the first "round" takes place; in the payment protocol the challenge and response rounds takes place.

11.4 Extension: Multi-spendable coins

As will be obvious from the earlier descriptions, the protocols can be modified such that the same coin is allowed to be spent multiple times. For a k-spendable coin, in case $\mathcal{B}$ receives a payment transcript involving the same A,B for the k+1st time, he can find out the identity of the cheater as before.

11.5 Extension: electronic cheques

Again, for illustrative purposes this extension is described here such that the protection against framing, independent of computational power, is incorporated.

The set-up of the system

This is exactly as described in the first extension, with the addition that $\mathcal{B}$ makes publicly known 2k numbers $e_k, f_k$ from $G_q$ and two numbers $d_1, d_2$ from $G_q$, all distinct from one another and distinct from g, h, $g_1$ and $g_2$. (Here, $d_1$ takes over the role of $g_3$, which is merely for notational purposes.) More specifically, all these numbers must be such that it seems difficult for others to compute 2k+6 numbers $b_i \in \mathbb{Z}_q$ (not all zeros) such that $g_1^{b_1} g_2^{b_2} d_1^{b_3} d_2^{b_4} h^{b_5} e_1^{b_6} f_1^{b_7} \ldots e_k^{b_{2k+5}} f_k^{b_{2k+6}}$ is equal to 1. As before, it is easy to meet this requirement.

Cheques in the system can be spent for $2^k$ different amounts, without $\mathcal{U}$ needing to know beforehand for what amount he will spend the cheque. To this end, one can let the pair $(e_i, f_i)$ represent for example $2^{i-1}$ quarters, as described earlier.

As will be obvious to those of ordinary skill in the art, for security reasons the number x used by $\mathcal{B}$ must be different than that used to certify coins.

Opening an account with $\mathcal{B}$

This is the same as in the first extension.

The withdrawal protocol

Turning now to FIG. 31, the flowchart for the withdrawal protocol of a cheque between $\mathcal{U}$ and $\mathcal{B}$ will now be described in detail.

Box 311 shows $\mathcal{U}$ generating a number $m_1$ such that he knows a random representation of it with respect to $(e_1, f_1, \ldots, e_k, f_k, d_2)$. $\mathcal{U}$ sends this number to $\mathcal{B}$.

Box 312 is similar to Box 261, with $\mathcal{B}$ in addition registering $m_1$ with the account of $\mathcal{U}$. Note that in addition to $d_1$ (denoted by $g_3$ in FIG. 29) the number $m_1$ is multiplied with I to obtain the input m.

Box 313 is similar to Box 262. Note that in the second line the product $Id_1 m_1$ is used instead of $Id_1$. The only other difference is that $\mathcal{U}$ generates k+1 random numbers instead of just two, and uses them all to compute the splitting of m' into A and B. This is done as follows: $u_1 s = x_1 + x_2 \bmod q$, $u_2 s = y_1 + y_2 \bmod q$, $s = z_1 + z_2 \bmod q$, $a_1 s = \alpha_{1A} + \alpha_{1B} \bmod q$, $b_1 s = \beta_{1A} + \beta_{1B} \bmod q, \ldots, a_k s = \alpha_{kA} + \alpha_{kB} \bmod q$, $b_k s = \beta_{kA} + \beta_{kB} \bmod q$, $a_{k+1} s = \alpha_A + \alpha_B \bmod q$.

The numbers at the right-hand side of these equalities are generated by $\mathcal{U}$ at random from $\mathbb{Z}_q$, in such a way that the equalities hold. $\mathcal{U}$ then computes $g_1^{x_1} g_2^{y_1} d_1^{z_1} e_1^{\alpha_{1A}} f_1^{\beta_{1A}} \ldots e_k^{\alpha_{kA}} f_k^{\beta_{kA}} d_2^{\alpha_A}$, which will be denoted by A, and m'/A, which will be denoted by B.

The other lines of the box show $\mathcal{U}$ computing the other numbers as in Box 262.

Box 314 is the same as Box 263, and Box 315 is the same as Box 264.

Not shown is that $\mathcal{B}$ debits the account of $\mathcal{U}$ for an amount corresponding to the maximum amount for which the cheque may be spent.

The payment protocol

Turning now to FIG. 32, the flowchart of the payment protocol for a cheque between $\mathcal{U}$ and $\mathcal{S}$ is now described in detail.

Box 321 is the same as Box 271. Not displayed is that $\mathcal{U}$ also informs $\mathcal{S}$ of the amount for which he wants to pay with the cheque. Without loss of generality, it will be assumed that $\mathcal{U}$ wants to spend an amount corresponding to $(e_1, f_1), \ldots, (e_j, f_j)$, where $1 \leq j \leq k$.

Box 322 is the same as Box 272.

Box 323 is quite similar to Box 273. The difference is that $\mathcal{U}$ computes not two but k+1 responses, as specified in the box. $\mathcal{U}$ then sends all these responses to $\mathcal{S}$.

Box 324 shows $\mathcal{S}$ testing the correctness of the responses. To this end, $\mathcal{S}$ verifies that $r_{13}+r_{14} \neq 0$ mod q, . . . , $r_{j3}+r_{j4} \neq 0$ mod q and that $AB^c$ is equal to $\Pi_{i=1}^{j} e_i^{r_{i1}} f_i^{r_{i3}} \cdot (\Pi_{i=1}^{j} e_i^{r_{i2}} f_i^{r_{i4}})^c \cdot \Pi_{i=j+1}^{k} e_i^{r_{i1}} f_i^{r_{i2}} \cdot \Pi_{i=1}^{2} g_i^{r_{(k+1)i}} \cdot d_1^{r_{(k+1)3}} d_2^{r_{k+2}}$. If these tests hold, $\mathcal{S}$ accepts and provides the services corresponding to the part of the cheque that $\mathcal{U}$ spent.

The deposit

As before, $\mathcal{S}$ sends the payment transcript to $\mathcal{B}$, and $\mathcal{B}$ verifies the correctness. If the verifications hold, and the cheque has not been spent before, then $\mathcal{B}$ stores (for $1 \leq i \leq j$) the numbers $(r_{i1}+r_{i2})(r_{i3}+r_{i4})^{-1}$ mod q in a database.

If a cheque has been spent already then $\mathcal{B}$ can determine the identity of the double-spender as before.

The refund protocol

Turning now to FIG. 33, a flowchart for the refund protocol between $\mathcal{U}$ and $\mathcal{B}$ is now described in detail.

Not shown is that $\mathcal{U}$, in order to get a refund for the unspent part of the cheque, informs $\mathcal{B}$ of the number $m_1$ corresponding to the cheque in question;

Box 331 shows that $\mathcal{B}$ verifies that $m_1$ is registered with the account information of $\mathcal{U}$. Only if this is the case, the rest of the protocol is performed. As will be clear, Box 331 may be combined with Box 333 if the part of $\mathcal{U}$ informing $\mathcal{B}$ of $m_1$ is combined with Box 332.

Box 332 shows $\mathcal{U}$ sending the numbers $a_i$, $b_i$, for $j<i \leq k$, to $\mathcal{B}$, i.e. the exponents corresponding to the terms $e_i, f_i$ of the cheque that have not been spent. In compliance with FIG. 32, it is assumed that these are the last k-j terms. The box also shows $\mathcal{U}$ computing a number z such that he knows a random representation of it with respect to $(e_1, f_1, \ldots, e_j, f_j, d_2)$. As will become clear, this is similar to the actions in Box 181 (the only difference is that other symbols are used).

The third line of Box 333 indicates that $\mathcal{B}$ verifies that none of the k-j quotients of the numbers $a_i$, $b_i$ sent by $\mathcal{U}$ is in its deposit database; hereto, as indicated by the second line, none of the $b_i$ may equal zero. If this is the case, then $\mathcal{U}$ must prove to $\mathcal{B}$ knowledge of a representation of $m_1/(\Pi_{i=j+1}^{k} e_i^{a_i} f_i^{b_i})$ with respect to $(e_1, f_1, \ldots, e_j, f_j, d_2)$. The specific protocol described in the flowchart in FIG. 18 has been used for explicitness in the figure.

Box 334 is the same as Box 183, in fact only the symbols differ.

Finally, Box 335 is in fact the same as Box 184, with the addition that if $\mathcal{B}$ accepts the proof, then $\mathcal{B}$ erases $m_1$ and stores the quotients $a_i/b_i$ sent by $\mathcal{U}$ in Box 332 in its database. Not shown is that $\mathcal{B}$ in that case also credits the account of $\mathcal{U}$ with an amount corresponding to the unspent part of the cheque.

As will be obvious to those of ordinary skill in the art, with just a small modification this extension can be combined with the extension to additional, tamper-resistant computing devices. There are two basic ways to realize this modification: either the knowledge of all the exponents is shared between $\mathcal{O}$ and $\mathcal{U}$, or the knowledge of just the exponents on $g_1, g_2, d_1$ is shared and $\mathcal{U}$ knows all exponents on $(d_2, e_1, f_1, \ldots, e_k, f_k)$.

11.6 Extension: anonymous accounts

In the first extension a number $g_1^{u_1} g_2^{u_2}$, denoted by I, is registered together with the identity of $\mathcal{U}$ under the account of $\mathcal{U}$. In order to anonymously open an account, $\mathcal{U}$ must "withdraw" I in a predecing protocol with $\mathcal{B}$, again using a restrictive blind signature. This protocol is very similar to the protocol described in the basic system. The difference is that $\mathcal{U}$ does not withdraw a coin but a pseudonym.

Turning now to FIG. 34, a flowchart of a possible realization of this protocol will now be described.

Not shown is that $\mathcal{U}$ identifies himself, as in the basic cash system.

Box 341 is similar to Box 231. It shows $\mathcal{B}$ generating a random number $u_1 \in \mathbb{Z}_q$ that it did not use in earlier executions of this protocol, and sending this to $\mathcal{U}$. The input m to the protocol is computed from this in the manner specified in the second line. The assignments to z,a,b are computed as in Box 231. As will be obvious to those of ordinary skill in the art, even the protection against framing can be incorporated by letting $\mathcal{U}$ himself generate the number $u_1$ and informing $\mathcal{B}$ only of $g_1^{u_1}$.

Box 342 is similar to Box 232; as in Box 242, however, $\mathcal{U}$ blinds m only by raising it to a random number.

Box 343 is the same as Box 233, and Box 344 is the same as Box 234. The number $m^r$ is denoted by I; it is the certified pseudonym of $\mathcal{U}$ (since: $\mathcal{U}$ has a signature of $\mathcal{B}$).

In the procedure for opening an account, $\mathcal{U}$ no longer identifies himself. $\mathcal{B}$ only verifies that I is certified, and $\mathcal{U}$ (optionally) has to prove as before that he knows a representation of I with respect to $(g_1, g_2)$. In the withdrawal protocol $\mathcal{U}$ can prove ownership of the account the money will be withdrawn from in this way as well.

The rest of the system is as described before.

Since I is equal to $g_1^{u_1 r} g_2^{r}$ and in the withdrawal protocol $m = Ig_3$ is blinded to $m' = m^s$ for a random number $s \in \mathbb{Z}_q$, inevitably m' will be equal to $g_1^{u_1 rs} g_2^{rs} g_3^{s}$. In case $\mathcal{U}$ double-spends, $\mathcal{B}$ can compute $u_1$, and hence the identity of the double-spender (by searching the database that is used in the pseudonym-issuing protocol).

In this particular realization of the protocol, $\mathcal{B}$ can also compute r and hence I in case of double-spending, and so $\mathcal{B}$ will also know the account of the double-spender. As will be obvious to those of ordinary skill in the art, there are various simple modifications to this technique. A part from the question whether there is any advantage in doing so, the protocol can be modified such that only the identity of the double-spender will be revealed but not his account.

As will be readily apparent, even protection against framing can be accomplished in this system. To this end, the number $u_1$ is generated by $\mathcal{U}$ and $g_1^{u_1}$ is sent by $\mathcal{U}$ to $\mathcal{B}$. Note that in that case in Box 341 $\mathcal{B}$ can still compute m.

Furthermore, a simple modification that will be obvious to those of ordinary skill in the art suffices to protect account holders against framing attempts, regardless of the computational power of $\mathcal{B}$. To this end, $\mathcal{U}$ generates two random numbers $u_1, u_2$ in $\mathbb{Z}_q$, and $\mathcal{B}$ only gets to know $g_1^{u_1} g_2^{u_2}$.

This concludes the detailed descriptions of two preferred embodiments. While these descriptions of the present invention have been given as examples, it will be appreciated by those of ordinary skill in the art that various modifications, alternate configurations, and equivalents may be employed without departing from the spirit and scope of the present invention. For example, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition. Various such modifications, alternate configurations, and equivalents have been indicated in the text.

Certain variations and substitutions may be apparent to those of ordinary skill in the art. Various such variations and substitutions have been indicated and sometimes described in detail in the text. Tests in particular need not necessarily be performed between the two actions indicated in the box they are in, or in the boxes in which they are indicated.

It will also be obvious to those of ordinary skill in the art how parts of the inventive techniques and protocols disclosed here can be used to advantage without necessitating all the protocols of the credential mechanism or cash system. This may be more fully appreciated in the light of some examples. In Section 4, many techniques have been described, applicable in both preferred embodiments, for proving several kinds of dependencies in the numbers of the representation known by the user. These techniques, and their corresponding protocols, do not need to be used in conjunction with blind signature protocols. For example, if the signatures are made by a certifying party that can be trusted by users to not compromise their privacy by helping organizations in linking transferred credentials, then the credentials can be issued by means of an ordinary digital signature. As will be appreciated, this in fact can be realized in the described protocols by setting the blinding factors chosen by the user in the respective second boxes of the flowcharts of restrictive blind signature protocols to fixed values. This was previously mentioned in the detailed description, as a way to make privacy optional. In case the certifying party does not help in linkage, however, privacy is still guaranteed.

What is claimed is:

1. A method for a first party to have information certified by a second party by generating a signal representative of a digital certificate corresponding to a vector of numbers, wherein the signals representative of the vector of numbers and the digital certificate are hidden from the second party, yet the second party is ensured that a representation, known by the first party, of at least one number in the vector of numbers, contains the information to be certified, the method comprising the steps of:

generating by the second party, a signal representative of a secret key and a corresponding public key, and providing a specification of the correspondence between the signals representative of the digital certificates and vectors of numbers with respect to the public key;

randomly transforming by the first party, signals representative of the information to be certified, into a vector of numbers, such that the first party knows a representation of at least one number in the vector of numbers, and the representation contains the information to be certified;

computing by the first party, challenge information, and transmitting signals representative of the challenge information to the second party;

computing by the second party, response information based on at least the challenge information and the secret key, and transmitting signals representative of the response information to the first party; and computing by the first party, based on at least the received response information, a digital certificate corresponding to the vector of numbers.

2. A method as in claim 1, wherein the vector of numbers comprises the at least one number of which the first party knows a representation, and additional numbers, of each of which the first party knows a substantially randomly generated representation.

3. A method as in claim 1, wherein the information to be certified has previously been certified by the second party.

4. A method as in claim 2, wherein the information to be certified is a combination of information that has previously been certified by the second party and values by which the information that has previously been certified by the second party, is updated.

5. A method as in claim 1, wherein the vector of numbers represents a digital pseudonym of the first party.

6. A method as in claim 1, wherein the first party comprises a third party and a fourth party.

7. A method as in claim 1, wherein the specification provided by the second party is sufficient for the first party to compute digital certificates corresponding to vectors of numbers, without further assistance of the second party.

8. A method as in claim 1, wherein a representation of a number, m, is a vector of numbers, $(a_1, \ldots, a_k; a_{k+1})$, such that $m + Y_1^{a_1} \ldots Y_k^{a_k} a^v_{k+1}$ where $k \geq 1$, m is a number in a group, $Z_n^*$, where n is a product of at least two distinct prime numbers, $Y_1, \ldots, Y_k$ are numbers in $Z_n^*$, $a_1, \ldots, a_k$ are numbers in a ring, $Z_v$, where v is a positive number, and $a_{k+1}$ is a number in $Z_n^*$.

9. A method as in claim 8, wherein the public key comprises a number, X, in $Z_n^*$, and a hash-function H;

the secret key comprises the $v^{th}$ root modulo n of each of the numbers, $X, Y_1, \ldots, Y_k$, or, alternatively, the prime factorization of the number, n; and the correspondence between a digital certificate and a vector of numbers with respect to the public key is specified according to $b^v = (Xm)^c a$ or, alternatively, according to $b^v = Xm(a)^c$, where a and b are numbers in $Z_n^*$, and c denotes $H(m, B_1, \ldots, B_1, a)$, where $(m, B_1, \ldots, B_1)$ is the vector of numbers.

10. A method as in claim 1, wherein a representation of a number, m, is a vector of numbers, $(a_1, \ldots, a_k)$, such that $m = g_1^{a_1} \ldots g_k^{a_k}$, where $k \geq 2$, m is a number in a group, $G_q$, of order q, where q is a prime number, $g_1, \ldots, g_k$ are numbers in $G_q$, and $a_1, \ldots, a_k$ are numbers in the ring, $Z_q$.

11. A method as in claim 10, wherein the public key comprises two numbers, g and h, in $G_q$, and a hash-function H;

the secret key comprises the discrete logarithm, in $Z_q$, of h with respect to g; and the correspondence between a digital certificate and a vector of numbers with respect to the public key is specified according to $g^r=(hm)^c a$ or, alternatively, according to $g^r=hm(a)^c$, where a is a number in $G_q$, c denotes $H(m,B_1, \ldots, B_1, a)$, where $(m,B_1, \ldots, B_1)$ is the vector of numbers, and r is a number in $Z_q$.

12. A method as in claim 10, wherein the public key comprises two numbers, g and h, in $G_q$, and a hash-function H;

the secret key comprises the discrete logarithm, in $Z_q$, of h with respect to g; and the correspondence between a digital certificate and a vector of numbers with respect to the public key is specified according to $g^r=h^c a$ and $m^r=z^c b$, or, alternatively, according to $g^r=ha^c$ and $m^r=za^c$, where z, a, and b, are numbers in $G_q$, c denotes $H(m,B_1, \ldots, B_1, a)$, where $(m,B_1, \ldots, B_1)$ is the vector of numbers, and r is a number in $Z_q$.

13. A method for a first party which knows a first representation, where a first representation is a representation of at least one number in a vector of numbers with respect to a first function, to transmit to a third party a signal constituting a second representation, where a second representation is a representation of a second function of the at least one number in the vector of numbers with respect to a third function, the first party having previously generated a signal representative of a digital certificate corresponding to the vector of numbers with respect to a public key of a second party, the method comprising the steps of:

providing by the first party to the third party, signals representative of the vector of numbers and the digital certificate;

computing by the first party, in response to challenge information, response information based on at least the challenge information and the second representation, and transmitting signals representative of the response information to the third party; and verifying by the third party, that the digital certificate corresponds to the vector of numbers with respect to the public key and that the response information corresponds to the challenge information, the second function of the at least one number in the vector of numbers, and the third function.

14. A method as in claim 13, wherein the second function is an identity function and the third function is the same as the first function.

15. A method as in claim 13, wherein the second and third functions determine a property of the first representation.

16. A method as in claim 13, wherein the challenge information is a one-way hashfunction of at least the vector of numbers.

17. A method as in claim 13, wherein knowing the correspondence between digital certificates and vectors of numbers with respect to the public key, is sufficient for the first party to compute digital certificates corresponding to vectors of numbers, without further assistance of the second party.

18. A method as in claim 13, wherein the first party also transmits to the third party a signal representative of an additional number, of which it knows a substantially random representation with respect to the third function; and the response information is a linear combination, determined by the challenge information, of the second representation and the substantially random representation.

19. A method as in claim 13, wherein the vector of numbers comprises the at least one number of which the first party knows a representation with respect to the first function, and additional numbers, of each of which the first party knows a substantially randomly generated representation with respect to the third function; and the response information is a linear combination, determined by the challenge information, of the second representation and the substantially randomly generated representation of one of the additional numbers.

20. A method as in claim 13, wherein the first party comprises a fourth party and a fifth party.

21. A method as in claim 13, wherein the first representation contains a set of credentials that has been certified by the second party.

22. A method as in claim 13, wherein a representation of a number, m, with respect to the third function is a vector of numbers, $(a_1, \ldots, a_k; a_{k+1})$, such that $m=Y_1^{a_1} \ldots Y_k^{a_k} a_{k+1}^v$, where $k \geq 0$, m is a number in a group, $Z_n^*$, where n is a product of at least two distinct prime numbers, $Y_1, \ldots, Y_k$ are numbers in $Z_n^*$, $a_1, \ldots, a_k$ are numbers in a ring, $Z_v$, where v is a positive number, and $a_{k+1}$ is a number in $Z_n^*$.

23. A method as in claim 22, wherein the first function maps a vector of numbers, $(b_1, \ldots, b_j; b_{j+1})$, to the number $Z_1^{b_1} \ldots Z_j^{b_j} b_{j+1}^v$, for $j \geq 1$, where $Z_1, \ldots Z_j$, are numbers in $Z_n^*$ that have been determined by the second party, and each of the numbers, $Y_1, \ldots, Y_k$, is a product of powers of numbers in the set, $\{Z_1, \ldots, Z_j\}$, and their inverses.

24. A method as in claim 13, wherein a representation of a number, m, with respect to the third function is a vector of numbers, $(a_1, \ldots, a_k)$, such that $m=g_1^{a_1} \ldots g_k^{a_k}$, where $k \geq 1$, m is a number in a group, $G_q$, of order q, where q is a prime number, $g_1, \ldots, g_k$ are numbers in $G_q$, and $a_1, \ldots, a_k$ are numbers in the ring, $Z_q$.

25. A method as in claim 24 wherein the first function maps a vector of numbers, $(b_1, \ldots, b_j)$, to the number $e_1^{b_1} \ldots e_j^{b_j}$, for $j \geq 2$, where $e_1, \ldots, e_j$ are numbers in $G_q$ that have been determined by the second party, and each of the numbers, $g_1, \ldots, g_k$, is a product of powers of numbers in the set, $\{e_1, \ldots, e_j\}$, and their inverses.

26. A method for a first party to have information certified by a second party by generating a signal representative of a digital certificate corresponding to a vector of numbers, wherein the signals representative of the vector of numbers and the digital certificate are hidden from the second party, yet the second party is ensured that the information to be certified is contained in a representation known by the first party of at least one number in the vector of numbers with respect to a first function, and then to transmit to a third party a signal constituting a representation of a second function of the at least one number in the vector of numbers with respect to a third function, the method comprising the steps of:

generating by the second party, a signal representative of a first secret key and a corresponding first public key, and providing a specification of the correspondence between the signals representative of the digital certificates and vectors of numbers with respect to the first public key;

randomly transforming by the first party, signals representative of the information to be certified, into a vector of numbers, such that the first party knows a first representation, where a first representation is a representation of at least one number in the vector of numbers with respect to the first function, and the first representation contains the information to be certified;

computing by the first party, first challenge information, and transmitting signals representative of the first challenge information to the second party;

computing by the second party, first response information based on at least the first challenge information and the first secret key, and transmitting signals representative of the first response information to the first party;

computing by the first party, based on at least the received first response information, a digital certificate corresponding to the vector of numbers;

transmitting by the first party to the third party, signals representative of the vector of numbers and the digital certificate;

computing by the first party, in response to second challenge information, second response information based on at least the second challenge information and a second representation, where a second representation is a representation of the second representation is a representation of the second function of the at least one number in the vector of numbers with respect to the third function, and transmitting a signal representative of the second response information to the third party; and verifying by the third party, that the digital certificate corresponds to the vector of numbers with respect to the first public key and that the second response information corresponds to the second challenge information, the second function of the at least one number in the vector of numbers, and the third function.

27. A method as in claim 26, wherein the specification provided by the second party is sufficient for the first party to compute digital certificates corresponding to vectors of numbers, without further assistance of the second party.

28. A method as in claim 26, wherein the vector of numbers comprises the at least one number of which the first party knows a representation with respect to the first function, and additional numbers, of each of which the first party knows a substantially randomly generated representation with respect to the third function; and the second response information is a linear combination, determined by the second challenge information, of the second representation and the substantially randomly generated representation of one of the additional numbers.

29. A method as in claim 28, wherein there are at least two additional numbers.

30. A method as in claim 28, wherein the first party has a second secret key and a corresponding second public key, and the first representation contains the second secret key.

31. A method as in claim 26, wherein the information to be certified has previously been certified by the second party.

32. A method as in claim 26, wherein the information to be certified is a combination of information that has previously been certified by the second party and values by which the information that has previously been certified by the second party, is updated.

33. A method as in claim 26, wherein the information to be certified is a set of credentials.

34. A method as in claim 26, wherein the vector of numbers represents a pseudonym of the first party with the third party.

35. A method as in claim 26, wherein the first party comprises a fourth party and a fifth party.

36. A method as in claim 35, wherein the fourth party acts in the interest of the second party, and can only communicate with the fifth party.

37. A method as in claim 36, wherein the fifth party randomizes at least one number provided by the fourth party.

38. A method as in claim 26, wherein the first party also transmits to the third party a signal representative of an additional number, of which it knows a substantially random representation with respect to the third function; and the second response information is a linear combination, determined by the second challenge information, of the second representation and the substantially random representation.

39. A method as in any one of claims 26 to 37 for implementing an electronic cash system, wherein the first party is a paying party, such as a consumer;

the second party is a financial institution, such as a bank, that issues electronic cash; and the third party is a servicing organization, such as a shop.

40. A method as in claim 39, wherein the amount of electronic cash held by the first party is indicated by a counter held by, but not under control of, the first party.

41. A method as in claim 26, wherein a representation of a number, m, with respect to the first function is a vector of numbers, $(a_1, \ldots, a_k; a_{k+1})$, such that $m = Y_1^{a_1} \ldots Y_k^{a_k} a_{k+1}^v$, where $k \geq 1$, m is a number in a group, $Z_n^*$, where n is a product of at least two distinct prime numbers, $Y_1, \ldots, Y_k$ are numbers in $Z_n^*$, $a_1, \ldots, a_k$ are numbers in a ring, $Z_v$, where v is a positive number, and $a_{k+1}$ is a number in $Z_n^*$.

42. A method as in claim 26, wherein a representation of a number, m, with respect to the first function is a vector of numbers, $(a_1, \ldots, a_k)$, such that $m = g_1^{a_1} \ldots g_k^{a_k}$, where $k \geq 2$, m is a number in a group, $G_q$, of order q, where q is a prime number, $g_1, \ldots, g_k$ are numbers in $G_q$, and $a_1, \ldots, a_k$ are numbers in the ring, $Z_q$.

43. An apparatus for a first party to have information certified by a second party by generating a signal representative of a digital certificate corresponding to a vector of numbers, wherein the signals representative of the vector of numbers and the digital certificate are hidden from the second party, yet the second party is ensured that a representation, known by the first party, of at least one number in the vector of numbers, contains the information to be certified, the apparatus comprising:

first processing means for use by the first party;

second processing means for use by the second party, the second processing means being beyond control of the first party;

interface means between the first processing means and the second processing means;

key generation means for generating a secret key and a corresponding public key for the second party;

means within the first processing means for randomly transforming signals representative of the information to be certified, into a vector of numbers, such that the first processing means has access to a representation of at least one number in the vector of numbers, and the representation contains the information to be certified;

means within the first processing means for computing challenge information;

means within the first processing means for transmitting to the second processing means, signals representative of the challenge information;

means within the second processing means for computing response information, based on at least the challenge information and the secret key;

means within the second processing means for transmitting to the first processing means, signals representative of the response information; and means within the first processing means for computing, based on at least the received response information, a digital certificate corresponding to the vector of numbers.

44. An apparatus as in claim 43, wherein the first processing means comprises a third processing means, a fourth processing means, and interface means therebetween.

45. An apparatus for a first party which knows a first representation, where a first representation is a representation of at least one number in a vector of numbers with respect to a first function, to transmit to a third party a signal constituting a second representation, where a second representation is a representation of a second function of the at least one number in the vector of numbers with respect to a third function, the first party having previously generated a signal representative of a digital certificate corresponding to the vector of numbers with respect to a public key of a second party, the apparatus comprising:

first processing means for use by the first party;

second processing means for use by the third party;

interface means between the first processing means and the second processing means;

means within the first processing means for transmitting to the second processing means, signals representative of the vector of numbers and the corresponding digital certificate;

means within the first processing means for computing, in response to challenge information, response information based on at least the challenge information and the second representation;

means within the first processing means for transmitting to the second processing means, signals representative of the response information; and means within the second processing means for verifying that the digital certificate corresponds to the vector of numbers with respect to the public key and that the response information corresponds to the challenge information, the second function of the at least one number in the vector of numbers, and the third function.

46. An apparatus as in claim 45, wherein the first processing means comprises a third processing means, a fourth processing means, and interface means therebetween.

47. An apparatus for a first party to have information certified by a second party by generating a signal representative of a digital certificate corresponding to a vector of numbers, wherein the signals representative of the vector of numbers and the digital certificate are hidden from the second party, yet the second party is ensured that the information to be certified is contained in a representation known by the first party of at least one number in the vector of numbers with respect to a first function, and then to transmit to a third party a signal constituting a representation of a second function of the at least one number in the vector of numbers with respect to a third function, the apparatus comprising:

first processing means for use by the first party;

second processing means for use by the second party and beyond control of the first party;

third processing means for use by the third party;

first interface means between the first processing means and the second processing means;

second interface means between the first processing means and the third processing means;

key generation means for generating a signal representative of a secret key and a corresponding public key for the second party;

means within the first processing means for randomly transforming signals representative of the information to be certified, into a vector of numbers, such that the first processing means has access to a first representation, where a first representation is a representation of at least one number in the vector of numbers with respect to the first function, and the first representation contains the information to be certified;

means within the first processing means for computing first challenge information;

means within the first processing means for transmitting to the second processing means, a signal representative of the first challenge information;

means within the second processing means for computing first response information based on at least the first challenge information and the secret key;

means within the second processing means for transmitting to the first processing means, a signal representative of the first response information;

means within the first processing means for computing, based on at least the first response information, a digital certificate corresponding to the vector of numbers;

means within the first processing means for transmitting to the third processing means, signals representative of the vector of numbers and the digital certificate;

means within the first processing means for computing, in response to second challenge information, second response information based on at least the second challenge information and a second representation, where a second representation is a representation of the second function of the at least one number in the vector of numbers with respect to the third function;

means within the first processing means for transmitting to the third processing means, a signal representative of the second response information; and means within the third processing means for verifying that the digital certificate corresponds to the vector of numbers with respect to the public key and that the second response information corresponds to the second challenge information, the second function of the at least one number in the vector of numbers, and the third function.

48. An apparatus as in claim 47, wherein the first processing means comprises a fourth processing means, a fifth processing means, and third interface means therebetween.

49. An apparatus as in claim 48, wherein the fourth processing means is tamper-resistant and can only communicate with the fifth processing means, through the third interface means.

50. An apparatus as in claim 49, wherein the fifth processing means randomizes at least one number provided by the fourth processing means.

51. An apparatus as in any one of claims 47 to 50 for implementing an electronic cash system, wherein:

the first party is a paying party, such as a consumer;

the second party is a financial institution, such as a bank, that issues electronic cash; and the third party is a servicing organization, such as a shop.

52. An apparatus as in claim 47 for implementing an electronic cash system, wherein the first processing means is tamper-resistant, and further comprises counter means for indicating the amount of electronic cash held by the first party.

53. An apparatus as in either claim 49 or 50 for implementing an electronic cash system, wherein the fourth processing means comprises counter means for indicating the amount of electronic cash held by the first party.

* * * * *